(12) United States Patent
Sasaki

(10) Patent No.: US 7,953,317 B2
(45) Date of Patent: May 31, 2011

(54) LENS BARREL

(75) Inventor: Takamitsu Sasaki, Saitama (JP)

(73) Assignee: Hoya Corporation, Tokyo (JP)

( * ) Notice: Subject to any disclaimer, the term of this patent is extended or adjusted under 35 U.S.C. 154(b) by 17 days.

(21) Appl. No.: 12/402,597

(22) Filed: Mar. 12, 2009

(65) Prior Publication Data
US 2009/0232485 A1    Sep. 17, 2009

(30) Foreign Application Priority Data

Mar. 14, 2008 (JP) ................... 2008-065728

(51) Int. Cl.
*G03B 17/00* (2006.01)
*G02B 15/14* (2006.01)

(52) U.S. Cl. .......... 396/85; 396/533; 359/700; 359/701; 359/704

(58) Field of Classification Search .............. 396/73, 396/72, 85, 448, 533; 359/676, 699, 700, 359/701, 704, 826
See application file for complete search history.

(56) References Cited

U.S. PATENT DOCUMENTS

| | | | |
|---|---|---|---|
| 6,978,089 B2 | 12/2005 | Nomura et al. |
| 7,013,081 B2 | 3/2006 | Nomura et al. |
| 7,131,772 B2 | 11/2006 | Nomura |
| 7,289,725 B2 | 10/2007 | Nomura |
| 7,507,040 B2 | 3/2009 | Nomura et al. |
| 2006/0034604 A1 | 2/2006 | Nomura et al. |
| 2006/0115250 A1 | 6/2006 | Nomura |
| 2007/0177865 A1 | 8/2007 | Nomura et al. |
| 2008/0019685 A1 | 1/2008 | Ishizuka et al. |

FOREIGN PATENT DOCUMENTS

| | | |
|---|---|---|
| JP | 2006-053444 A | 2/2006 |
| JP | 3771909 B2 | 2/2006 |

OTHER PUBLICATIONS

English language Abstract of JP 2006-053444 A (Feb. 23, 2006).

*Primary Examiner* — Rochelle-Ann J Blackman
(74) *Attorney, Agent, or Firm* — Greenblum & Bernstein P.L.C.

(57) ABSTRACT

A lens barrel includes a driven ring, a follower provided on the driven ring, a rotational transfer ring including a circumferential groove having no axial-direction component and a rotational transfer groove including an axial-direction component, a guide ring, and a cam groove formed on the guide ring for guiding the driven ring via the follower. Rotation of the driven ring is prevented when the follower is engaged in the circumferential groove so that the driven ring is held at a non-photographing position. When the follower is engaged in the rotational transfer groove, the driven ring is moved along the cam groove between the non-photographing position and a ready-to-photograph position. Opposed wall surfaces in the circumferential groove determine a position of the follower when the driven ring moves between the non-photographing position and the ready-to-photograph position. The range of the cam groove, that is used to move the driven ring between the ready-to-photograph position and the non-photographing position of the guide ring, includes an axial-direction component.

13 Claims, 29 Drawing Sheets

LENS BARREL

BACKGROUND OF THE INVENTION

1. Field of the Invention

The present invention relates to a lens barrel, and in particular, relates to a retracting structure of the lens barrel.

2. Description of the Related Art

The assignee of the present invention has proposed a retracting structure of a zoom lens (zoom lens barrel) which enables a considerable reduction in length of the zoom lens. This retracting structure is disclosed in U.S. Pat. No. 7,013,081 (Japanese Patent No. 3,771,909). A feature of this zoom lens is that the length thereof in the retracted state is reduced by radially retracting (displacing) an optical element (retractable optical element) of the zoom lens system from an imaging (photographing) optical axis thereof while retracting the same optical element from a ready-to-photograph position along the imaging optical axis.

More specifically, in this type of zoom lens, the retractable optical element (e.g., a lens group) is supported by a movable frame therein which is guided linearly along the imaging optical axis in a manner to be movable between an on-axis position (where the optical axis of the retractable optical element coincides with the imaging optical axis) and an off-axis displaced position (where the optical axis of the retractable optical element is eccentrically positioned with respect to the imaging optical axis), and this movable frame is moved along the imaging optical axis by a rotational force of a rotational member such as a cam ring. In addition, the zoom lens is provided with a fixed cam member which moves the retractable optical element from the on-axis position to the off-axis displaced position by using a rearward moving force of the rotational member.

In addition, for the purpose of miniaturization of this type of lens barrel, United States Patent Application Publication No. 2006/0034604 A1 (Japanese Unexamined Patent Publication No. 2006-53444) has proposed a structure in which the rotational member is provided with an accommodation portion in which the retractable optical element is partly housed in the retracted state of the lens barrel. To prevent the retractable optical element and the rotational member from interfering with each other, the lens barrel is provided with a rotation limit mechanism (idle mechanism) which prevents rotational force from being transferred from a drive rotational member to the rotational member during a certain period of operating time in the lens barrel advancing direction from the retracted state toward a ready-to-photograph state of the zoom lens.

A subsequent study has revealed that there is still room for an improvement in operation accuracy in the rotation limit mechanism for the rotational member. Specifically, demands have arisen for an improvement in operation accuracy of movable members (e.g., the retractable optical element) associated with the rotational member by more precisely controlling the position and timing at which prevention of rotation of the rotational member commences and at which the rotational member is allowed to rotate, and for miniaturization of the lens barrel by reducing a safety margin for accommodating precision errors.

SUMMARY OF THE INVENTION

The present invention provides a lens barrel including a driven member whose rotation is limited in a specific operating state, wherein the position of the driven member where rotation thereof is limited can be controlled more precisely to thereby make it possible to improve operating accuracy and achieve miniaturization.

According to an aspect of the present invention, a lens barrel is provided, including a driven ring which is rotatable about an axis extending in an optical axis direction and movable in the optical axis direction, wherein the axis extending in the optical axis direction defines an axial direction; a follower which is provided on the driven ring; a rotational transfer ring which is driven to rotate about the axis, the rotational transfer ring including a circumferential groove having no axial-direction component, and a rotational transfer groove which is communicatively connected with the circumferential groove and includes an axial-direction component, the follower being selectively engaged in the circumferential groove and the rotational transfer groove; a guide ring which is prevented from rotating about the axis, the guide ring being associated with the rotational transfer ring to allow the rotational transfer ring to rotate about the axis relative to the guide ring and to be prevented from moving in the optical axis direction relative to the rotational transfer ring; and a cam groove formed on the guide ring, in which the follower of the driven ring is engaged, the cam groove guiding the driven ring to move between a non-photographing position and a ready-to-photograph position by a rotation of the driven ring relative to the guide ring. Rotation of the driven ring is prevented when the follower is engaged in the circumferential groove so that the driven ring is held at the non-photographing position. When the follower is engaged in the rotational transfer groove, the driven ring is moved along the cam groove between the non-photographing position and the ready-to-photograph position by a rotation of the rotational transfer ring. The rotational transfer ring includes a pair of opposed wall surfaces in the circumferential groove which extend parallel to each other so as to determine a position of the follower in the optical axis direction when the driven ring moves between the non-photographing position and the ready-to-photograph position. An entire range, of the cam groove of the guide ring, that is used to move the driven ring between the ready-to-photograph position and the non-photographing position includes an axial-direction component.

The cam groove can be formed into one of a through-groove and a bottomed-groove.

In this lens barrel according to the present invention, it is desirable to make the optical element enter (housed in) an accommodation portion formed on the driven ring by using a state where rotation of the driven ring is limited by engagement of the follower with the circumferential groove of the rotational transfer ring. More specifically, the lens barrel can include a linearly moving ring which is positioned inside the driven ring and is prevented from rotating about the axis, the linearly moving ring being moved between a forward position and a rearward position in the optical axis direction when the driven ring moves between the ready-to-photograph position and the non-photographing position, respectively; a retractable optical element supported by the linearly moving ring therein to be movable between an on-axis position, at which a center of the retractable optical element is coincident with the optical axis, and an off-axis displaced position, at which the center of the retractable optical element is eccentrically positioned with respect to the optical axis; a retracting device which moves the retractable optical element from the on-axis position to the off-axis displaced position by a relative moving force in the optical axis direction between the retracting device and the linearly moving ring when the linearly moving ring moves from the forward position to the rearward position; and an accommodation portion formed on an inner periphery of the driven ring to allow at least part of the retractable optical element to enter the accommodation portion when the driven ring is in the non-photographing position.

The position of the linearly moving ring in the optical axis direction can be controlled by at least one second cam groove formed on an inner periphery of the rotational transfer ring.

It is desirable for the rotational transfer ring to include a second cam groove, the second cam groove including a circumferential groove portion having no axial-direction component, wherein the linearly moving ring includes a second follower which is engaged in the second cam groove, a position of the linearly moving ring in the optical axis direction is controlled via the second cam groove and the second follower. When the follower of the driven ring is in the circumferential groove of the rotational transfer ring, the second follower is engaged in the circumferential groove portion of the second cam groove. Accordingly, movements of the driven ring in the vicinity of the non-photographing position and movements of the linearly moving ring in the optical axis direction can be made in synchronization with each other.

It is desirable for the driven ring to include a cam groove provided on a periphery thereof, and for a rotation of the driven ring to cause a position of an optical element of the lens barrel that is different from the retractable optical element to vary in the optical axis direction.

The rotational transfer groove that is formed on the rotational transfer ring can be formed into any shape as long as the rotational transfer groove includes an axial-direction component that makes it possible to transfer a component force in a rotation direction to the follower of the driven ring. For instance, the rotational transfer groove of the rotational transfer ring can include an axial groove extending in the optical axis direction.

It is possible to use the rotation of the driven ring for a purpose other than the purpose of guiding an optical element such as a lens group. For instance, the opening and shutting operations of a lens barrier mechanism can be controlled by rotations of the driven ring. More specifically, the lens barrel can include a lens barrier mechanism which is positioned away from the driven ring in the optical axis direction when the driven ring is in the ready-to-photograph position, and is positioned in a close vicinity of the driven ring in the optical axis direction when the driven ring is in the non-photographing position. The lens barrier mechanism includes at least one barrier blade which is biased in an opening direction when the lens barrier mechanism is positioned away from the driven ring. A rotation of the driven ring when the driven ring moves from the ready-to-photograph position to the non-photographing position causes the barrier blade to shut.

In the present invention, a safety margin between the driven ring and the lens barrier mechanism, that is provided in anticipation of a discrepancy in the rotational stop position of the driven ring, can be minimized because the rotational stop position of the driven ring at the non-photographing position is controlled with precision.

It is desirable for the lens barrel to include a retractable lens barrel incorporated in a camera.

It is desirable for the retractable optical element to be supported by the linearly moving ring therein to be swingable between the on-axis position and the off-axis displaced position about a pivot parallel to the optical axis.

In an embodiment, a lens barrel is provided, including a driven ring including a follower on a periphery thereof; a rotational transfer ring driven to rotate about an axis extending an optical axis direction; a circumferential groove which is formed on the rotational transfer ring and includes no axial-direction component, in which the follower is engaged, wherein the circumferential groove allows the follower to be disengaged from the circumferential groove when the rotational transfer ring is positioned at a specific rotational position; and a guide ring which is prevented from rotating about the axis, the guide ring being associated with the rotational transfer ring to allow the rotational transfer ring to rotate about the axis relative to the guide ring and to be prevented from moving in the optical axis direction relative to the rotational transfer ring. The driven ring is not rotated when the follower is in the circumferential groove. The driven ring is rotated by a rotation of the rotational transfer ring when the follower is disengaged from the circumferential groove. The rotational transfer ring can include a pair of opposed wall surfaces in the circumferential groove which extend parallel to each other so as to determine a position of the follower in the optical axis direction when the follower is engaged in the circumferential groove. The guide ring includes a rotation-direction-position limit cam groove in which the follower is engaged, the rotation-direction-position limit cam groove including an axial-direction component and determining a position of the follower in a rotational direction thereof when the follower is engaged in the circumferential groove.

The rotation-direction-position limit cam groove can be formed into one of a through-groove and a bottomed-groove.

The present disclosure relates to subject matter contained in Japanese Patent Application No. 2008-65728 (filed on Mar. 14, 2008) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 2:
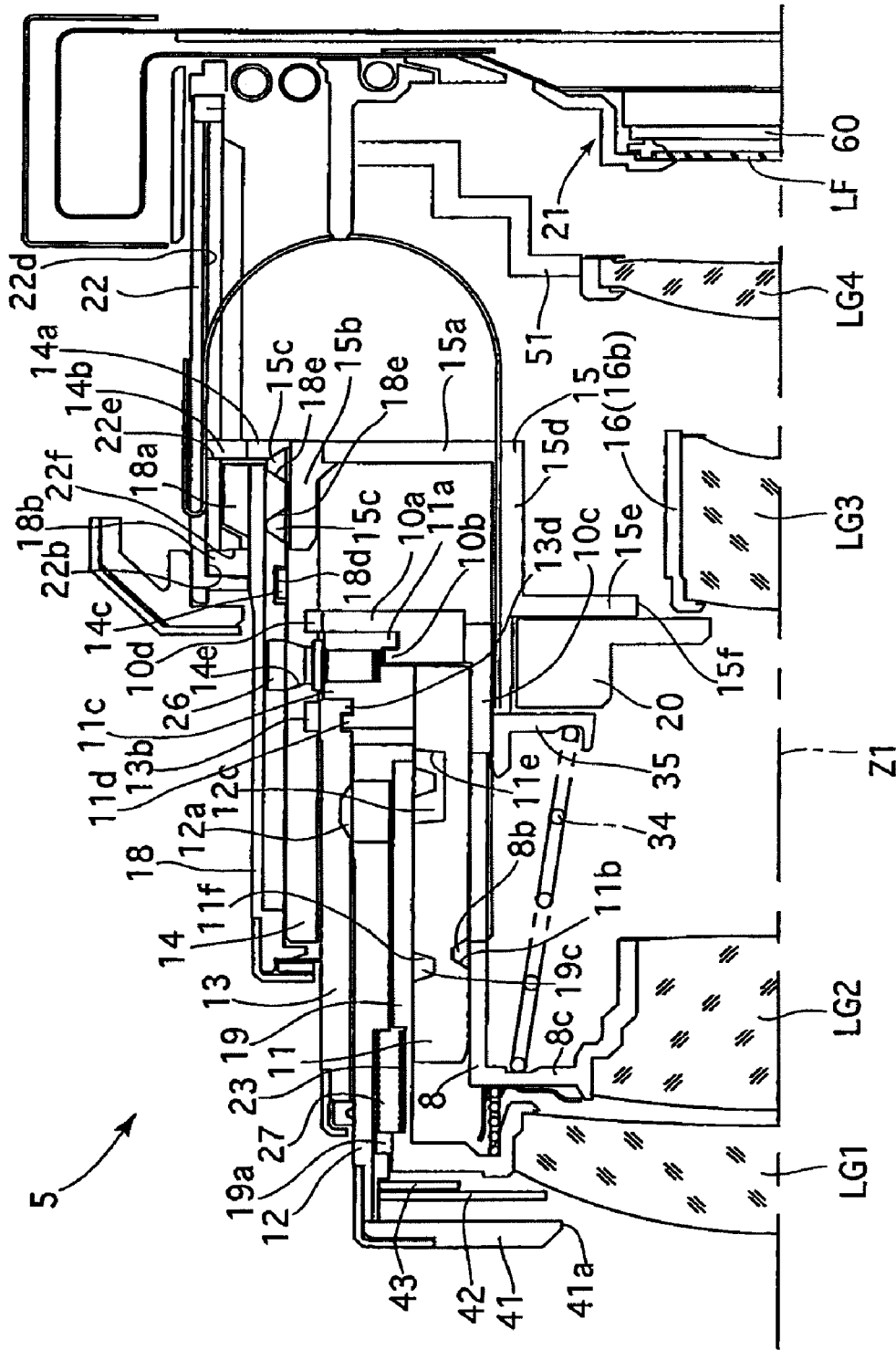
FIG. 2 is a cross sectional view of the zoom lens barrel set at the wide-angle extremity in a ready-to-photograph state, showing only an upper half of the zoom lens barrel from an imaging optical axis.
Figure 3:
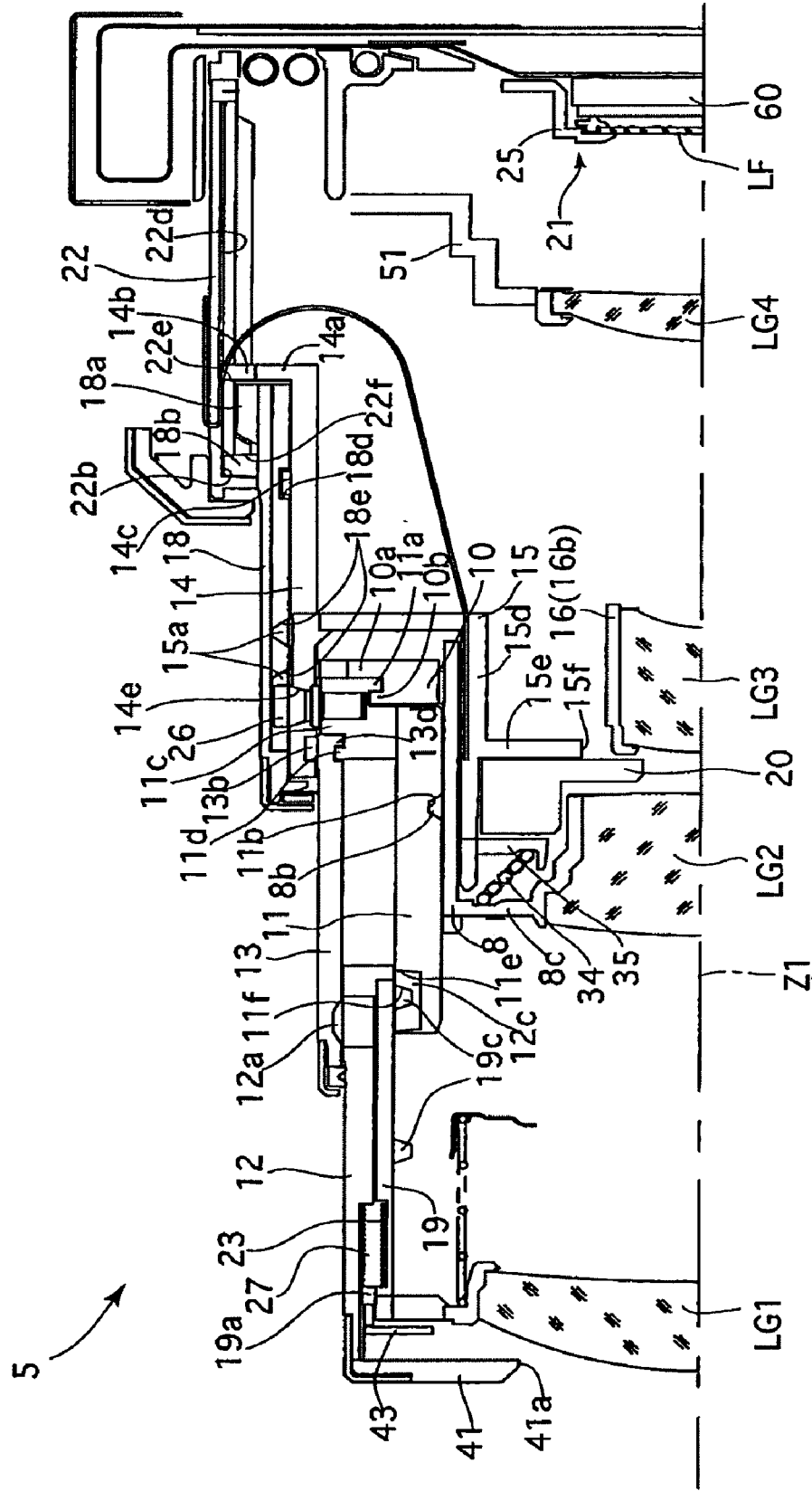
FIG. 3 is a cross sectional view of the zoom lens barrel set at the telephoto extremity in a ready-to-photograph, showing only an upper half of the zoom lens barrel from the imaging optical axis.

An embodiment of a zoom lens (zoom lens barrel) 5 according to the present invention is of a type which is incorporated in a digital camera. The zoom lens 5 is provided with an imaging optical system which includes a first lens group LG1, a second lens group LG2, a third lens group (retractable optical element) LG3, a fourth lens group LG4, a low-pass filter (optical filter) LF and a solid-state image sensor (hereinafter referred to simply as image sensor) 60, in that order from the object side in a ready-to-photograph state as shown in FIGS. 2 and 3. "Z1" shown in FIGS. 1 through 3 and other drawings represents the imaging optical axis of the imaging optical system that is configured as a zoom optical system. A zooming operation is carried out by moving the first lens group LG1, the second lens group LG2 and the third lens group LG3 along the imaging optical axis Z1 in a predetermined moving manner, and a focusing operation is carried out by moving the fourth lens group LG4 along the same imaging optical axis Z1. In the following descriptions, the term "optical axis direction" refers to a direction along or parallel to the imaging optical axis Z1 of the imaging optical system unless otherwise stated. In addition, the terms "circumferential direction" and "rotational direction" refer to a direction about the axes (which are substantially coincident with the imaging optical axis Z1) of ring or annular members which serve as elements of the zoom lens barrel 5.

The zoom lens 5 is provided on the radially outermost side thereof with a stationary barrel 22 fixed to a camera body to which the zoom lens 5 is mounted, and is provided immediately behind the stationary barrel 22 with an image sensor holding unit 21 fixed to the back of the stationary barrel 22. The image sensor 60 is mounted on the image sensor holding unit 21 and held thereby in a manner to be movable along a plane parallel to the imaging optical axis Z1. The image sensor holding unit 21 has the capability of correcting (reducing) image shake by moving the image sensor 60 along the plane orthogonal to the imaging optical axis Z1.

Figure 13:
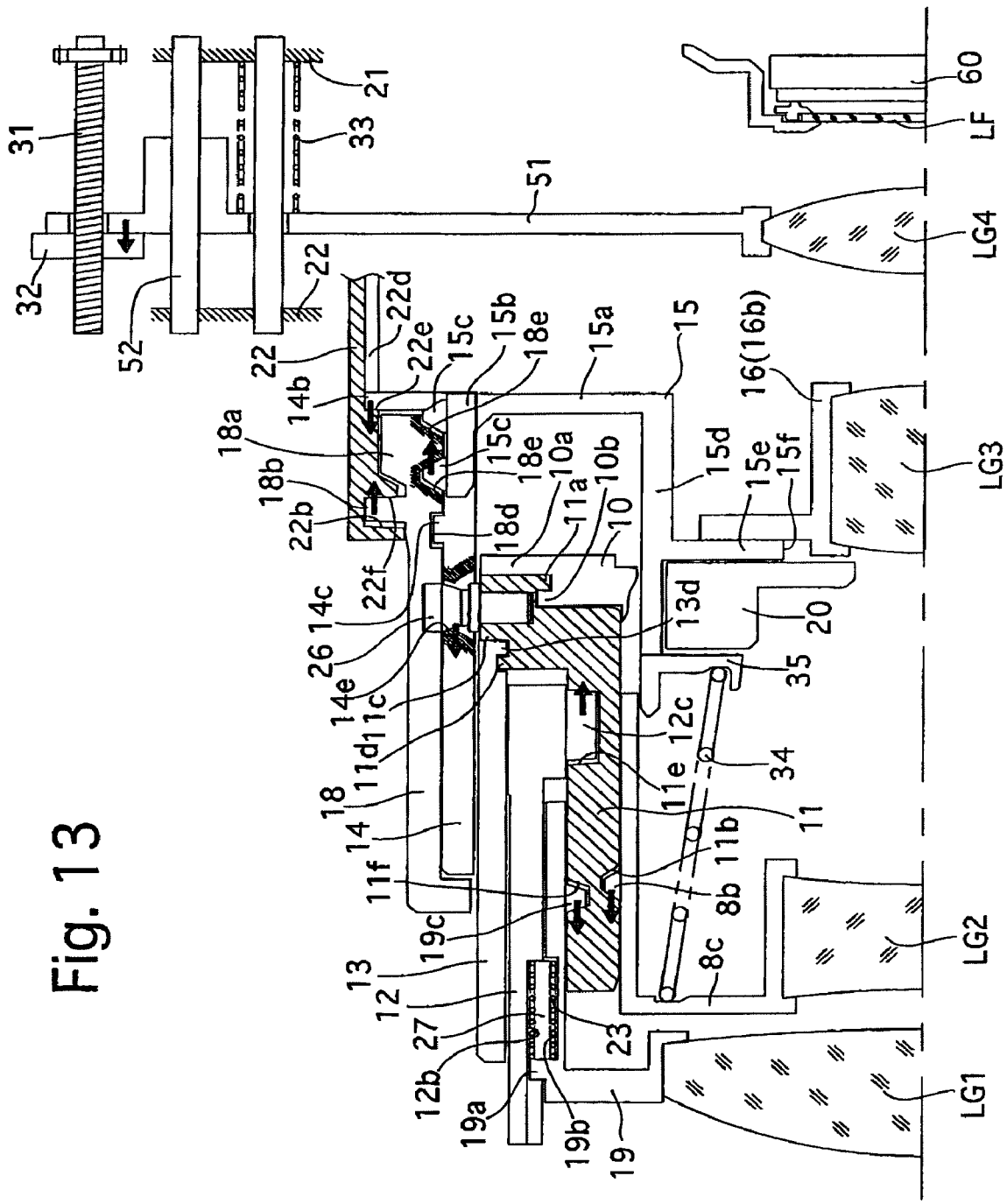
FIG. 13 is a cross sectional view of the zoom lens barrel set at the wide-angle extremity in the ready-to-photograph state, showing the operation of an inter-lens-group biasing spring provided between a second lens group and a third lens group of the zoom lens barrel, showing only an upper half of the zoom lens barrel from the imaging optical axis.

The zoom lens 5 is provided in the stationary barrel 22 with an AF lens frame 51 which is guided linearly in the optical axis direction, i.e., without rotating about the optical axis Z1, via an AF guide shaft 52. The AF lens frame 51 holds the fourth lens group LG4. As shown in FIG. 13, the AF lens frame 51 is biased forward in the optical axis direction to abut against an AF nut 32 by a fourth-lens-group biasing spring 33 in the form of a compression coil spring which is installed between the AF lens frame 51 and the image sensor holding unit 21. The AF nut 32 is screw-engaged with a lead screw 31 while being prevented from rotating. The lead screw 31 is driven to rotate on the axis of rotation thereof by an AF motor 160 mounted to the stationary barrel 22. Accordingly, rotating the lead screw 31 forward and reverse by the AF motor 160 causes the AF nut 32 to move forward and rearward along the lead screw 31 without rotating with the lead screw 31, thus causing the position of the AF lens frame 51 in the optical axis direction to vary in accordance with this movement of the AF nut 32.

Figure 7:
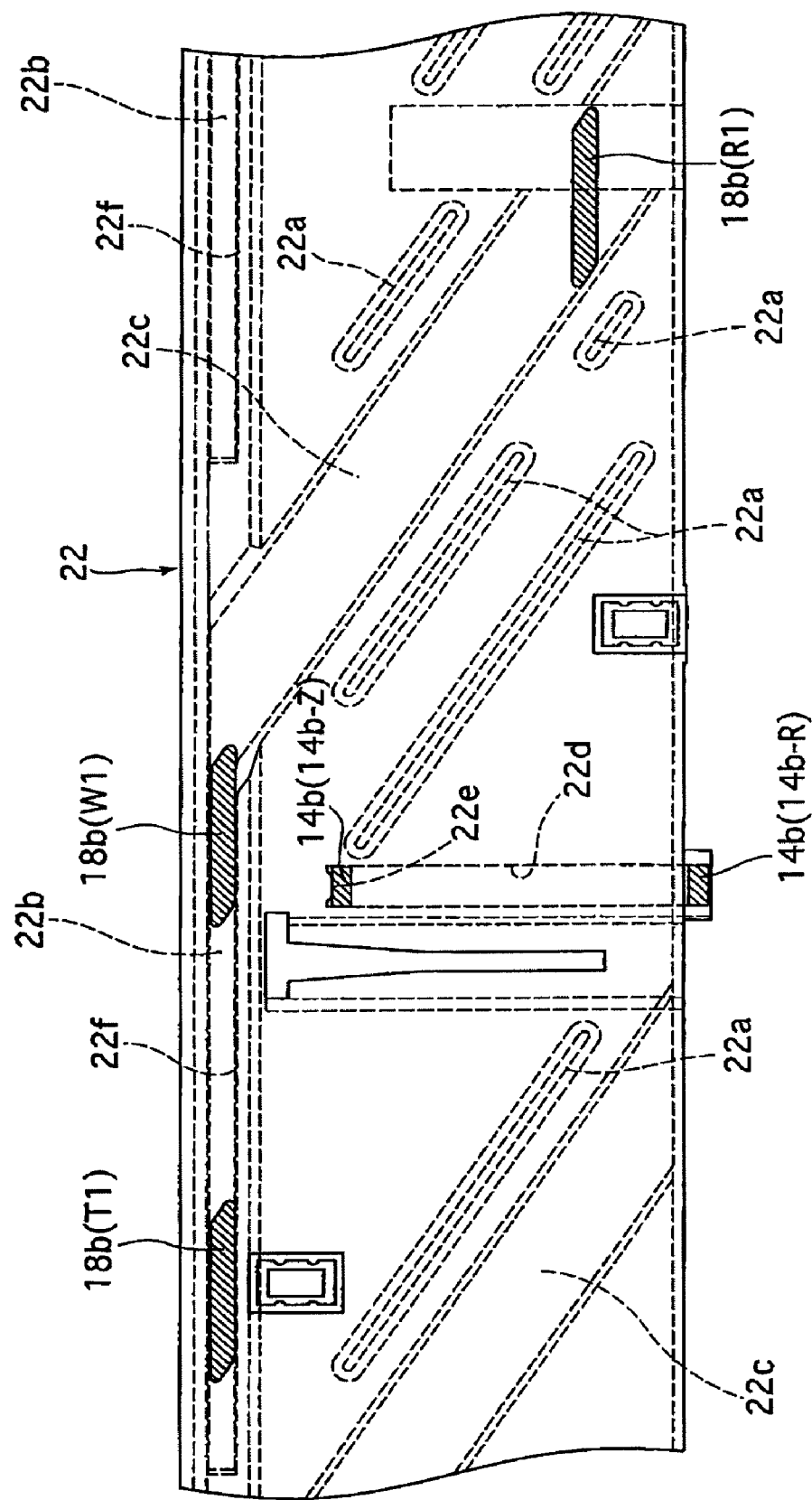
FIG. 7 is a developed plan view of a portion of a stationary barrel of the zoom lens barrel, wherein the structure of the inner peripheral surface thereof is transparently shown (by broken lines) for clarity purposes.

The zoom lens 5 is provided with a zoom motor 150 for rotating the zoom gear 28. The zoom motor 150 is mounted to the stationary barrel 22. The zoom lens 5 is provided immediately inside the stationary barrel 22 with a helicoid ring (rotational transfer ring/outer advancing barrel) 18 which advances from and retracts into the stationary barrel 22. The zoom gear 28 is in mesh with an outer circumferential gear 18c formed on an outer peripheral surface of the helicoid ring 18. As shown in FIG. 7, the stationary barrel 22 is provided on an inner peripheral surface thereof with an inner helicoid 22a which is inclined at a predetermined angle of inclination with respect to the optical axis direction, and an annular circumferential groove 22b which lies in a plane orthogonal to the imaging optical axis Z1, thus having no axial-direction component. An outer helicoid 18a formed on an outer peripheral surface of the helicoid ring 18 is engaged with the inner helicoid 22a of the stationary barrel 22. The helicoid ring 18 can move in the optical axis direction while rotating relative to the inner helicoid 22a while being guided by the outer helicoid 18a and the inner helicoid 22a. The helicoid ring 18 is provided on an outer peripheral surface thereof with a set of three guide projections 18b. Upon the helicoid ring 18 advancing to a predetermined forward position, the set of three guide projections 18b enter the circumferential groove 22b. Thereupon, the helicoid ring 18 only rotates about the imaging optical axis Z1, i.e., without moving in the optical axis direction relative to the stationary barrel 22. The stationary barrel 22 is provided on an inner peripheral surface thereof with a set of three lead grooves 22c which are communicatively connected to the circumferential groove 22b and extend parallel to threads of the inner helicoid 22a. The set of three guide projections 18b of the helicoid ring 18 remain engaged in the set of three lead grooves 22c, respectively, during the time the inner helicoid 22a and the outer helicoid 18a are engaged with each other. Both sides of each guide projection 18b are formed as a pair of inclined surfaces parallel to the associated lead groove 22c, and each guide projection 18b is movable along the associated lead groove 22c with the pair of inclined surfaces being in sliding contact with the pair of opposed side walls of the associated lead groove 22c. On the other hand, each of the front and rear surfaces of each guide projection 18b in the optical axis direction is formed as a circumferential flat surface lying in a plane orthogonal to the imaging optical axis Z1, and these front and rear circumferential flat surfaces of each guide projection 18b are prevented from moving in the optical axis direction relative to the opposed side walls (front and rear side walls) of the circumferential groove 22b when each guide projection 18b is positioned in the circumferential groove 22b.

Figure 8:
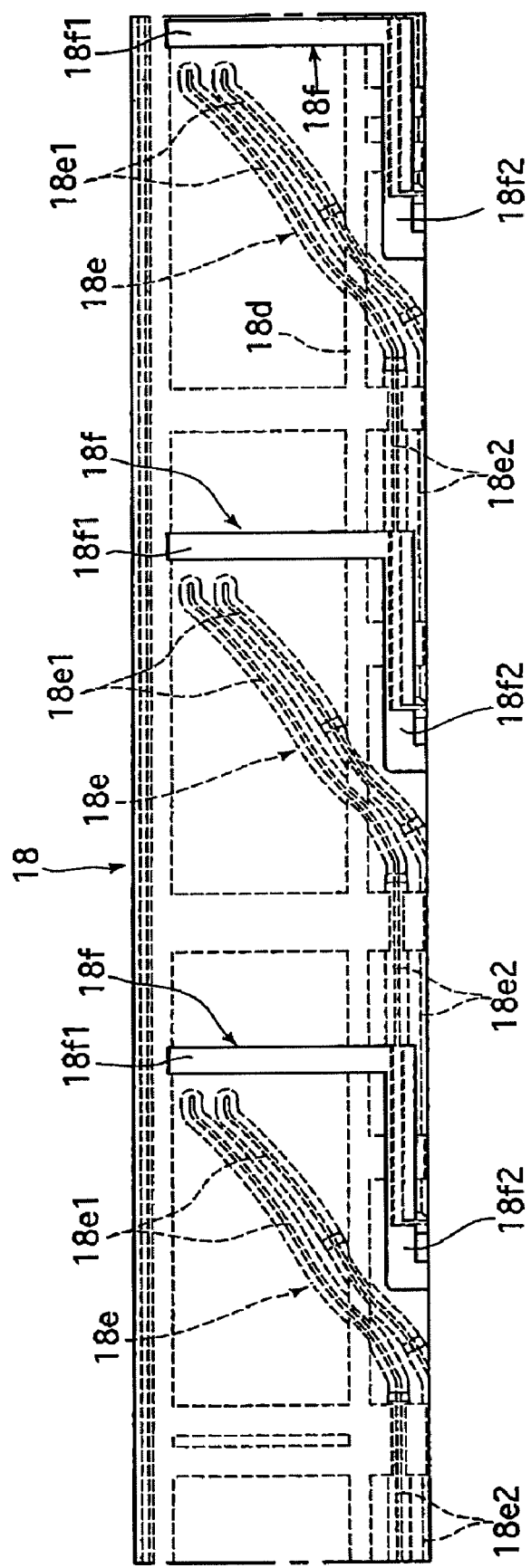
FIG. 8 is a developed plan view of a helicoid ring of the zoom lens barrel, wherein the structure of the inner peripheral surface thereof is transparently shown (by broken lines) for clarity purposes.
Figure 9:
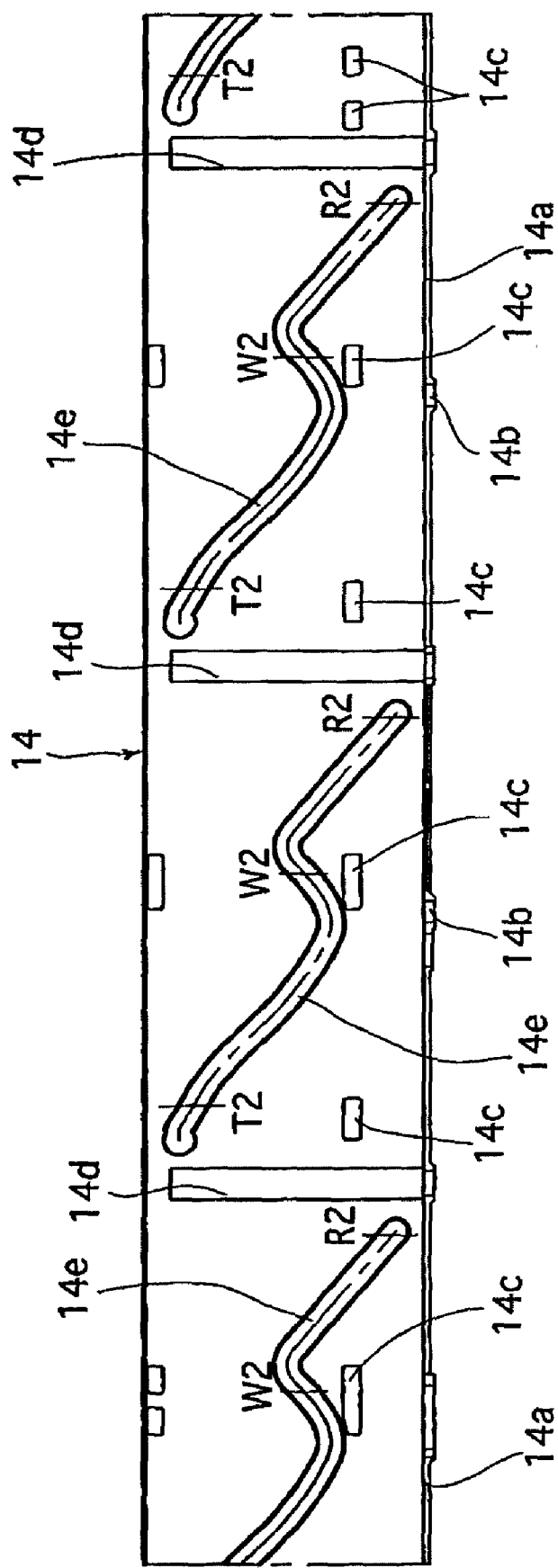
FIG. 9 is a developed plan view of a first linear guide ring of the zoom lens barrel.

The zoom lens 5 is provided with a first linear guide ring (guide ring) 14 which is positioned inside the helicoid ring 18 and supported thereby. FIG. 9 is a developed plan view of the first linear guide ring 14. The first linear guide ring 14 is provided with an annular flange 14a which projects radially outwards from the rear end of the first linear guide ring 14, and is provided on the annular flange 14a with a plurality of linear guide projections 14b which project radially outward from the annular flange 14a. The first linear guide ring 14 is guided linearly in the optical axis direction relative to the stationary barrel 22 via the engagement of the plurality of linear guide projections 14b with a plurality of linear guide groove 22d (only one of which appears in FIGS. 4 and 7) formed on an inner peripheral surface of the stationary barrel 22. As shown in FIG. 7, the front end of each linear guide groove 22d is closed to serve as a limit wall portion 22e and each linear guide groove 22d is open at the rear end. In addition, the first linear guide ring 14 is provided on an outer peripheral surface thereof with a plurality of rotational guide projections 14c, and the helicoid ring 18 is provided on an inner peripheral surface thereof with a circumferential groove 18d (see FIGS. 4 and 8) in which the plurality of rotational guide projections 14c are engaged. Additionally, the annular flange 14a is in contact with the rear end surface of the helicoid ring 18 to be slidable thereon. Accordingly, due to the engagement of the plurality of rotational guide projections 14c with the circumferential groove 18d and the engagement of the annular flange 14a with the rear end surface of the helicoid ring 18, the first linear guide ring 14 and the helicoid ring 18 are coupled to each other to be integrally movable in the optical axis direction while allowing rotation of the helicoid ring 18 relative to the first linear guide ring 14.

The first linear guide ring 14 is provided with a set of three linear guide slots (through-slots) 14d which extend parallel to the imaging optical axis Z1. The zoom lens 5 is provided inside the helicoid ring 18 with a third lens group moving ring (linearly moving ring) 15. The third lens group moving ring 15 is provided at the rear end thereof with an annular flange 15a which projects radially outwards. The third lens group moving ring 15 is guided linearly in the optical axis direction due to the engagement of a set of three linear guide keys 15b which project radially outward from the annular flange 15a of the third lens group moving ring 15 with the set of three linear guide slots 14d of the first linear guide ring 14. Each linear guide slot 14d is formed through the first linear guide ring 14 in a radial direction, and the third lens group moving ring 15 is provided with a plurality of third-lens-group-control cam followers (second followers) 15c which are respectively formed on the linear guide keys 15b and project radially outwards from the set of three linear guide slots 14d, respectively. The plurality of third-lens-group-control cam followers 15c are engaged in a corresponding plurality of third-lens-group guide cam grooves (second cam grooves) 18e formed on an inner peripheral surface of the helicoid ring 18, respectively. The plurality of third-lens-group-control cam followers 15c and the plurality of third-lens-group guide cam grooves 18e are used for moving the third lens group LG3 in the optical axis direction. As shown in FIG. 8 that shows the shape of each third-lens-group guide cam groove 18e in developed plan view, each third-lens-group guide cam groove 18e is provided with a movement-control groove portion 18e1 and a circumferential groove portion 18e2. The movement-control groove portion 18e1 of each third-lens-group guide cam groove 18e is inclined to a plane orthogonal to the imaging optical axis Z1 at a predetermined angle of inclination, which includes a component (axial-direction component) in the axial direction of the helicoid ring 18. The circumferential groove portion 18e2 of each third-lens-group guide cam groove 18e is communicatively connected to the rear end of the movement-control groove portion 18e1 of the associated third-lens-group guide cam groove 18e, lies in a plane orthogonal to the imaging optical axis Z1, and does not include a component in the axial direction of the helicoid ring 18. When the plurality of third-lens-group-control cam followers 15c of the third lens group moving ring 15 are positioned in the movement-control groove portions 18e1 of the plurality of third-lens-group guide cam grooves 18e, respectively, a rotation of the helicoid ring 18 causes the third lens group moving ring 15 that is guided linearly to move in the optical axis direction relative to the helicoid ring 18 and the first linear guide ring 14 in accordance with the contours of the movement-control groove portions 18e1 of the plurality of third-lens-group guide cam grooves 18e. On the other hand, when the plurality of third-lens-group-control cam followers 15c of the third lens group moving ring 15 are positioned in the circumferential groove portions 18e2 of the plurality of third-lens-group guide cam grooves 18e, respectively, the third lens group moving ring 15 does not move in the optical axis direction even if the helicoid ring 18 rotates. The plurality of third-lens-group guide cam grooves 18e are provided as three pairs of cam grooves 18e at three different positions in the circumferential direction of the helicoid ring 18, and each pair of cam grooves 18e includes a front cam groove 18e and a rear cam groove 18e positioned behind the front cam groove 18e in the optical axis direction. In each pair of cam grooves 18e, the circumferential groove portion 18e2 of the rear cam groove 18e is open at the rear end of the helicoid ring 18. To correspond to the plurality of third-lens-group guide cam grooves 18e, the plurality of third-lens-group-control cam followers 15c consist of three pairs of cam followers 15c at three different positions in the circumferential direction of the third lens group moving ring 15, and each pair of cam followers 15c consists of a front cam follower 15c and a rear cam follower 15c positioned behind the front cam follower 15c in the optical axis direction.

Figure 14:
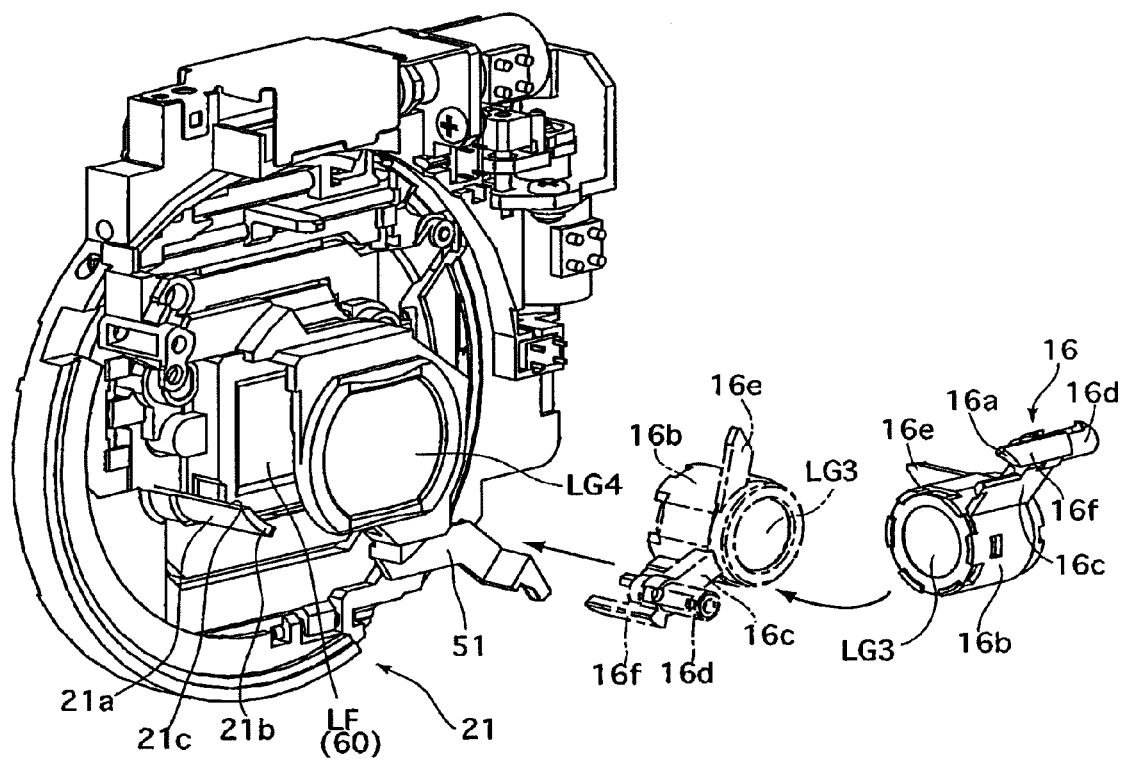
FIG. 14 is a front perspective view of an image sensor holding unit and a third lens group frame of the zoom lens barrel, showing the relative position between the image sensor holding unit and the third lens group frame that is rotated to an off-axis displaced position by a position-control cam bar which projects from the image sensor holding unit.
Figure 15:
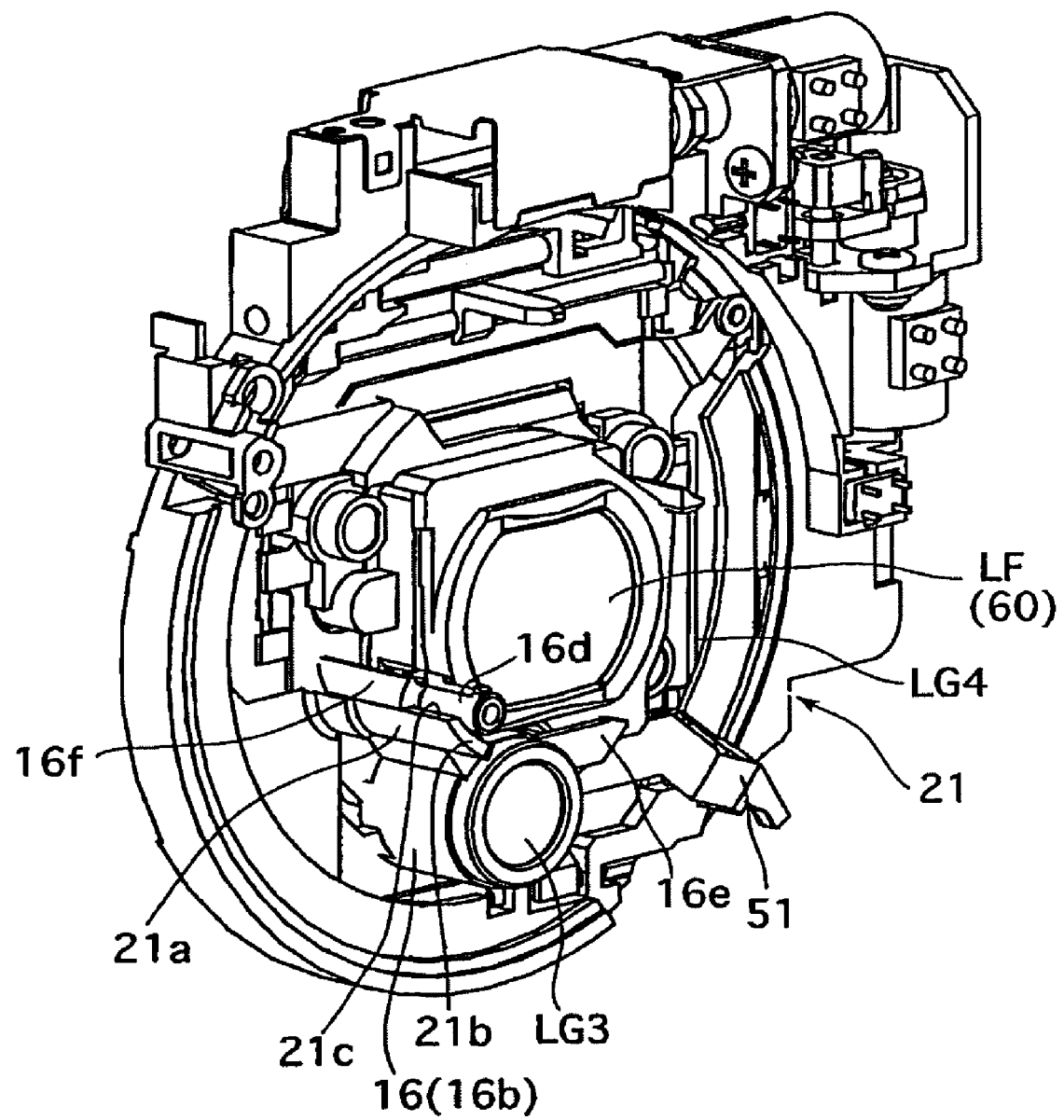
FIG. 15 is a front perspective view of the image sensor holding unit and the third lens group frame shown in FIG. 14, showing a state where the third lens group frame held in the off-axis displaced position relative to the image sensor holding unit has been retracted to the retracted position.

The zoom lens 5 is provided inside the third lens group moving ring 15 with a third lens group frame 16 which is pivoted about a pivot shaft 17 which extends parallel to the imaging optical axis Z1. The third lens group frame 16 holds the third lens group LG3 at a position eccentric to the pivot shaft 17 and the optical axis of the third lens group LG3 extends parallel to the pivot shaft 17. The third lens group frame 16 is rotatable (swingable) about the pivot shaft 17 between an on-axis position (photographing position) shown in FIGS. 2, 3, 17, 19 and 20 at which the optical axis (center) of the third lens group LG3 coincides with the imaging optical axis Z1, and an off-axis displaced position (radially retracted away from the imaging optical axis Z1) shown in FIGS. 1, 15, 18 and 22 at which the optical axis of the third lens group LG3 is eccentrically positioned with respect to the imaging optical axis Z1. The third lens group frame 16 is biased to rotate in a direction toward the on-axis position by a torsion spring 39 and held in the on-axis position by a stopper mechanism which will be discussed later. On the other hand, a rearward movement (movement from a forward position toward a rearward position) of the third lens group moving ring 15 in the optical axis direction causes the third lens group frame 16 to come into contact with a position-control cam bar (retracting device) 21a which projects forward from the image sensor holding unit 21, and a further rearward movement of the third lens group moving ring 15 in the optical axis direction causes the third lens group frame 16 to rotate to the off-axis displaced position against the biasing force of the torsion spring 39. More specifically, as shown in FIG. 14, a retracting cam surface 21b having a predetermined degree of inclination relative to the optical axis direction is formed on a front end surface of the position-control cam bar 21a, and a cam surface 16a which faces the retracting cam surface 21b when the third lens group frame 16 is in the on-axis position is formed on the third lens group frame 16. Upon the third lens group moving ring 15 coming near to the image sensor holding unit 21 while moving rearward, the retracting cam surfaces 21b and 16a come into contact with each other so that a component force which rotates the third lens group frame 16 is produced from the rearward moving force in the optical axis direction, thus displacing the third lens group frame 16 to the off-axis displaced position. As shown in FIG. 15, the third lens group frame 16 (the third lens group LG3) having been rotated to the off-axis displaced position is accommodated in a lower position where the third lens group frame 16 does not interfere with either the fourth lens group LG4 or the image sensor 60. In addition, the zoom lens 5 is provided inside the third lens group moving ring 15 with a shutter unit 20 which is fixed to the third lens group moving ring 15 to be positioned in front of the third lens group frame 16. Although not shown in the cross sectional views in FIGS. 1 through 3, a shutter and an adjustable diaphragm are incorporated in the shutter unit 20.

Figure 10:
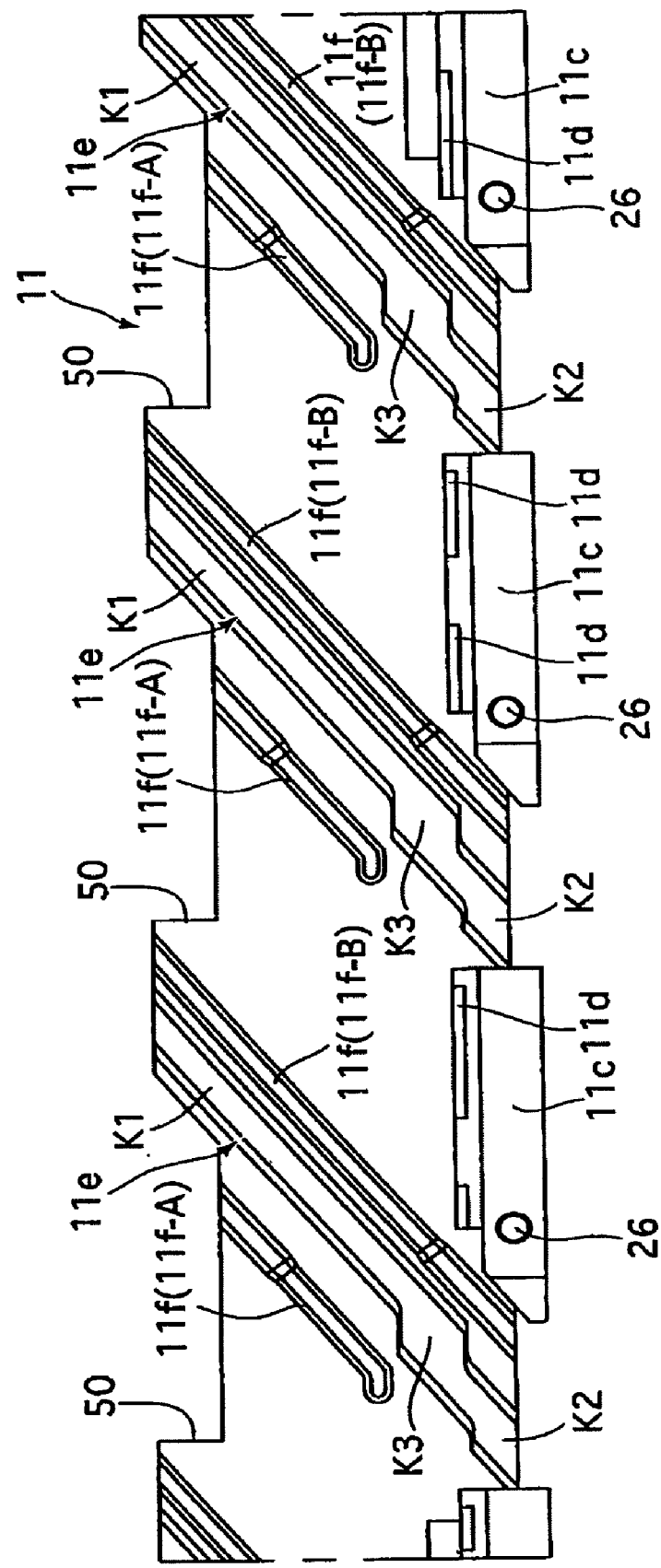
FIG. 10 is a developed plan view of a cam ring of the zoom lens barrel.

As shown in FIG. 9, the first linear guide ring 14 is provided with a set of three roller-guiding cam slots (cam grooves/rotation-direction-position limit cam grooves) 14e which are formed through inner and outer peripheral surfaces of the first linear guide ring 14. The zoom lens 5 is provided radially inside the first linear guide ring 14 with a cam ring (driven ring) 11 (a developed shape of which is shown in FIG. 10) rotatable about the optical axis Z1. A set of three guide rollers (followers) 26 fixed to the cam ring 11 at different circumferential positions thereon to project radially outwards are slidably engaged in the set of three roller-guiding cam slots 14e, respectively. The set of three guide rollers 26 extend radially outwards through the set of three roller-guiding cam slots 14e to be engaged in a set of three roller-engaging grooves 18f which are formed on an inner peripheral surface of the helicoid ring 18, respectively. Although the set of three roller-engaging grooves 18f that are formed on the inner peripheral surface of the helicoid ring 18 are located on the inner surface that should not visible in FIG. 8 (i.e., should be shown with broken lines), that shows a developed plan view of the outer peripheral surface of the helicoid ring 18, the set of three roller-engaging grooves 18f are shown by solid lines for the sake of clarity. As can be understood from FIG. 8, each roller-engaging groove 18*f* is provided with a rotational transfer groove portion (axial grooves) 18*f*1 and a circumferential groove portion 18*f*2. The rotational transfer groove portion 18*f*1 extends parallel to the imaging optical axis Z1 (i.e., includes an axial-direction component), while the circumferential groove portion 18*f*2 is communicatively connected to the rear end of the rotational transfer groove portion 18*f*1 of the associated roller-engaging groove 18*f*, lies in a plane orthogonal to the imaging optical axis Z1 and does not have axial-direction component. When the set of three guide rollers 26 are engaged in the rotational transfer groove portions 18*f*1 of the set of three roller-engaging grooves 18*f*, respectively, a rotational force of the helicoid ring 18 is transferred to the set of three guide rollers 26 via wall surfaces of the rotational transfer groove portion 18*f*1 of each roller-engaging groove 18*f* when the helicoid ring 18 is rotated, and accordingly, the cam ring 11 rotates integrally with the helicoid ring 18 when the helicoid ring 18 is rotated. This rotation of the cam ring 11 causes the cam ring 11 to move in the optical axis direction while rotating relative to the helicoid ring 18 and the first linear guide ring 14 in accordance with the contours of the set of three roller-guiding cam slots 14*e*, in which the set of three guide rollers 26 are engaged, respectively. On the other hand, when the set of three guide rollers 26 are engaged in the circumferential groove portions 18*f*2 of the set of three roller-engaging grooves 18*f*, respectively, no rotational force of the helicoid ring 18 is transferred to the cam ring 11 even if the helicoid ring 18 rotates, because each guide roller 26 moves in the associated circumferential groove portion 18*f*2.

Rotating the zoom gear 28 by the zoom motor 150 in a lens barrel advancing direction causes the helicoid ring 18 to advance while rotating due to the engagement of the inner helicoid 22*a* with the outer helicoid 18*a*. This advancing and rotating movement of the helicoid ring 18 causes the first linear guide ring 14 to move linearly forward with the helicoid ring 18. Upon the helicoid ring 18 and the first linear guide ring 14 being advanced by a predetermined amount of movement, the outer helicoid 18*a* and the inner helicoid 22*a* are disengaged from each other, and the set of three guide projections 18*b* of the helicoid ring 18 are engaged in the circumferential groove 22*b* of the stationary barrel 22, so that the helicoid ring 18 does not move in the optical axis direction relative to the stationary barrel 22 and only rotates at a fixed position in the optical axis direction. Consequently, the first linear guide ring 14, which has advanced in the optical axis direction, is also stopped at a fixed position.

The position of the third lens group moving ring 15 in the optical axis direction, which is guided linearly by the first linear guide ring 14, is controlled by the plurality of third-lens-group guide cam grooves 18*e* of the helicoid ring 18. Namely, when the plurality of third-lens-group-control cam followers 15*c* are positioned in the circumferential groove portions 18*e*2 of the plurality of third-lens-group guide cam grooves 18*e*, respectively, the relative position between the helicoid ring 18 and the third lens group moving ring 15 in the optical axis direction does not vary; however, the absolute position of the third lens group moving ring 15 in the optical axis direction relative to the image sensor holding unit 21 varies in accordance with variations in position of the helicoid ring 18 that is advanced due to the engagement between the outer helicoid 18*a* and the inner helicoid 22*a*. In addition, once the plurality of third-lens-group-control cam followers 15*c* enter the movement-control groove portions 18*e*1 of the plurality of third-lens-group guide cam grooves 18*e*, respectively, a rotation of the helicoid ring 18 causes the third lens group moving ring 15 to move relative to the helicoid ring 18 in the optical axis direction in accordance with the contours of the movement-control groove portions 18*e*1.

The position of the cam ring 11 in the optical axis direction is controlled by the engagement of the set of three roller-guiding cam slots 14*e* of the first linear guide ring 14 with the set of three roller-engaging grooves 18*f* that are formed on an inner peripheral surface of the helicoid ring 18. Namely, when the set of three guide rollers 26 are engaged in the circumferential groove portions 18*f*2 of the set of three roller-engaging grooves 18*f*, respectively, the cam ring 11 does not rotate with the helicoid ring 18, so that the position of the cam ring 11 relative to the helicoid ring 18 in the optical axis direction does not change. However, the absolute position of the cam ring 11 relative to the image sensor holding unit 21 in the optical axis direction varies in accordance with variations in position of the helicoid ring 18 that is advanced due to the engagement between the outer helicoid 18*a* and the inner helicoid 22*a*. Upon the set of three guide rollers 26 entering the rotational transfer groove portions 18*f*1 of the set of three roller-engaging grooves 18*f*, respectively, a rotation of the helicoid ring 18 causes the cam ring 11 to rotate with the helicoid ring 18, thus causing the cam ring 11 to move in the optical axis direction while rotating relative to the first linear guide ring 14 in accordance with the contours of the set of three roller-guiding cam slots 14*e*.

Figure 4:
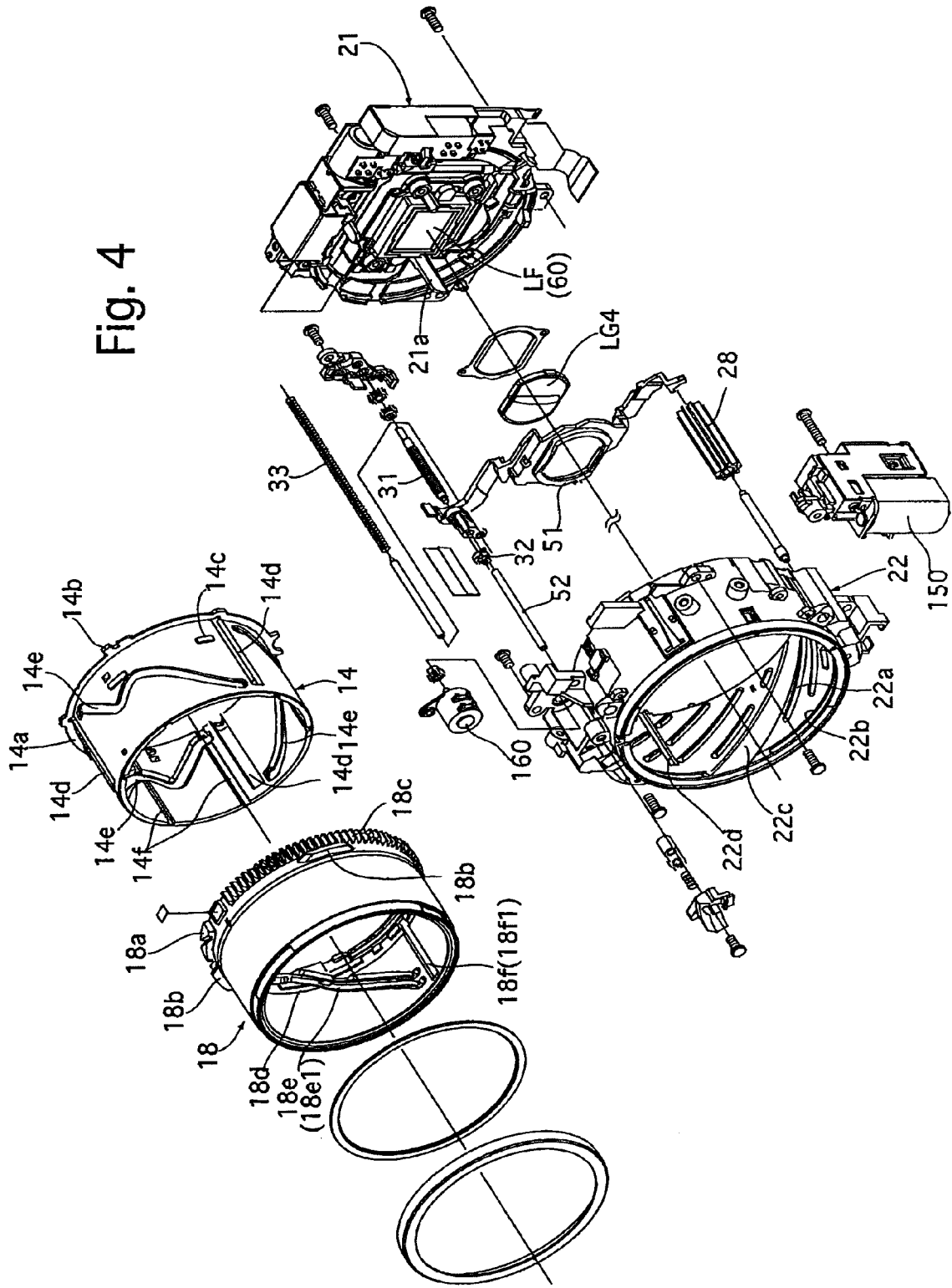
FIG. 4 is an exploded perspective view of a portion of the zoom lens barrel.

As shown in FIG. 4, the linear guide ring 14 is provided on an inner peripheral surface thereof with a plurality of linear guide grooves (bottomed grooves) 14*f* which extend parallel to the imaging optical axis Z1, independently of the set of three linear guide slots 14*d* that are used for guiding the third lens group moving ring 15 linearly in the optical axis direction. The zoom lens 5 is provided inside the first linear guide ring 14 with a second linear guide ring 10 and a middle external barrel (middle advancing barrel) 13, each of which is guided linearly in the optical axis direction by the plurality of linear guide grooves 14*f*. The middle external barrel 13 advances from and retracts into the helicoid ring 18.

The second linear guide ring 10 is provided with a rear end flange 10*a*, a small-diameter flange 10*b* and a pair of guide keys 10*c*. The rear end flange 10*a* is formed in a plane substantially orthogonal to the imaging optical axis Z1, the small-diameter flange 10*b* is positioned in front of the rear end flange 10*a* with a predetermined spacing therebetween, and the pair of guide keys 10*c* project forward from the position of the small-diameter flange 10*a*, to extend parallel to the imaging optical axis Z1. The rear end flange 10*a* is provided with a plurality of linear guide projections 10*d* which project radially outwards. The second linear guide ring 10 can be guided linearly in the optical axis direction in a state in which the plurality of linear guide projections 10*d* being engaged in the plurality of linear guide grooves 14*f* to be slidingly movable therein in the optical axis direction. The cam ring 11 is provided at the rear end thereof with a plurality of rotation guide projections 11*a* (see FIGS. 17 through 22) which project radially inwards and are engaged in between the rear end flange 10*a* and the small-diameter flange portion 10*b* in a manner to be prevented from moving in the optical axis direction relative to the second linear guide ring 10 and to be allowed to rotate relative to the second linear guide ring 10. Due to this engagement, the cam ring 11 and the second linear guide ring 10 are coupled to each other to be rotatable relative to each other and to be movable together in the optical axis direction. The zoom lens 5 is provided inside the cam ring 11 with a second lens group holding ring 8 which holds the second lens group LG2. The pair of guide keys 10*c* of the second linear guide ring 10 are engaged in a pair of linear grooves 8*a*, respectively, which are formed on the second lens group holding ring 8 to extend parallel to the imaging optical axis Z1. Due to the engagement of the pair of guide keys 10c with the pair of linear grooves 8a, the second lens group holding ring 8 is guided linearly in the optical axis direction. The second lens group holding ring 8 is provided on an outer peripheral surface thereof with a set of three second-lens-group-control cam followers 8b (only two of which appear in FIG. 5) which are respectively engaged in a set of three second-lens-group guide cam grooves 11b formed on an inner peripheral surface of the cam ring 11. A rotation of the cam ring 11 causes the second lens group moving ring 8 to move in the optical axis direction due to the engagement of the set of three second-lens-group guide cam grooves 11b with the set of three second-lens-group-control cam followers 8b.

Figure 11:
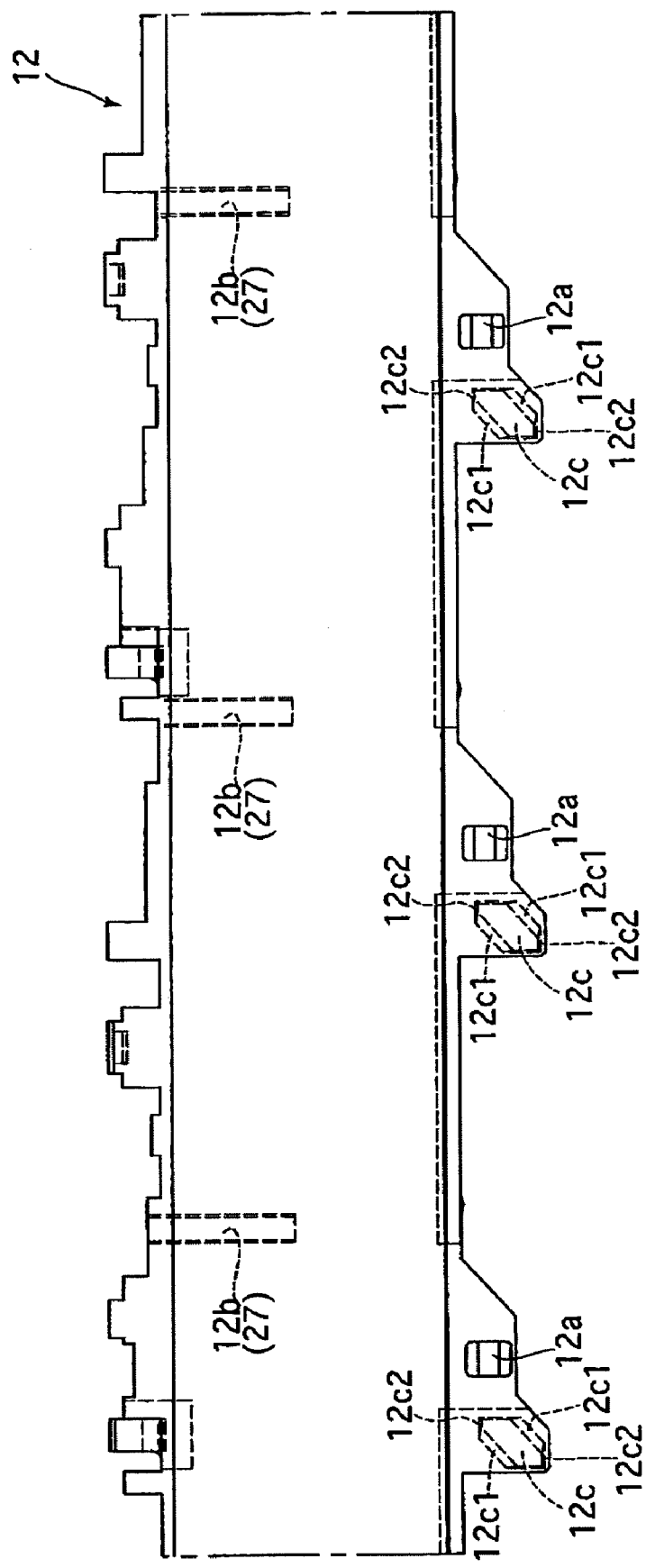
FIG. 11 is a developed plan view of a frontmost external barrel of the zoom lens barrel.

The middle external barrel 13 is provided, on an outer peripheral surface thereof in the vicinity of the rear end of the middle external barrel 13, with an annular flange 13a, and is provided on the annular flange 13a with a plurality of linear guide projections 13b which are slidably engaged in the plurality of linear guide grooves 14f of the first linear guide ring 14, respectively. The middle external barrel 13 is guided linearly in the optical axis direction due to the engagement of the plurality of linear guide projections 13b with the plurality of linear guide grooves 14f. The middle external barrel 13 is provided on an inner peripheral surface thereof with a set of three linear guide grooves 13c which extend parallel to the imaging optical axis Z1, and is provided at the rear end of the inner peripheral surface of the middle external barrel 13 with a plurality of rotation guide projections 13d which project radially inwards. The cam ring 11 is provided, on an outer peripheral surface thereof in the vicinity of the rear end of the cam ring 11, with a rear end flange 11c which projects radially outwards and a small-diameter flange 11d positioned in front of the rear end flange 11c with a predetermined spacing provided therebetween. The radially inner ends (fixed ends) of the set of three guide rollers 26 are embedded into the rear end flange 11c. The plurality of rotation guide projections 13d are engaged in between the rear end flange 11c and the small-diameter flange 11d in a manner to be prevented from moving in the optical axis direction relative to the cam ring 11 and to be allowed to rotate relative to the cam ring 11. Due to this engagement, the cam ring 11 and the middle external barrel 13 are coupled to each other to be rotatable relative to each other and to be movable together in the optical axis direction. The zoom lens 5 is provided immediately inside the middle external barrel 13 with a frontmost external barrel (inner advancing barrel) 12 which advances from and retracts into the middle external barrel 13. The frontmost external barrel 12, a developed shape of which is shown in FIG. 11, is provided on an outer peripheral surface thereof in the vicinity of the rear end of the frontmost external barrel 12 with a set of three linear guide projections 12a which are engaged in the set of three linear guide grooves 13c of the middle external barrel 13. The frontmost external barrel 12 is guided linearly in the optical axis direction due to the engagement of the set of three linear guide projections 12a with the set of three linear guide grooves 13c.

Figure 12:
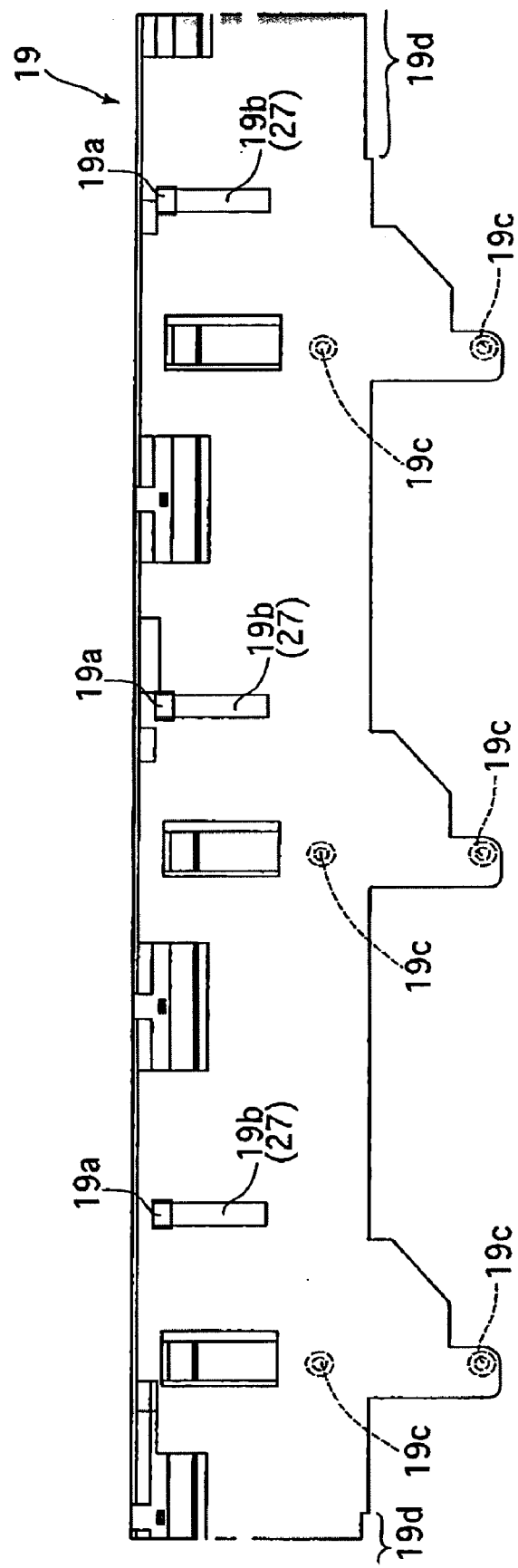
FIG. 12 is a developed plan view of a first lens group holding ring of the zoom lens barrel.

The frontmost external barrel 12 is provided on an inner peripheral surface thereof with a set of three linear guide grooves 12b (see FIG. 11) which are formed to extend parallel to the imaging optical axis Z1. The zoom lens 5 is provided inside the frontmost external barrel 12 with a first lens group holding ring 19 which holds the first lens group LG1. The first lens group holding ring 19, a developed shape of which is shown in FIG. 12, is provided on an outer peripheral surface thereof with a set of three guide projections 19a which are engaged in the set of three linear guide grooves 12b to be movable therein in the optical axis direction, respectively. Due to the engagement of the set of three linear guide grooves 12b with the set of three guide projections 19a, the frontmost external barrel 12 and the first lens group holding ring 19 are coupled to each other in a manner to be prevented from rotating relative to each other and to be allowed to move relative to each other in the optical axis direction. Namely, the first lens group holding ring 19 is also guided linearly in the optical axis direction via the frontmost external barrel 12. The first lens group holding ring 19 is provided on an outer peripheral surface thereof with a set of three linear grooves 19b which extend rearward from the set of three guide projections 19a, respectively. The set of three linear grooves 19b and the set of three linear guide grooves 12b form three spring accommodation spaces 27 in which three first lens group biasing springs 23 are accommodated, respectively. Each of the three first lens group biasing springs 23 is a compression coil spring. The front and rear ends of each first lens group biasing spring 23 are in contact with the associated guide projection 19a and the rear end surface of the associated linear guide groove 12b, respectively.

The frontmost external barrel 12 is provided, on an inner peripheral surface thereof in the vicinity of the rear end of the frontmost external barrel 12, with a set of three lead projections 12c, and the first lens group holding ring 19 is provided on an inner peripheral surface thereof with three pairs of first-lens-group-control cam followers 19c (see FIG. 12). The set of three lead projections 12c are slidably engaged in a set of three first lead cam grooves 11e, respectively, which are formed on an outer peripheral surface of the cam ring 11, while the three pairs of first-lens-group-control cam followers 19c are slidably engaged in three pairs of second lead cam grooves 11f, respectively, which are formed on an outer peripheral surface of the cam ring 11. A rotation of the cam ring 11 causes the set of three lead projections 12c to move along the set of three first lead cam grooves 11e therein while being guided thereby, respectively, thus causing the frontmost external barrel 12 to move in the optical axis direction relative to the cam ring 11. In addition, a rotation of the cam ring 11 causes the three pairs of first-lens-group-control cam followers 19c to move along the three pairs of second lead cam grooves 11f therein while being guided thereby, respectively, thus causing the first lens group holding ring 19 to move in the optical axis direction relative to the cam ring 11.

An advancing operation and a retracting operation of the zoom lens 5 that has the above described structure will be discussed hereinafter. Rotating the zoom gear 28 in the lens barrel advancing direction via the zoom motor 150 from the retracted state (fully-retracted state) of the zoom lens 5 shown in FIG. 1 causes the helicoid ring 18 to move forward while rotating relative to the stationary barrel 22 due to the engagement between the outer helicoid 18a of the helicoid ring 18 and the inner helicoid 22a of the stationary barrel 22. The first linear guide ring 14 moves linearly forward with the helicoid ring 18. Upon being advanced to a predetermined forward position thereof, the helicoid ring 18 and the first linear guide ring 14 both stop moving in the optical axis direction, and thereafter the helicoid ring 18 rotates at an axially fixed position due to the engagement of the set of three guide projections 18b with the circumferential groove 22b.

When the zoom lens 5 is in the retracted state, the plurality of third-lens-group-control cam followers 15c of the third lens group moving ring 15 are positioned in the circumferential groove portions 18e2 of the plurality of third-lens-group guide cam grooves 18e, respectively, and accordingly, each third-lens-group-control cam follower 15c relatively moves in the circumferential groove portion 18e2 of the associated third-lens-group guide cam groove 18*e* for a while from the moment the helicoid ring 18 starts advancing while rotating from the retracted position thereof. Therefore, the relative position between the helicoid ring 18 and the third lens group moving ring 15 in the optical axis direction does not change, while the third lens group moving ring 15 is moved forward in the optical axis direction by an amount of forward movement of the helicoid ring 18 caused by the engagement between the outer helicoid 18*a* of the helicoid ring 18 and the inner helicoid 22*a* of the stationary barrel 22. Subsequently, upon the helicoid ring 18 being rotated at a predetermined angle of rotation in a lens barrel advancing direction, the plurality of third-lens-group-control cam followers 15*c* enter into the movement-control groove portions 18*e*1 of the plurality of third-lens-group guide cam grooves 18*e*, respectively. Thereupon, the third lens group moving ring 15 moves in the optical axis direction relative to the helicoid ring 18 in a predetermined moving manner while being guided by the movement-control groove portions 18*e*1 in accordance with the rotation of the helicoid ring 18. In the zooming range from the wide-angle extremity shown in FIG. 2 to the telephoto extremity shown in FIG. 3, the plurality of third-lens-group-control cam followers 15*c* are guided by the movement-control groove portions 18*e*1 of the plurality of third-lens-group guide cam grooves 18*e*, respectively.

Figure 1:
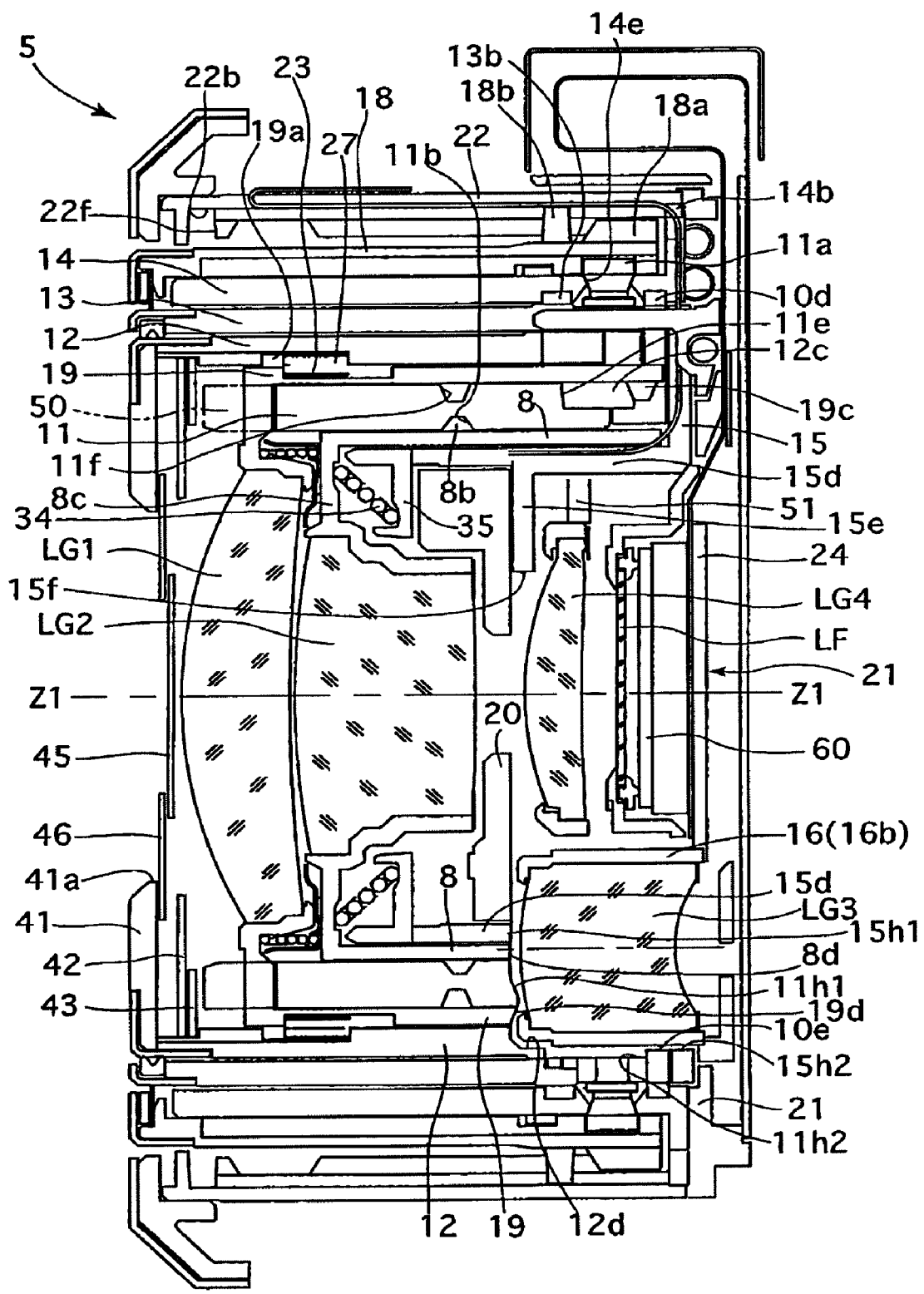
FIG. 1 is a cross sectional view of an embodiment of a zoom lens barrel according to the present invention, showing the zoom lens barrel in the retracted state (fully-retracted state)

In the state shown in FIG. 1, in which the zoom lens 5 is in the retracted state, the third lens group frame 16, which is positioned inside the third lens group moving ring 15, is held at the off-axis displaced position, in which the optical axis of the third lens group LG3 is eccentricity positioned downward with respect to the imaging optical axis Z1, via the position-control cam bar 21*a* that is formed to project forward from the image sensor holding unit 21 (see FIG. 15). During the course of movement of the third lens group moving ring 15 from the retracted position to the wide-angle extremity position in the zooming range, the third lens group frame 16 is disengaged from the position-control cam bar 21*a* of the image sensor holding unit 21 to rotate about the pivot shaft 17 from the off-axis displaced position to the on-axis position, in which the optical axis of the third lens group LG3 coincides with the imaging optical axis Z1, via the spring force of the torsion spring 39. Thereafter, the third lens group frame 16 remains held at the on-axis position until the zoom lens 5 is again retracted to the retracted position (the position shown in FIG. 1).

Additionally, when the zoom lens 5 is in the retracted state, the set of three guide rollers 26 are positioned in the circumferential groove portions 18*f*2 of the set of three roller-engaging grooves 18*f*, respectively, and accordingly, each guide roller 26 relatively moves in the associated circumferential groove portion 18*f*2 for a while from the moment the helicoid ring 18 starts advancing while rotating from the retracted position thereof. Therefore, the relative position between the helicoid ring 18 and the cam ring 11 in the optical axis direction does not change, while the cam ring 11 is moved forward in the optical axis direction by an amount of forward movement of the helicoid ring 18 caused by the engagement between the outer helicoid 18*a* of the helicoid ring 18 and the inner helicoid 22*a* of the stationary barrel 22. At this stage, the cam ring 11 is moved linearly without changing the angular position thereof because the set of three guide rollers 26 are engaged with the rear ends of the set of three roller-guiding cam slots 14*e* to thereby be prevented from rotating. Subsequently, upon the helicoid ring 18 being rotated at a predetermined angle of rotation in a lens barrel advancing direction, the set of three guide rollers 26 enter into the rotational transfer groove portions 18*f*1 of the set of three roller-engaging grooves 18*f*, respectively. Thereupon, the cam ring 11 starts rotating with the helicoid ring 18, and the cam ring 11 is moved in the optical axis direction relative to the helicoid ring 18 and the first linear guide ring 14 in a predetermined moving manner while being guided by the set of three roller-guiding cam slots 14*e* of the first linear guide ring 14. In the zooming range from the wide-angle extremity shown in FIG. 2 to the telephoto extremity shown in FIG. 3, the set of three guide rollers 26 are positioned in the rotational transfer groove portions 18*f*1 of the set of three roller-engaging grooves 18*f*, respectively, so that the cam ring 11 is rotated in association with the helicoid ring 18 whenever the helicoid ring 18 rotates.

Namely, in the advancing operation of the zoom lens 5 from the retracted state, the helicoid ring 18 starts form a advancing rotational state in which the helicoid ring 18 moves forward in the optical axis direction while rotating about the imaging optical axis Z1. Subsequently, the helicoid ring 18 changes to a fixed-position rotational state in which the helicoid ring 18 rotates without changing the position thereof in the optical axis direction. The third lens group moving ring 15 starts from a first linear moving state in which the third lens group moving ring 15 moves forward linearly in the optical axis direction with the helicoid ring 18, and subsequently, the third lens group moving ring 15 changes to a second linear moving state in which the third lens group moving ring 15 changes the position thereof relative to the helicoid ring 18 in the optical axis direction (in which the movement of the third lens group moving ring 15 is controlled by the movement-control groove portions 18*e*1 of the plurality of third-lens-group guide cam grooves 18*e*). The cam ring 11 starts from a linear moving state in which the cam ring 11 moves forward linearly in the optical axis direction with the helicoid ring 18, and subsequently, the cam ring 11 changes to a advancing/retracting rotational state in which the cam ring 11 moves in the optical axis direction relative to the helicoid ring 18 while rotating with the helicoid ring 18 (in which the movement of the cam ring 11 is controlled by the set of three roller-guiding cam slots 14*e* of the first linear guide ring 14). In the ready-to-photograph state of the zoom lens 5 (in the zooming range from the wide-angle extremity shown in FIG. 2 to the telephoto extremity shown in FIG. 3), the helicoid ring 18 is in the fixed-position rotational state, the third lens group moving ring 15 is in the second linear moving state, and the cam ring 11 is in the advancing/retracting rotational state.

A rotation of the earn ring 11 causes the second lens group holding ring 8, which is guided linearly in the optical axis direction via the second linear guide ring 10, to move in the optical axis direction in a predetermined moving manner in the inner side of the cam ring 11 due to the engagement of the set of three second-lens-group guide cam grooves 11*b* with the set of three second-lens-group-control cam followers 8*b*. In addition, this rotation of the cam ring 11 causes the frontmost external barrel 12, that is guided linearly in the optical axis direction via the middle external barrel 13, to move in the optical axis direction in a predetermined moving manner due to the engagement of the set of three lead projections 12*c* with the set of three first lead cam grooves 11*e*, and further causes the first lens group holding frame 19, which is guided linearly in the optical axis direction via the frontmost external barrel 12, to move in the optical axis direction in a predetermined moving manner due to the engagement of the three pairs of first-lens-group-control cam followers 19*c* with the three pairs of second lead cam grooves 11*f*.

Due to the above-described configuration, an axial position of the first lens group LG1 relative to an imaging surface (light-receiving surface) of the image sensor 60 when the first lens group LG1 is moved forward from the retracted position is determined by the sum of the amount of forward movement of the cam ring 11 relative to the stationary barrel 22 and the amount of movement (caused by cam) of the first lens group holding ring 19 relative to the cam ring 11, while an axial position of the second lens group LG2 relative to the imaging surface of the image sensor 60 when the second lens group LG2 is moved forward from the retracted position is determined by the sum of the amount of forward movement of the cam ring 11 relative to the stationary barrel 22 and the amount of movement (caused by cam) of the second lens group holding ring 8 relative to the cam ring 11. An axial position of the third lens group LG3 relative to the imaging surface of the image sensor 60 when the third lens group LG3 is moved forward from the retracted position is determined by the sum of the amount of forward movement of the helicoid ring 18 relative to the stationary barrel 22 and the amount of movement (caused by cam) of the third lens group moving ring 15 relative to the helicoid ring 18. A zooming operation is carried out by moving the first, second and third lens groups LG1, LG2 and LG3 along the imaging optical axis Z1 while changing the air-distances therebetween. When the zoom lens 5 is driven to advance from the fully-retracted position shown in FIG. 1, the zoom lens 5 firstly extends into the state shown in FIG. 2, in which the zoom lens 5 is set at the wide-angle extremity. Subsequently, the zoom lens 5 moves into the state shown in FIG. 3, in which the zoom lens 5 is set at the telephoto extremity as shown in FIG. 3 by a further rotation of the zoom motor 150 in the lens barrel advancing direction.

When the first through fourth lens groups LG1, LG2, LG3 and LG4 are positioned in the zooming range (i.e., in the ready-to-photograph state), a focusing operation is carried out by moving the AF lens frame 51, which holds the fourth lens group LG4, along the imaging optical axis Z1 by rotation of the AF motor 160 in accordance with an object distance.

Driving the zoom motor 150 in the lens barrel retracting direction causes the zoom lens 5 to operate in the reverse manner to the above described advancing operation, i.e., to perform a retracting operation so that each annular movable member of the zoom lens 5 is moved rearward in the optical axis direction. During the course of this retracting movement of the zoom lens 5, the third lens group frame 16 rotates about the pivot shaft 17 to the off-axis displaced position via the position-control cam bar 21a while moving rearward with the third lens group moving ring 15. When the third lens group moving ring 15 is retracted to the retracted position shown in FIG. 1, the third lens group LG3 is retracted into space radially outside the space in which the fourth lens group LG4, the low-pass filter LF and the image sensor 60 are retracted as shown in FIG. 1 (namely, the third lens group LG3 is radially retracted into an axial range substantially identical to an axial range in the optical axis direction in which the fourth lens group LG4, the low-pass filter LF and the CCD image sensor 60 are positioned). This structure of the zoom lens 5 for retracting (displacing) the third lens group LG3 in this manner reduces the length of the zoom lens 5 when the zoom lens 5 is fully retracted.

Figure 29:
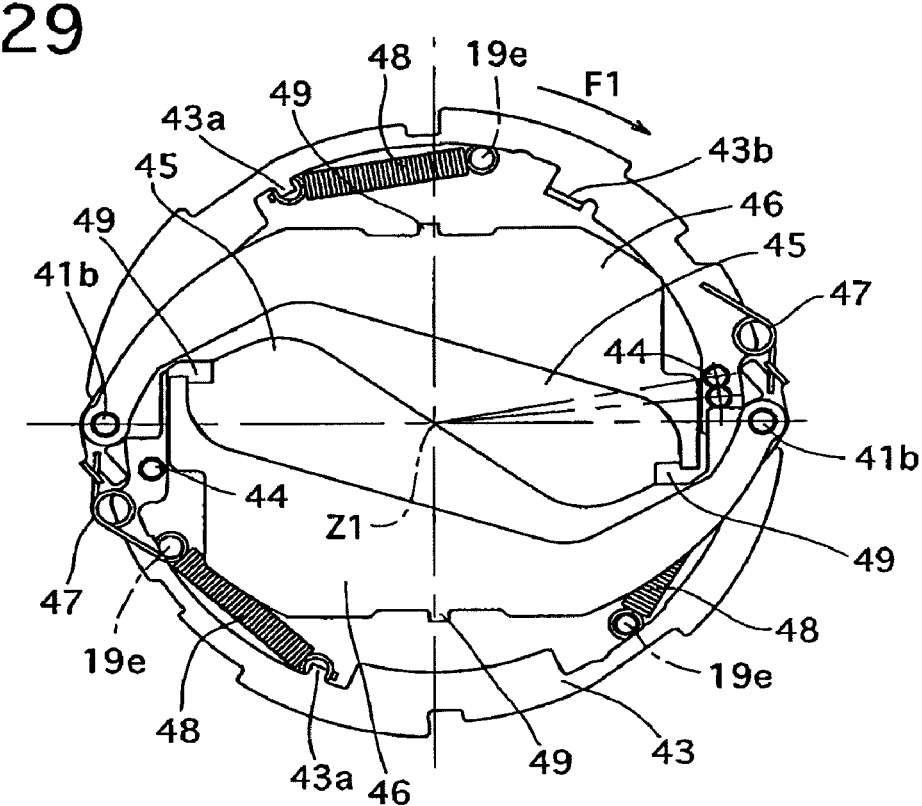
FIG. 29 is a front elevational view of the elements of the lens barrier mechanism shown in FIG. 28, showing a state where barrier blades of the lens barrier mechanism are shut.
Figure 30:
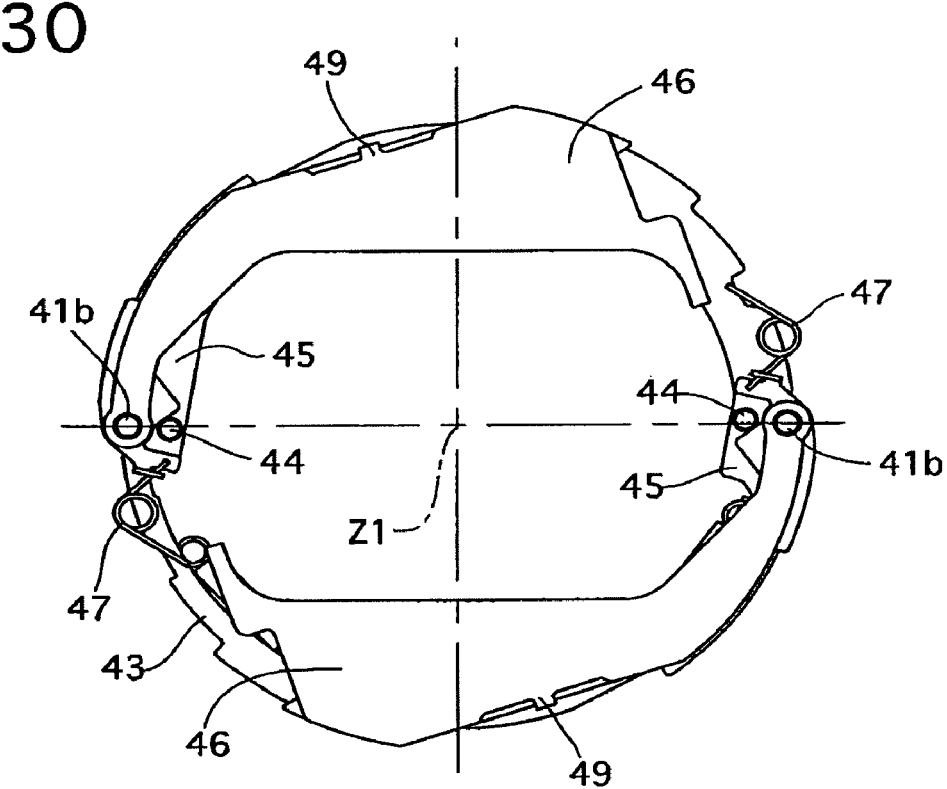
FIG. 30 is a view corresponding to that of FIG. 29, showing a state where the barrier blades of the lens barrier mechanism are fully open.

The zoom lens 5 is provided at the front end thereof with a lens barrier mechanism for shutting the front of the first lens group LG1 when in the retracted state, in which no pictures are taken. The lens barrier mechanism is provided with a barrier mount frame 41, a pair of inner barrier blades 45, a pair of outer barrier blades 46, a pair of torsion springs 47, a barrier retaining plate 42 and a barrier drive ring 43. The barrier mount frame 41 is fixed at the front end of the frontmost external barrel 12 and includes a photographing aperture 41a. The pair of inner barrier blades 45 and the pair of outer barrier blades 46 are supported by the barrier mount frame 41 thereon in a manner to be capable of opening and shutting the photographing aperture 41a. The pair of torsion springs 47 bias the pair of inner barrier blades 45 and the pair of outer barrier blades 46 in directions to shut the photographing aperture 41a. The barrier retaining plate 42 holds the pair of inner barrier blades 45, the pair of outer barrier blades 46 and the pair of torsion springs 47 with these elements being positioned between the barrier mount frame 41 and the barrier retaining plate 42. The barrier drive ring 43 is positioned immediately behind the barrier retaining plate 42 and is supported by the barrier retaining plate 42 in a manner to be capable of rotating about the imaging optical axis Z1 relative to the barrier retaining plate 42. More specifically, the pair of inner barrier blades 45 and the pair of outer barrier blades 46 are pivoted about a pair of pivot pins 41b (see FIGS. 29 and 30) provided on the barrier mount frame 41 to be freely swingable about the pair of pivot pins 41b, respectively, and the pair of inner barrier blades 45 are biased to rotate in directions to shut the photographing aperture 41a by the pair of torsion springs 47. Each of the pair of outer barrier blades 46 is provided on the radially outer edge thereof with a linkage projection 49, and each inner barrier blade 45 and the associated outer barrier blade 46 are linked with each other via the linkage projection 49 thereof in either of the shutter opening and shutting directions.

Figure 6:
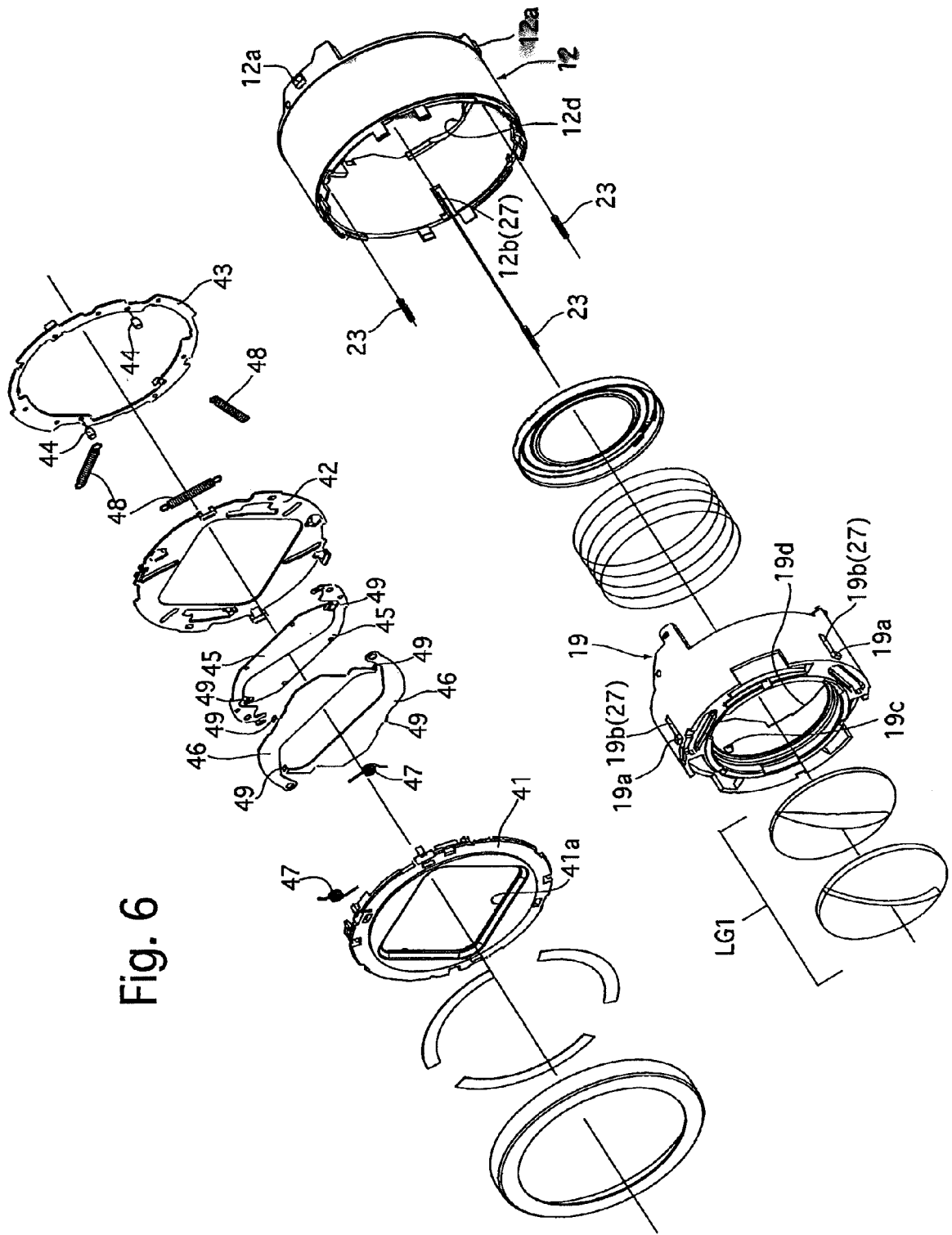
FIG. 6 is an exploded perspective view of another portion of the zoom lens barrel.

The barrier drive ring 43 is provided in the vicinity of the pair of pivot pins 41b with a pair of barrier drive pins 44, respectively, which project forward (see FIG. 6). When the barrier drive ring 43 is rotated in a direction shown by the arrow F1 in FIG. 29, the pair of barrier drive pins 44 come into contact with the pair of inner barrier blades 45, respectively, so that each barrier drive pin 44 applies a force in the barrier opening direction to the associated inner barrier blade 45. The barrier drive ring 43 is biased to rotate in the barrier opening direction (i.e., in the direction of the arrow F1 shown in FIG. 29) by three extension coil springs 48 which are stretched and installed between three spring hooks 43a of the barrier drive ring 43 and three spring hooks 19e of the first lens group holding ring 19, respectively. The spring force of the three extension coil springs 48 is greater than the spring force of the pair of torsion springs 47. When the barrier drive ring 43 is positioned at the limit of rotation thereof (limit of clockwise rotation with respect to FIG. 29) by the biasing force of the three extension coil springs 48, the pair of barrier drive pins 44 press and open the pair of inner barrier blades 45 against the biasing force of the pair of torsion springs 47, thus also opening the pair of outer barrier blades 46 via the linkage projections 49 thereof, respectively (see FIG. 30).

Figure 28:
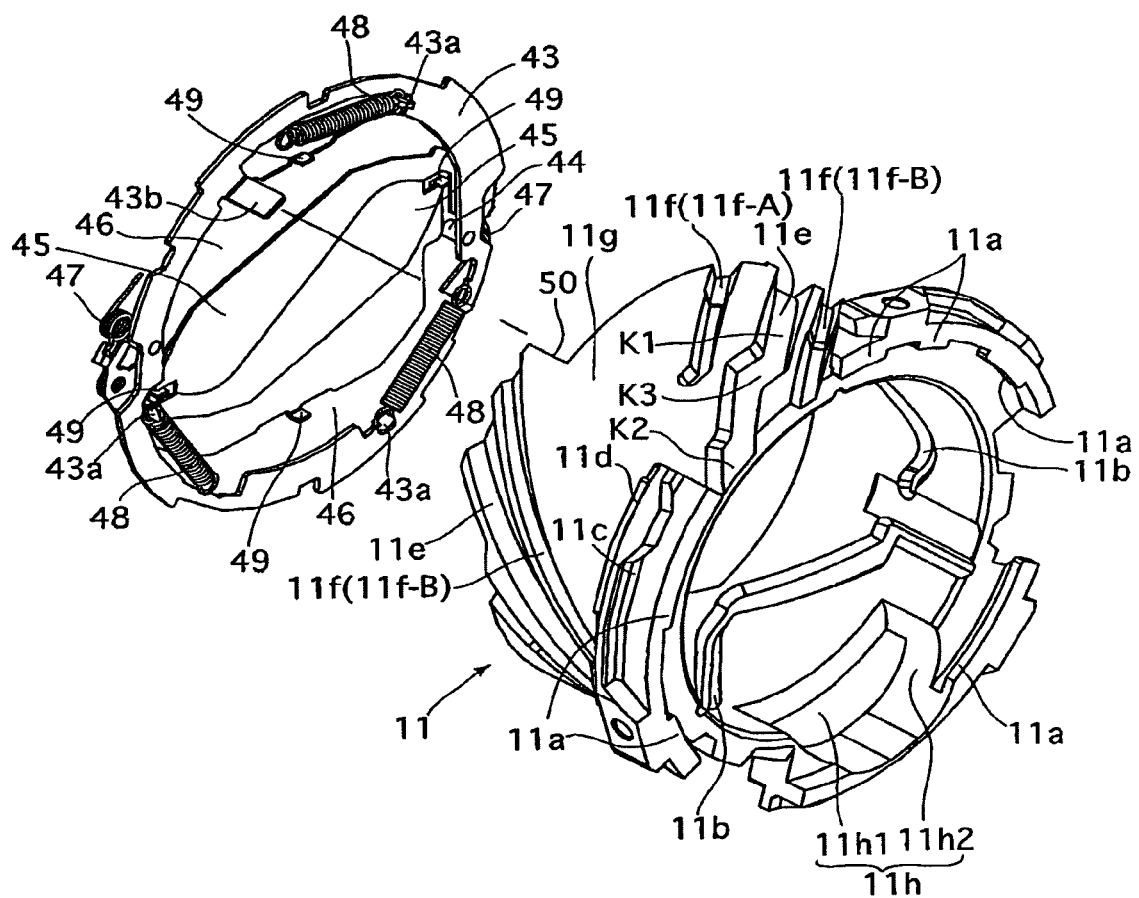
FIG. 28 is a rear perspective view of main elements of a lens barrier mechanism and the cam ring that operates to control the barrier opening/shutting operation of the lens barrier mechanism.

The barrier drive ring 43 is provided with a rotational transfer projection 43b which projects rearward as shown in FIG. 28. The rotational transfer projection 43b is engageable with and disengaged from a rotation-transmitting stepped portion 50 preselected from among three rotation-transmitting stepped portions 50 formed at the front end of the cam ring 11. Since the barrier drive ring 43 is supported to be rotatable at a fixed position in the optical axis direction relative to the frontmost external barrel 12, the relative position between the rotational transfer projection 43b and the specific (preselected) rotation-transmitting stepped portion 50 in the optical axis direction varies when the frontmost external barrel 12 moves linearly in the optical axis direction in accordance with rotation of the cam ring 11 due to the engagement of the set of three lead projections 12c with the set of three first lead cam grooves 11e. The rotational transfer projection 43b is not engaged with the specific (preselected) rotation-transmitting stepped portion 50 in the zooming range from the wide-angle extremity to the telephoto extremity. The rotational transfer projection 43b and the specific (preselected) rotation-transmitting stepped portion 50 come into engagement with each other at a point during the retracting operation of the zoom lens 5 from the wide-angle extremity to the retracted position. Thereupon, a forced-rotation force in a direction opposite to the direction of the biasing force of the three extension coil springs 48 is transmitted to the rotational transfer projection 43b from the specific (preselected) rotation-transmitting stepped portion 50. When the barrier drive ring 43 is rotated to the other limit of rotation (limit of counterclockwise rotation with respect to FIG. 29) against the biasing force of the three extension coil springs 48, the pair of barrier drive pins 44 are disengaged from the pair of inner barrier blades 45 to shut the pair of inner barrier blades 45 by the biasing force of the pair of torsion springs 47, thus also shutting the pair of outer barrier blades 46 via the linkage projections 49 thereof, respectively. Consequently, the photographing aperture 41a is shut (closed) (see FIGS. 1, 29 and 32). Conversely, when the zoom lens 5 moves into the zooming range from the retracted position, the rotational transfer projection 43b is disengaged from the specific (preselected) rotation-transmitting stepped portion 50 so that the barrier drive ring 43 rotates in the barrier opening direction by the biasing force of the three extension coil springs 48, and consequently, the pair of barrier drive pins 44 press and open the pair of inner barrier blades 45, thus also opening the pair of outer barrier blades 46 via the interlock projections 29 thereof, respectively. Accordingly, the pair of inner barrier blades 45 and the pair of outer barrier blades 46 are opened and shut by clockwise and counterclockwise rotations of the barrier drive ring 43, and the barrier drive ring 43 rotates via the cam ring 11 in a direction to shut the pair of inner barrier blades 45 and the pair of outer barrier blades 46. As shown in FIG. 10, the three rotation-transmitting stepped portions 50 of the cam ring 11 are arranged at substantially equi-angular intervals of 120 degrees, and one rotation-transmitting stepped portion 50 to be used for controlling the rotation of the barrier drive ring 43 can be freely selected from among the three rotation-transmitting stepped portions 50 upon the lens barrier mechanism being installed into the front end of the zoom lens 5.

The zoom lens 5 is provided between the second lens group LG2 and the third lens group LG3 with an inter-lens-group biasing spring 34. The second lens group holding ring 8 is provided in the vicinity of the front end thereof with a ring-shaped inner flange 8c, and a spring support ring 35 is fixed to the third lens group moving ring 15 so as to face the inner flange 8c. The spring support ring 35 is fixed at the front end of the third lens group moving ring 15 to support the shutter unit 20 onto the third lens group moving ring 15. The inter-lens-group biasing spring 34 is a truncated-conical compression coil spring the diameter of which reduces in the rearward direction from the front in the optical axis direction. The inter-lens-group biasing spring 34 is installed between the inner flange 8c and the spring support ring 35 in a compressed fashion to increase the distance between the second lens group LG2 and the third lens group LG3 with the front and rear ends of the inter-lens-group biasing spring 34 being in contact with the inner flange 8c of the second lens group holding ring 8 and the spring support ring 35, respectively.

FIG. 13 shows a biasing force transfer mechanism, using the inter-lens-group biasing spring, 34 when the zoom lens 5 is set at the wide-angle extremity in the ready-to-photograph state. The second lens group holding ring 8 is biased forward by the inter-lens-group biasing spring 34, so that the set of three second-lens-group-control cam followers 8b are pressed against the front side walls in the set of three second-lens-group guide cam grooves 11b, respectively. This causes the cam ring 11 to be pressed forward, thus causing the set of three guide rollers 26 that project from the cam ring 11 to be pressed against the front side walls in the set of three roller-guiding cam slots 14e, respectively, that are formed on the first linear guide ring 14. Furthermore, the first linear guide ring 14 is pressed forward via the set of three guide rollers 26, while the plurality of linear guide projections 14b that are formed in the vicinity of the rear end of the first linear guide ring 14 are pressed against the plurality of limit wall portions 22e of the stationary barrel 22, which are formed at the front ends of the plurality of linear guide groove 22d, respectively. Namely, the zoom lens 5 is configured so that the biasing force of the inter-lens-group biasing spring 34 is transferred from the second lens group holding ring 8 to the first linear guide ring 14 via the cam ring 11 (wherein the second lens group holding ring 8, the cam ring 11 and the first linear guide ring 14 are elements of a cam mechanism (position control mechanism) for controlling the position of the second lens group LG2 in the optical axis direction), and so that backlash in the cam mechanism provided between these annular members is eliminated while the biasing force of the inter-lens-group biasing spring 34 is ultimately received by the plurality of limit wall portions 22e of the stationary barrel 22 that is a stationary member of the zoom lens 5.

The third lens group moving ring 15 is biased rearward by the inter-lens-group biasing spring 34, so that the plurality of third-lens-group-control cam followers 15c are pressed against the rear side walls in the plurality of third-lens-group guide cam grooves 18e of the helicoid ring 18, respectively. This causes the helicoid ring 18 to be pressed rearward, thus causing the set of three guide projections 18b that project from the helicoid ring 18 to be pressed against a limit wall portion 22f that corresponds to the rear side wall in the circumferential groove 22b. Namely, the zoom lens 5 is configured so that the biasing force of the inter-lens-group biasing spring 34 is transferred from the third lens group moving ring 15 to the helicoid ring 18 (wherein the third lens group moving ring 15 and the helicoid ring 18 are elements of a cam mechanism (position control mechanism) for controlling the position of the third lens group LG3 in the optical axis direction), and so that backlash in the cam mechanism provided between these annular members is eliminated while the biasing force of the inter-lens-group biasing spring 34 is ultimately received by the limit wall portion 22f of the stationary barrel 22 that is a stationary member of the zoom lens 5.

FIG. 7 shows the positions "R1", "W1" and "T1" of each guide projection 18b of the helicoid ring 18 when the zoom lens 5 is in the retracted state, set at the wide-angle extremity and set at the telephoto extremity, respectively. In addition, FIG. 7 shows the positions "14b-R" and "14b-Z" of each linear guide projection 14b of the first linear guide ring 14 when the zoom lens 5 is in the retracted state and the ready-to-photograph state in the zooming range (between the wide-angle extremity and the telephoto extremity), respectively. As can be understood from FIG. 7, in the retracted state of the zoom lens 5, each linear guide projection 14b is positioned in the vicinity of the rear end of the associated linear guide groove 22d while each guide projection 18b is positioned in the associated lead groove 22c, so that the linear guide projections 14b are not in contact with the associated limit wall portion 22e of the stationary barrel 22 and the guide projections 18b are not in contact with the associated limit wall portion 22f of the stationary barrel 22. When the zoom lens 5 moves from the retracted state into the zooming range, each linear guide projection 14b is moved to the front end of the associated linear guide groove 22d, each guide projection 18b enters the circumferential groove 22b, and each linear guide projection 14b and each guide projection 18b are pressed against the associated limit wall portion 22e and the limit wall portion 22f by the biasing force of the inter-lens-group biasing spring 34, respectively. Accordingly, when the zoom lens 5 moves from the retracted state into the ready-to-photograph state, a backlash eliminating mechanism with each of the limit wall portions 22e and 22f that serves as a biasing force support comes into action. In the retracted state of the zoom lens 5, in which no pictures are taken, no problem arises even if the zoom lens 5 is structured so that neither of the limit wall portions 22e and 22f receives the biasing force of the inter-lens-group biasing spring 34 because accuracy control for the positions of the second lens group LG2 and the third lens group LG3 in the optical axis direction is not required to be so precise as that in the ready-to-photograph state.

In this manner, simplification of the backlash eliminating mechanism with less number of elements and with no need of a great number of spring members is achieved since backlash between all the associated members is eliminated with the single inter-lens-group biasing spring 34 on each of the two cam mechanisms, i.e., the cam mechanism for controlling the position of the second lens group LG2 in the optical axis direction and the cam mechanism for controlling the position of the third lens group LG3 in the optical axis direction.

On the stationary barrel 22, the limit wall portion 22f, which ultimately receives a rearwardly pressing force applied to the third lens group LG3 (positioned behind the second lens group LG2), is formed at a forward position of the stationary barrel 22 with respect to each limit wall portion 22e, which ultimately receives a forwardly pressing force applied to the second lens group LG2 (positioned in front of the third lens group LG3), in the optical axis direction. In other words, each limit wall portion 22e provided at a relatively rearward position receives a forwardly pressing force of the inter-lens-group biasing spring 34, and the limit wall portion 22f provided at a relatively forward position receives a rearwardly pressing force of the inter-lens-group biasing spring 34, and hence, the limit wall portions 22e and 22f are positioned on the stationary barrel 22 in a 'reversed' manner with respect to the forward/rearward biasing directions of the inter-lens-group biasing spring 34 in the optical axis direction. Due to this arrangement, the biasing force of the inter-lens-group biasing spring 34 acts on the second lens group holding ring 8 and the third lens group moving ring 15 in directions to cause the second lens group holding ring 8 and the third lens group moving ring 15 to move away from each other while the biasing force of the inter-lens-group biasing spring 34 acts on the first linear guide ring 14 and the helicoid ring 18 in directions to make the plurality of linear guide projections 14b and the set of three guide projections 18b approach each other on the stationary barrel 22, and the direction of action of the biasing force of the inter-lens-group biasing spring 34 is ultimately reversed and input (applied) to the stationary barrel 22. By adopting this structure, compression loads act on a portion of the stationary barrel 22 between each limit wall portion 22e and the limit wall portion 22f. Since synthetic resin which is widely used as a material for elements of a lens barrel has a relatively high compression load strength, the zoom lens 5 is easily miniaturized by providing each limit wall portion 22e and the limit wall portion 22f close to each other by adopting the aforementioned structure in which compression loads act on a portion of the stationary barrel 22 between each limit wall portion 22e and the limit wall portion 22f.

Figure 16:
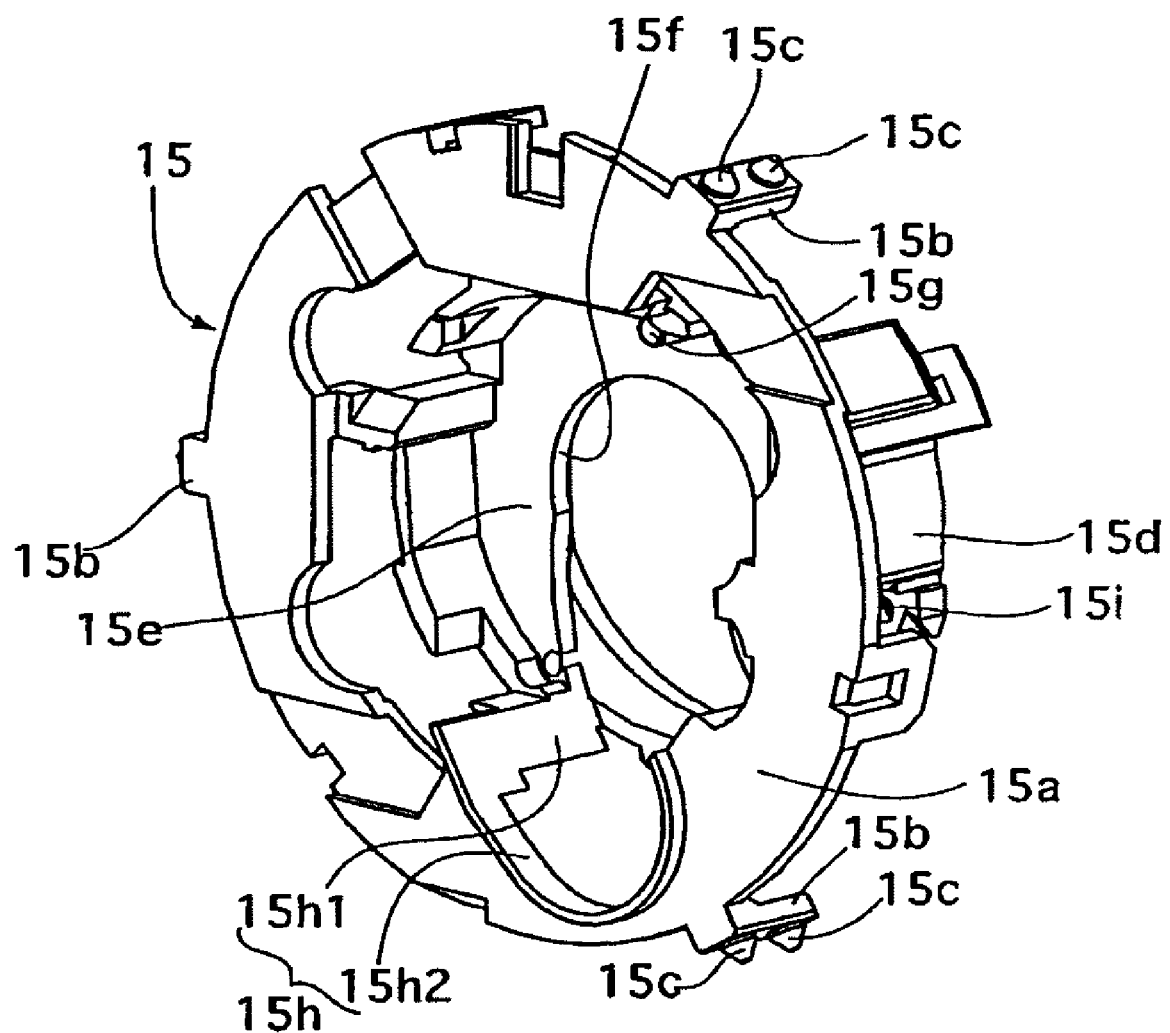
FIG. 16 is a rear perspective view of a third lens group moving ring of the zoom lens barrel.

The accommodating structure for the third lens group LG3 will be discussed hereinafter. As shown in FIG. 16, the third lens group moving ring 15 is provided in front of the annular flange 15a with a cylindrical portion 15d, and is provided inside the cylindrical portion 15d with a middle flange 15e which extends radially inwards to be substantially parallel to the annular flange 15a. The third lens group moving ring 15 is further provided at the center of the middle flange 15e with a through hole 15f which is formed through the middle flange 15e in the optical axis direction. The shutter unit 20 is fixed to the front of the middle flange 15e. The middle flange 15e is provided on the back thereof with a rotation limit pin 15g which projects rearward. The third lens group moving ring 15 is provided, on the radially opposite side of the axis of the third lens group moving ring 15 from the rotation limit pin 15g, with an accommodation space 15h. The accommodation space 15h includes a through-hole portion 15h1 and a semi-circular recessed portion 15h2. The through-hole portion 15h1 is communicatively connected with the through hole 15f and extends through the cylindrical portion 15d in a radial direction of the third lens group moving ring 15. The semi-circular recessed portion 15h2 is communicatively connected with the through-hole portion 15h1 and formed in a manner to cut out part of the radially inner part of the annular flange 15a. One end (front end) of the pivot shaft 17, about which the third lens group frame 16 is pivoted, is supported by a shaft bearing hole 15i (see FIG. 16) formed on the third lens group moving ring 15, and the other end (rear end) of the pivot shaft 17 is supported by a shaft support member 24 (see FIG. 5). The shaft support member 24 is fixed to the third lens group moving ring 15 by a set screw 25.

As shown in FIG. 14, the third lens group frame 16 is provided with a cylindrical lens holder 16b, a swing arm 16c, a pivoted cylindrical portion 16d, and an engaging protrusion 16e. The cylindrical lens holder 16b holds the third lens group LG3. The swing arm 16c extends in a radial direction of the cylindrical lens holder 16b and connects to the pivoted cylindrical portion 16d. The engaging protrusion 16e extends from the cylindrical lens holder 16b in a direction different from the direction of extension of the swing arm 16c. The pivoted cylindrical portion 16d is provided with a bearing hole (through-hole) which extends in a direction parallel to the optical axis of the third lens group LG3. The pivot shaft 17 is inserted into this bearing hole. The third lens group frame 16 is provided in the vicinity of the pivoted cylindrical portion 16d with a cam engaging projection 16f which is positioned eccentrically with respect to the axis of the pivot shaft 17, and the aforementioned cam surface 16a is formed at the rear end of the cam engaging projection 16f. The third lens group frame 16 is supported by the third lens group moving ring 15 therein so that the major portion of the cylindrical lens holder 16b is positioned in the space immediately behind the middle flange 15e, and only the front end of the cylindrical lens holder 16b is positioned (inserted) in the through hole 15f (see FIGS. 2 and 3).

According to the above described structure, the third lens group frame 16 can rotate about the pivot shaft 17 in a pre-determined range of rotation relative to the third lens group moving ring 15. More specifically, the rotational range of the third lens group frame 16 ranges between an upward movement limit (see FIGS. 17, 19 and 20) at which the engaging protrusion 16e comes in contact with the rotation limit pin 15g and a downward movement limit (see FIGS. 18, 21 and 22) positioned below the upward movement limit. Since the pivot shaft 17 extends parallel to the imaging optical axis Z1, the third lens group LG3 moves in the space immediately behind the middle flange 15e by a rotation of the third lens group frame 16 with the axis of the third lens group LG3 maintaining parallel to the imaging optical axis Z1.

As shown in FIG. 15, the position-control cam bar 21a is formed on the image sensor holding unit 21 to project forward at a position not interfering with the AF lens frame 51. When the AF lens frame 51 moves to the rear movement limit (rearmost position) thereof, the front end of the position-control cam bar 21a projects further forward from the AF lens frame 51. The retracting cam surface 21b having a predetermined degree of inclination relative to the imaging optical axis Z1 is formed at the front end of the position-control cam bar 21a as described above, and the position-control cam bar 21a is provided along a side edge thereof with a displaced-position holding surface 21c which extends rearward from the retracting cam surface 21b in a direction parallel to the imaging optical axis Z1.

Operations of the third lens group LG3 and other associated elements, which are supported by the above described accommodating structure, will be hereinafter discussed. As described above, the position of the third lens group moving ring 15 with respect to the image sensor holding unit 21 in the optical axis direction is determined by a combination of the forward/rearward movement of the third lens group moving ring 15 by the cam diagrams of the plurality of third-lens-group guide cam grooves 18e and the forward/rearward movement of the helicoid ring 18 itself. However, in the retracted state of the zoom lens 5, the plurality of third-lens-group-control cam followers 15c of the third lens group moving ring 15 are positioned in the circumferential groove portions 18e2 of the plurality of third-lens-group guide cam grooves 18e, respectively, so that the plurality of third-lens-group-control cam followers 15c move forward, integrally with the helicoid ring 18 in the optical axis direction, without moving relative to the helicoid ring 18 in the optical axis direction, even if the helicoid ring 18 rotates in a lens barrel advancing direction. Thereafter, when the helicoid ring 18 comes into the aforementioned fixed-position rotational state, in which the helicoid ring 18 rotates without changing the position thereof in the optical axis direction, the plurality of third-lens-group-control cam followers 15c are guided by the plurality of third-lens-group guide cam grooves 18e of the helicoid ring 18 to move further forward. In short, the third lens group moving ring 15 is positioned in a front position where the third lens group moving ring 15 is at a sufficient distance forward from the image sensor holding unit 21 when the zoom lens 5 is set at or near the telephoto extremity as shown in FIG. 3; the third lens group moving ring 15 is positioned closer to the image sensor holding unit 21 than when the zoom lens 5 is set at the telephoto extremity but still positioned some distance away from the image sensor holding unit 21 when the zoom lens 5 is set at the wide-angle extremity as shown in FIG. 2; and the third lens group moving ring 15 is positioned closest to the image sensor holding unit 21 when the zoom lens 5 is in the retracted state as shown in FIG. 1. The third lens group LG3 is displaced from (radially retracted away from) the imaging optical axis Z1 by utilizing the retracting rearward movement of the third lens group moving frame 15 from a position in the zooming range (specifically the wide-angle extremity position) to the radially retracted position (rearmost position).

Figure 19:
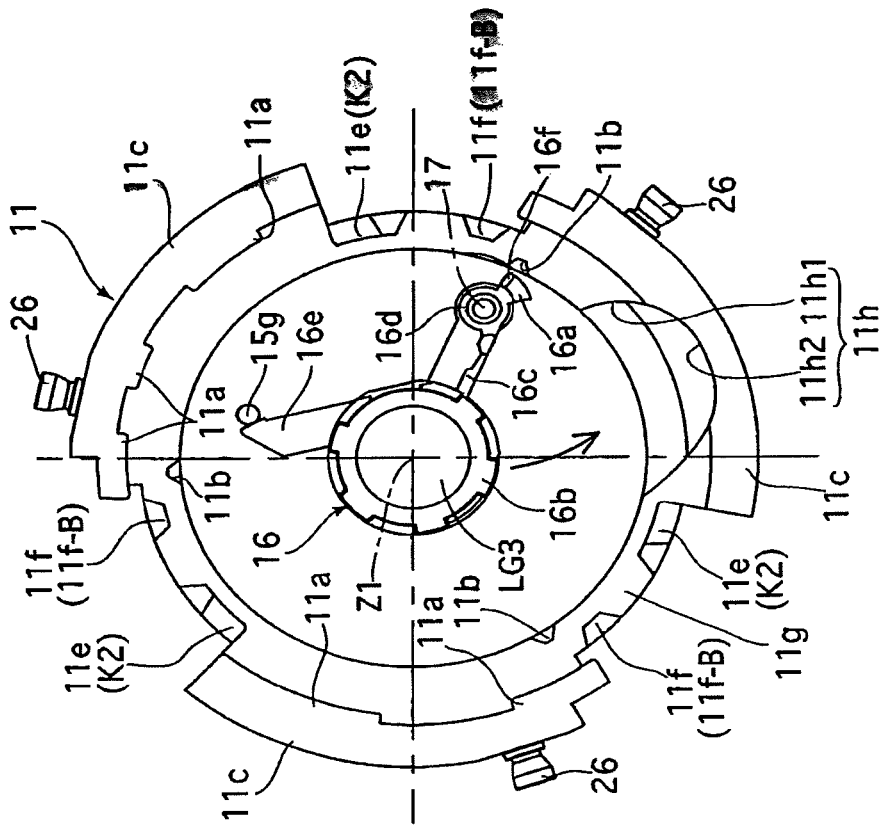
FIG. 19 is a rear elevational view of the third lens group moving ring and the cam ring when the zoom lens barrel is set at the wide-angle extremity, viewed from the rear in the optical axis direction.
Figure 20:
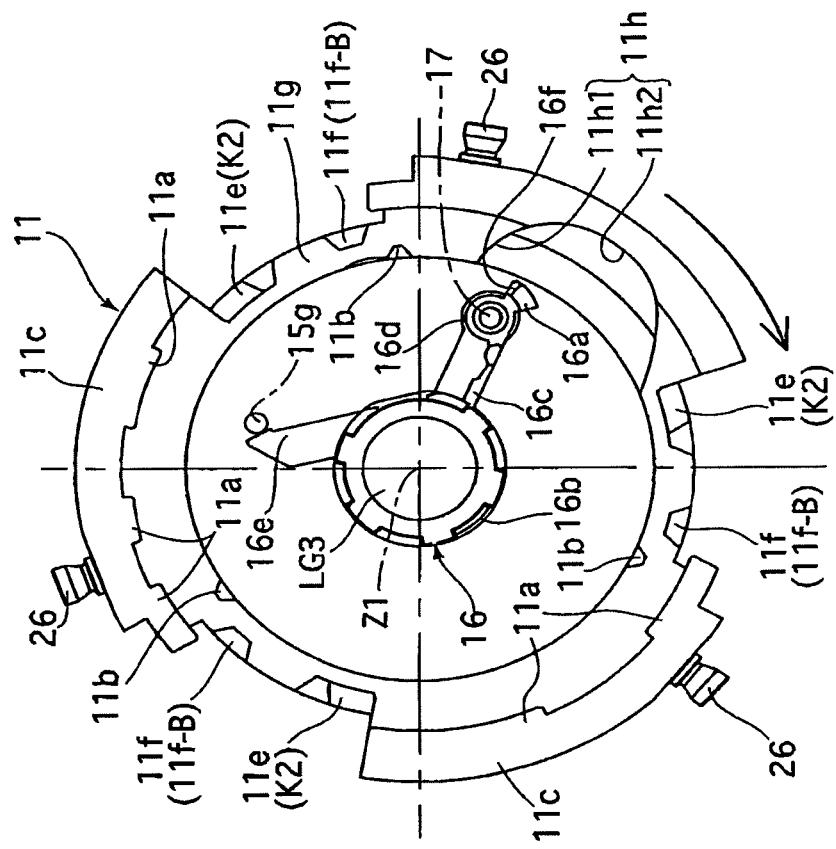
FIG. 20 is a rear elevational view of the third lens group moving ring and the cam ring after the cam ring is rotated in a retracting direction from the ready-to-photograph state of the zoom lens barrel set at the wide-angle extremity, viewed from the rear in the optical axis direction.

In the zooming range between the wide-angle extremity and the telephoto extremity, the third lens group frame 16 is held still at a fixed position by the engagement of the end of the engaging protrusion 16e with the rotation limit pin 15g (see FIGS. 19 and 20). In this state, the optical axis of the third lens group LG3 is coincident with the imaging optical axis Z1 as shown in FIGS. 2 and 3.

Upon the main switch of the digital camera being turned OFF in the ready-to-photograph state of the zoom lens 5, the AF motor 160 is driven in the lens barrel retracting direction to move the AF lens frame 51 rearward, toward the image sensor holding unit 21 to the rear movement limit (retracted position) shown in FIG. 15. At this time, the space between the low-pass filter LF (and the image sensor 60), which is supported by the image sensor holding unit 21, and the fourth lens group LG4, which is supported by the AF lens frame 51, is reduced. In addition, in a state where the AF lens frame 51 is in the rear movement limit, the front end of the position-control cam bar 21a is positioned (projects) in front of the AF lens frame 51 in the optical axis direction.

Figure 21:
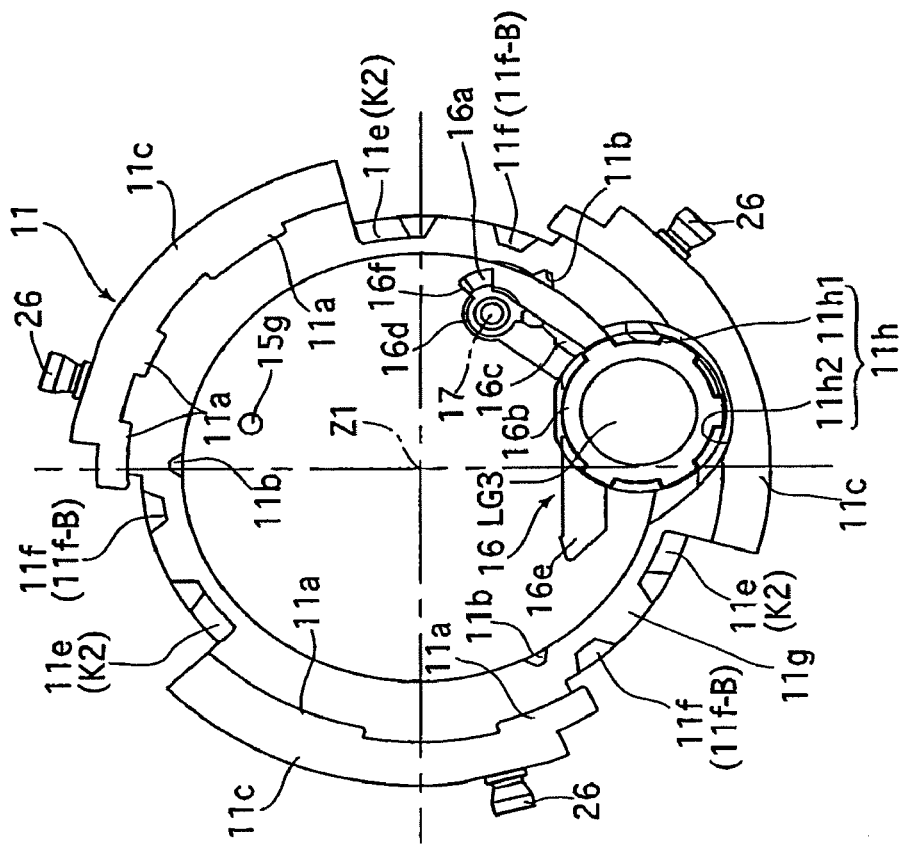
FIG. 21 is a rear elevational view of the third lens group moving ring and the cam ring in a state where the third lens group frame is at a mid-position between the on-axis position and the off-axis displaced position, viewed from the rear in the optical axis direction.

Subsequently, the zoom motor 150 is driven in the lens barrel retracting direction to perform the above described lens barrel retracting operation. When the zoom lens 5 is set at the wide-angle extremity as shown in FIG. 2, the plurality of third-lens-group-control cam followers 15c of the third lens group moving ring 15 are positioned out of the movement-control groove portions 18e1 of the plurality of third-lens-group guide cam grooves 18e and positioned in the circumferential groove portions 18e2, respectively. Upon the zoom motor 150 continuing to drive in the lens barrel retracting direction beyond the wide-angle extremity of the zoom lens 5, the third lens group moving ring 15 moves rearward with the helicoid ring 18 in the optical axis direction, thus approaching the image sensor holding unit 21. The third lens group frame 16 moves rearward with the third lens group moving ring 15, and thereafter, the cam surface 16a comes into contact with the retracting cam surface 21b of the position-control cam bar 21a. The cam surface 16a and the retracting cam surface 21b are formed as lead surfaces which are shaped to generate a component force which rotates the third lens group frame 16 about the pivot shaft 17 counterclockwise with respect to FIGS. 19 and 20, as the cam surface 16a and the retracting cam surface 21b slide against each other in the optical axis direction. Therefore, a further rearward movement of the third lens group frame 16 (together with the third lens group moving ring 15) with the cam surface 16a and the retracting cam surface 21b remaining in contact with each other causes the third lens group frame 16 to rotate against the biasing force of the torsion spring 39 in a direction to move the engaging protrusion 16e away from the rotation limit pin 15g (i.e., in a direction to move the cylindrical lens holder 16b downward) as shown in FIG. 21.

Figure 22:
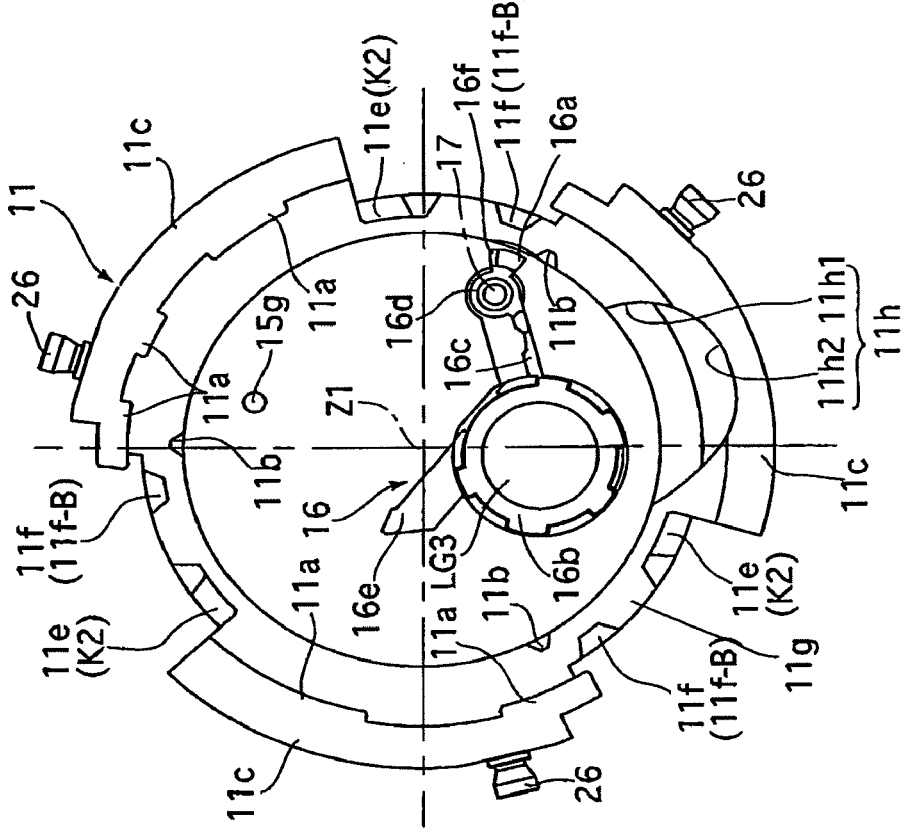
FIG. 22 is a rear elevational view of the third lens group moving ring and the cam ring in the retracted state of the zoom lens barrel, viewed from the rear in the optical axis direction.

As shown in FIG. 22, when the third lens group frame 16 rotates to a position corresponding to the off-axis displaced position of the third lens group LG3, the cam engaging projection 16f rises over the retracting cam surface 21b to be engaged with the displaced-position holding surface 21c. Since the displaced-position holding surface 21c lies in a plane parallel to the imaging optical axis Z1, a component force in a direction to further rotate the third lens group frame 16 toward the off-axis displaced position no longer acts on the third lens group frame 16. The displaced-position holding surface 21c prevents the third lens group frame 16 from returning to the on-axis position by the biasing force of the torsion spring 39, thus holding the third lens group frame 16 in the off-axis displaced position.

As shown in FIG. 1, the cylindrical lens holder 16b of the third lens group frame 16, which is moved to the off-axis displaced position, enters the accommodation space 15h (i.e., passes through the through-hole portion 15h1 and enters the semi-circular recessed portion 15h2), and projects radially outwards, beyond the cylindrical portion 15d. The second lens group holding ring 8 and the second linear guide ring 10, the cam ring 11, the first lens group holding ring 19, and the frontmost external barrel 12 are arranged around the third lens group moving ring 15, in that order in a radial direction from the imaging optical axis Z1. The outer edge of the cylindrical lens holder 16b of the third lens group frame 16 in the off-axis displaced position reaches a radial position that overlaps the frontmost external barrel 12 as viewed from the front. To prevent the third lens group frame 16 positioned in the off-axis displaced position from interfering with each of these members of the zoom lens 5 (e.g., the second lens group holding ring 8, the second linear guide ring 10, the cam ring 11, the first lens group holding ring 19, and the frontmost external barrel 12, etc.), a structure which will be discussed hereinafter is adopted.

Figure 5:
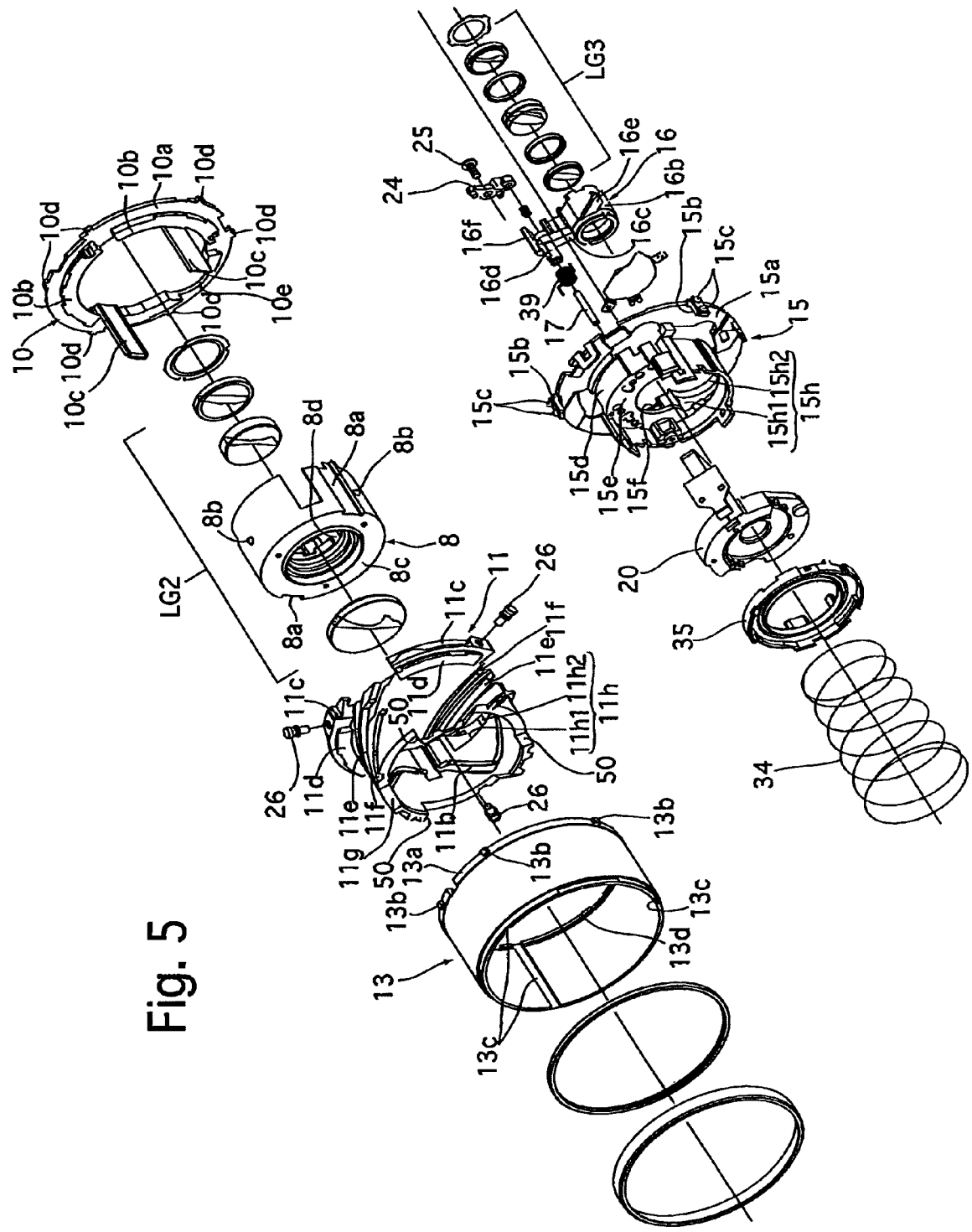
FIG. 5 is an exploded perspective view of a portion of the zoom lens barrel.

The second lens group holding ring 8 is provided in the vicinity of the rear end thereof with a cutout 8d (part of which is shown in FIG. 5) which is formed through the second lens group holding ring 8 in a radial direction thereof. The second linear guide ring 10 is provided on the inner edge of the rear end flange 10a with a semi-circular recessed portion 10e (see FIG. 5). In addition, the first lens group holding ring 19 is provided, in the vicinity of the rear end thereof which is positioned aside from the plurality of third-lens-group-control cam followers 15c, with a cutout 19d (see FIGS. 6 and 12). In addition, the frontmost external barrel 12 is provided, on an inner periphery thereof in the vicinity of the rear end of the frontmost external barrel 12, with a semi-circular recessed portion 12d (see FIG. 6). The cutouts 8d and 19d are positioned to be radially aligned with the through-hole portion 15h1 of the third lens group moving ring 15 (so as to be communicatively connected to the through-hole portion 15h1 in a radial direction) in the retracted state of the zoom lens 5, and the sizes and shapes of the cutouts 8d and 19d are determined so as to allow the cylindrical lens holder 16b to be inserted therethrough (project radially outwards through the cutouts 8d and 19d). The semi-circular recessed portions 10e and 12d are positioned to align with the semi-circular recessed portion 15h2 of the third lens group moving ring 15 as viewed from front (i.e., in the optical axis direction), and the sizes and shapes of the semi-circular recessed portions 10e and 12d are determined to allow the cylindrical lens holder 16b of the third lens group frame 16 to be inserted therein.

Figure 17:
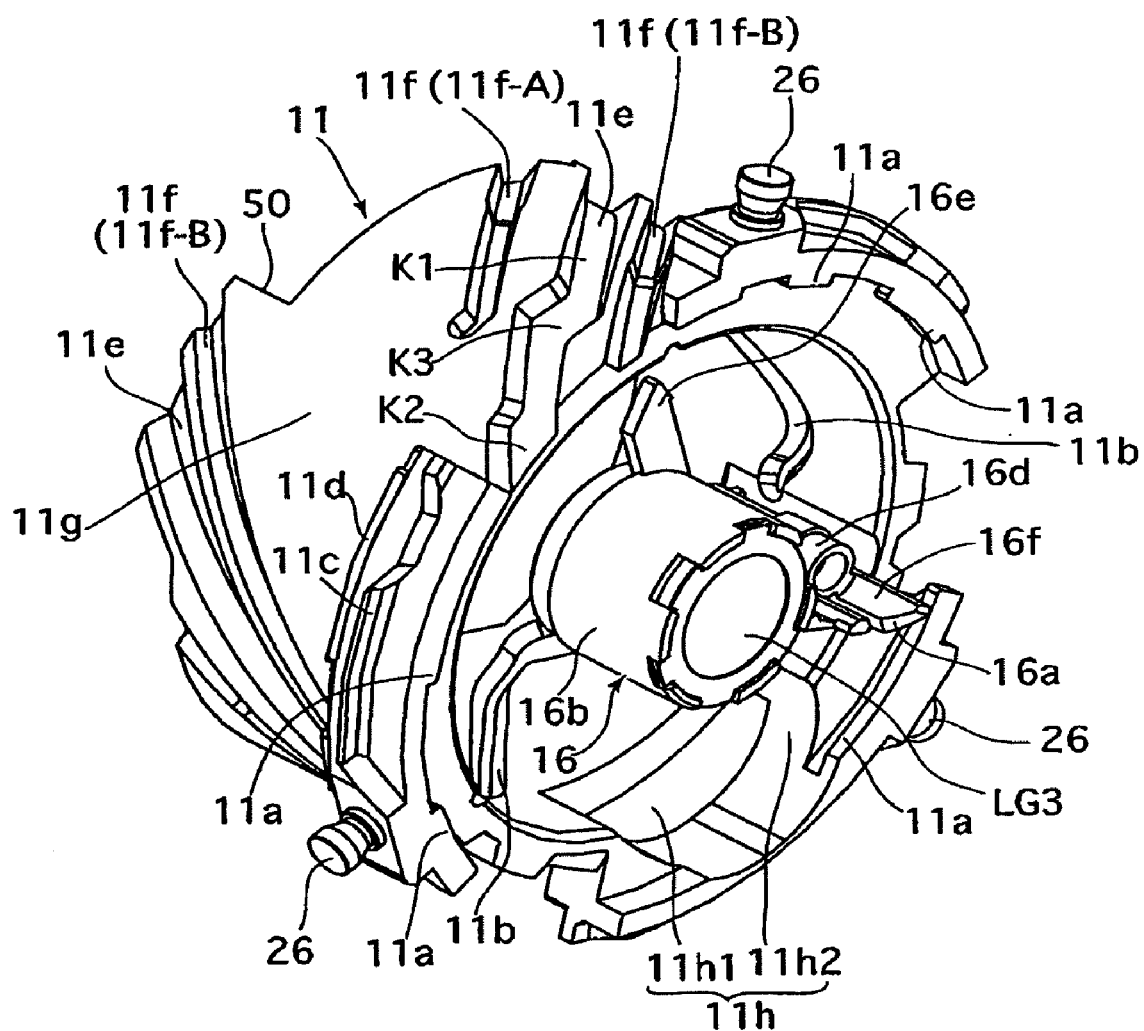
FIG. 17 is a rear perspective view of the third lens group frame and the cam ring, showing the positional relationship therebetween when the third lens group frame is in an on-axis position.
Figure 18:
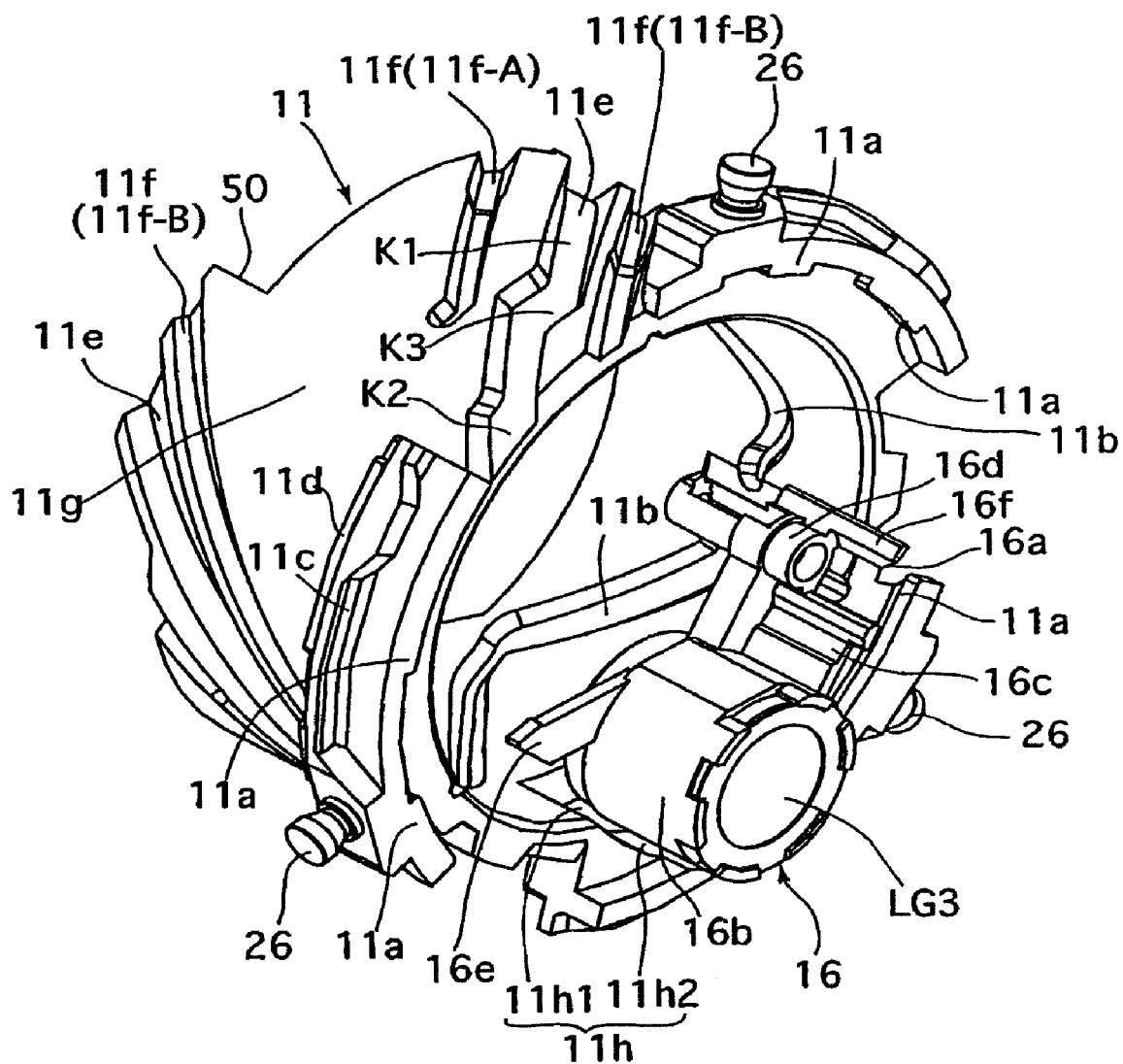
FIG. 18 is a rear perspective view of the third lens group frame and the cam ring, showing the positional relationship therebetween when the third lens group frame is in the off-axis displaced position.

As shown in FIGS. 17 and 18, the cam ring 11 is provided in front of the rear end flange 11c and the small-diameter flange 11d with a cylindrical portion 11g. The set of three second-lens-group guide cam grooves 11b are formed on an inner peripheral surface of the cylindrical portion 11g, and the set of three first lead cam grooves 11e and the three pairs of second lead cam grooves 11f are formed on an outer peripheral surface of the cylindrical portion 11g. The cam ring 11 is provided with an accommodation space (accommodation portion) 11h which consists of a through-hole portion 11h1 and a semi-circular recessed portion 11h2. The through-hole portion 11h1 is formed through the cylindrical portion 11g in a radial direction on a portion thereof which does not overlap any of the cam grooves 11b, 11e and 11f. The semi-circular recessed portion 11h2 is communicatively connected to the through-hole portion 11h1 and formed in a manner to cutout part of the radially inner portions of the rear end flange 11c and the small-diameter flange 11d. The through-hole portion 11h1 is positioned to be radially aligned with the through-hole portion 15h1 of the third lens group moving ring 15 in the retracted state of the zoom lens 5, and the semi-circular recessed portion 11h2 is positioned to align with the semi-circular recessed portion 15h2 of the third lens group moving ring 15 as viewed from front (i.e., in the optical axis direction). The sizes and shapes of the through-hole portion 11h1 and the semi-circular recessed portion 11h2 are determined to allow the cylindrical lens holder 16b of the third lens group frame 16 to be inserted therein.

Due to this structure, in the retracted state of the zoom lens 5, the cylindrical lens holder 16b of the third lens group frame 16 enters into the accommodation spaces 11h and 15h of the cam ring 11 and the third lens group moving ring 15 (see FIGS. 18 and 22 for reference to the entering operation of the cylindrical lens holder 16b into the accommodation space 11h of the cam ring 11), while the cylindrical lens holder 16b of the third lens group frame 16 enters into the cutout portions 8d and 19d and the semicircular recessed portions 10e and 12d of the second lens group holding ring 8, the second linear guide ring 10, the first lens group holding ring 19, the cam ring 11 and the frontmost external barrel 12 (see FIG. 1). The zoom lens 5 can be reduced in diameter by a greater degree than a zoom lens that is not equipped with these relief structures (cutout portions) for prevention of interference. As can be understood from FIG. 1, in the retracted state of the zoom lens 1, the cylindrical lens holder 16b is positioned outside the fourth lens group LG4 and the holding frame of the image sensor 60, so that the cylindrical lens holder 16b cannot be brought closer to the imaging optical axis Z1 any further. Therefore, supposing that the zoom lens 5 is not provided, on the third lens group moving ring 15 and other cylindrical members positioned radially outside the third lens group moving ring 15, with any of the above described accommodation spaces, cutouts and semicircular recessed portions, each of these cylindrical members of the zoom lens 5 would need to be made larger in inner diameter to be prevented from interfering with the cylindrical lens holder 16b positioned in the off-axis displaced position. In contrast, in the present embodiment of the zoom lens 5, the cylindrical lens holder 16b can be retracted (displaced) to a radial position to overlap the frontmost external barrel 12 as viewed from front with no increase in diameter of the cylindrical members of the zoom lens 5. Consequently, the retracted state (fully-retracted state) of the zoom lens 5 that has superior space utilization efficiency is achieved, which makes it possible to achieve miniaturization of the whole zoom lens 5.

Each of the second lens group holding ring 8, the second linear guide ring 10, the first lens group holding ring 19 and the frontmost external barrel 12 is a linearly movable member which is guided linearly in the optical axis direction, similar to the third lens group moving ring 15. Accordingly, the formation positions of the cutouts 8d and 19d and the semicircular recessed portions 10e and 12d only need to be determined so as to overlay the accommodation space 15h as viewed from front in the retracted state of the zoom lens 5. On the other hand, unlike these linearly movable members, the cam ring 11 is a rotatable member, and accordingly, the positions of the accommodation space 11h on the cam ring 11 and the accommodation space 15h on the third lens group moving ring 15 in the rotating direction about the imaging optical axis Z1 need to be reliably coincident with each other to prevent the cam ring 11 from interfering with the third lens group frame 16 when the cylindrical lens holder 16b enters the accommodation space 11h and when the cylindrical lens holder 16b exits from the accommodation space 11h. The present embodiment of the zoom lens 5 is provided with an idle mechanism for preventing the cam ring 11 from rotating for a predetermined period of time at the beginning of rotation of the helicoid ring 18 even if the helicoid ring 18 rotates when the zoom lens 5 performs the lens barrel advancing direction from the retracted state. Although briefly described above, this idle mechanism is configured such that the set of three guide rollers 26 that are fixed to the cam ring 11 are engaged in the circumferential groove portions 18f2 of the set of three roller-engaging grooves 18f, respectively, so that rotation of the helicoid ring 18 is not transferred to the cam ring 11 via the set of three guide rollers 26 when the zoom lens 5 is in the retracted state.

Figure 23:
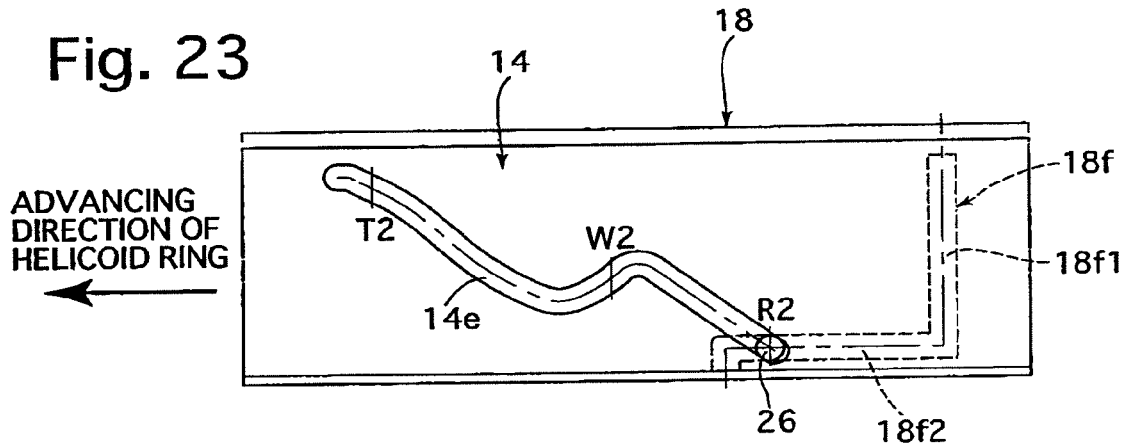
FIG. 23 is a developed plan view of a portion of the helicoid ring, a portion of the first linear guide ring and a guide roller of the cam ring, showing the positional relationship among a roller-engaging groove of the helicoid ring, a roller-guiding cam slot of the first linear guide ring and the guide roller of the cam ring.

FIGS. 23 through 27 show operations of the idle mechanism for the cam ring 11. "R2", "W2" and "T2" in the roller-guiding cam slot 14e shown in FIGS. 23 through 27 represent the positions of each guide roller 26 relative to the associated roller-guiding cam slot 14e when the zoom lens 5 is in the retracted state, set at the wide-angle extremity and set at the telephoto extremity, respectively. FIG. 23 shows a state when the zoom lens 5 is in the retracted state. In this state, each guide roller 26 is in the vicinity of one of the circumferentially opposite ends (the left end with respect to FIG. 23) of the circumferential groove portion 18f2 which is farther from the joint between the rotational transfer groove portion 18f1 and the circumferential groove portion 18f2. In addition, each guide roller 26 is positioned at a retraction position R2 in the vicinity of the rear end of the associated roller-guiding cam slot 14e of the first linear guide ring 14. The entire retraction range between the wide-angle extremity position W2 and the retraction position R2 of each roller-guiding cam slot 14e is formed as an inclined slot which includes an axial-direction component in the axial direction of the first linear guide ring 14 and which is inclined with respect to both the axial direction and the circumferential direction of the first linear guide ring 14. Note that the term "includes an axial-direction component" refers to a profile in which the positional change within, e.g., a slot/groove includes a positional change in the axial direction". Accordingly, when each guide roller 26 is positioned in the retraction position R2 of each roller-guiding cam slot 14e, the position of each guide roller 26 in the optical axis direction is determined by the axially-opposed wall surfaces (the front and rear wall surfaces in the optical axis direction) in the circumferential groove 18f2 of the associated roller-engaging groove 18f. More specifically, each guide roller 26 is pressed against the front wall surface in the circumferential groove 18f2 of the associated roller-engaging groove 18f by the above described biasing structure using the inter-lens-group biasing spring 34, and the position of the cam ring 11 in the optical axis direction is determined by this front wall surface as a reference surface. In addition to this front wall surface, the rear wall surface is also formed over the entire range of the circumferential groove 18f2 of each roller-engaging groove 18f, and accordingly, each guide roller 26 is prevented from both moving forward and moving rearward. In this retracted state of the zoom lens 5, the third lens group LG3 is held at the off-axis displaced position while the cylindrical lens holder 16b of the third lens group frame 16 is positioned in the accommodation space 11h of the cam ring 11 as shown in FIGS. 18 and 22.

Figure 24:
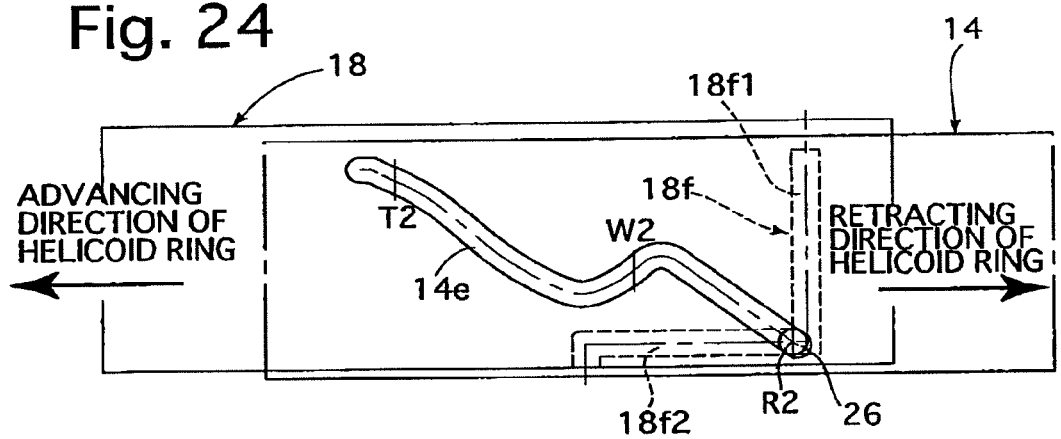
FIG. 24 is a view corresponding to that of FIG. 23 and illustrates a state where the guide roller of the cam ring moves in a circumferential groove of the roller-engaging groove in accordance with rotation of the helicoid ring in a lens barrel advancing direction from the retracted state of the zoom lens barrel.

When the helicoid ring 18 rotates in the lens barrel advancing direction from the retracted state shown in FIG. 23, the position of each guide roller 26 in the circumferential groove 18f2 of the associated roller-engaging groove 18f varies, and in a short time, each guide roller 26 reaches a point in the vicinity of the joint between the rotational transfer groove portion 18f1 and the circumferential groove portion 18f2 as shown in FIG. 24. On the other hand, the position of each guide roller 26 relative to the associated roller-guiding cam slot 14e does not yet vary, and accordingly, each guide roller 26 remains held at the retraction position R2. In the operational section of the idle mechanism from the state shown in FIG. 23 to the state shown in FIG. 24, the rotational force of the helicoid ring 18 is not transferred to the set of three guide rollers 26, so that the cam ring 11 is linearly advanced forward in the optical axis direction without rotating together with the helicoid ring 18 which is advanced while rotating due to the engagement of the outer helicoid 18a with the inner helicoid 22a. Additionally, in the operational section of the idle mechanism from the state shown in FIG. 23 to the state shown in FIG. 24, the plurality of third-lens-group-control cam followers 15c of the third lens group moving ring 15 are engaged in the circumferential groove portions 18e2 of the plurality of third-lens-group guide cam grooves 18e, respectively, so that the third lens group moving ring 15 is advanced with the helicoid ring 18 and the cam ring 11 in the optical axis direction. Thereafter, upon the third lens group moving ring 15 being advanced by a predetermined amount, the cam engaging projection 16f of the third lens group frame 16 is disengaged from the position-control cam bar 21a, and the third lens group frame 16 starts rotating in a direction to move the third lens group LG3 to the on-axis position by the biasing force of the torsion spring 39 as shown in FIG. 21. As can be understood by a comparison between FIGS. 21 and 22, the cam ring 11 is not rotated until the cylindrical lens holder 16b of the third lens group frame 16 is disengaged (completely withdrawn) from the accommodation space 11h, so that no interference occurs between the cam ring 11 and the cylindrical lens holder 16b.

Figure 25:
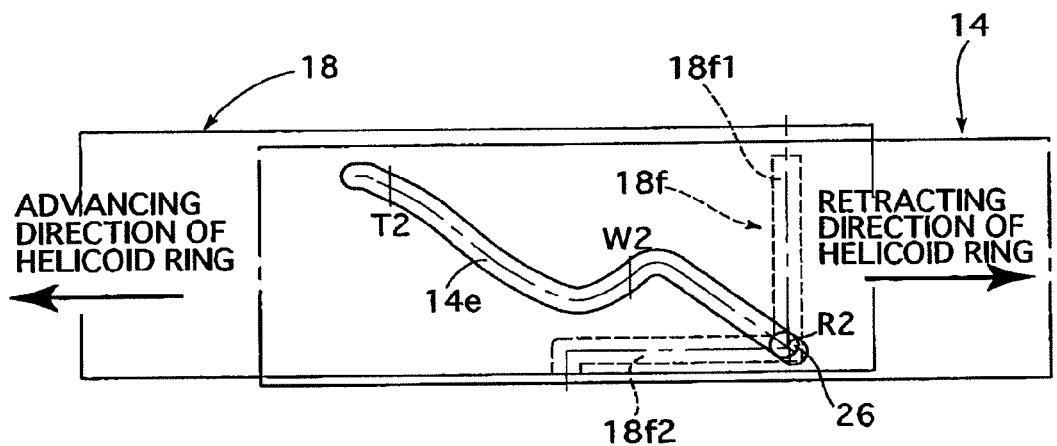
FIG. 25 is a view corresponding to that of FIG. 23 and illustrates a state where the guide roller of the cam ring has reached the boundary between the circumferential groove and a rotational transfer groove portion of the roller-engaging groove after the helicoid ring is further rotated in the lens barrel advancing direction.
Figure 26:
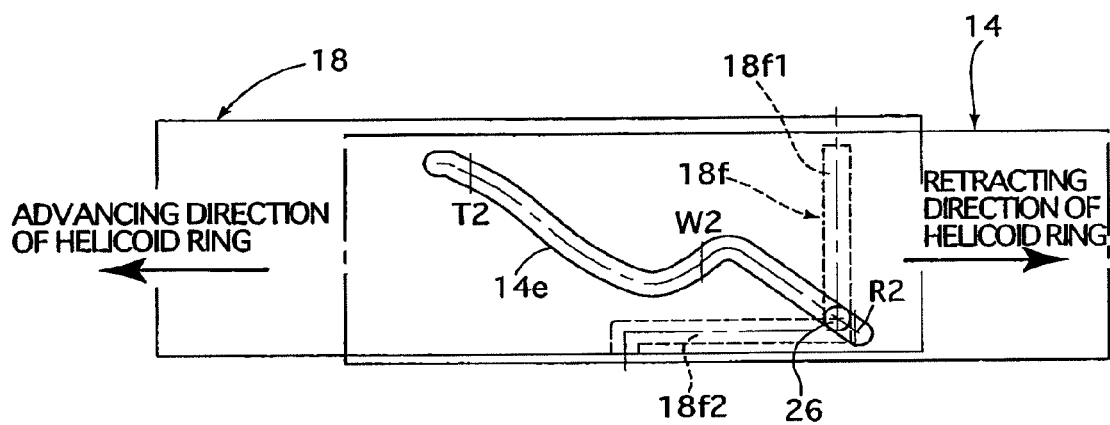
FIG. 26 is a view corresponding to that of FIG. 23 and illustrates a state where the guide roller of the cam ring has entered the rotational transfer groove portion of the roller-engaging groove after the helicoid ring is further rotated in the lens barrel advancing direction.

A further rotation of the helicoid ring 18 in the lens barrel advancing direction causes each guide roller 26 to reach the boundary between the rotational transfer groove portion 18f1 and the circumferential groove portion 18f2 as shown in FIG. 25. Thereupon, one of the circumferentially-opposed side wall surfaces (the right side wall surface with respect to FIG. 25) of the rotational transfer groove portion 18f1 can transfer rotation of the helicoid ring 18 in the lens barrel advancing direction to the set of three guide rollers 26. Thereafter, the cam ring 11 starts rotating, and each guide roller 26 moves away from the retraction position R2 of the associated roller-guiding cam slot 14e to move forward (i.e., toward the wide-angle extremity position W2) as shown in FIG. 26. Due to an inclined cam track of each roller-guiding cam slot 14e, each guide roller 26 is moved (moved forward) into the rotational transfer groove portion 18f1 of the associated roller-engaging groove 18f. Thereafter, this engaged state in which each guide roller 26 is engaged with the rotational transfer groove portion 18f1 of the associated roller-engaging groove 18f is maintained, so that the cam ring 11 rotates with the helicoid ring 18 whenever the helicoid ring 18 rotates until the lens barrel retracting operation is again performed. Since the third lens group frame 16 is already positioned away from the accommodation space 11h and moved to the on-axis position upon commencement of rotation of the cam ring 11 as shown in FIG. 20, the cam ring 11 and the third lens group frame 16 do not interfere with each other.

Figure 27:
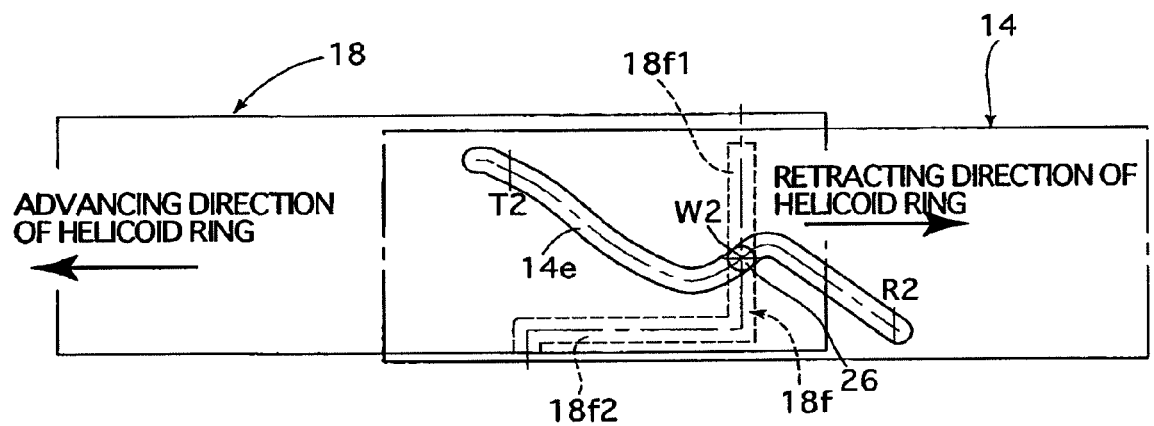
FIG. 27 is a view corresponding to that of FIG. 23 and illustrates the positional relationship among the roller-engaging groove of the helicoid ring, the roller-guiding cam slot of the first linear guide ring and the guide roller of the cam ring.

FIG. 27 shows the relative position among one of the three roller-engaging grooves 18f, the associated roller-guiding cam slot 14e and the associated guide roller 26 in a state where the zoom lens 5 is advanced to the wide-angle extremity. In this state, as shown in FIG. 19, the cam ring 11 has been rotated by a predetermined angle of rotation from the angular position for retraction (see FIGS. 21 and 22) where the cam ring 11 is prevented from rotating. In addition, the cam ring 11 has been advanced relative to the helicoid ring 18 by being guided by the set of three roller-guiding cam slots 14e. Further rotating the helicoid ring 18 in the lens barrel advancing direction causes each guide roller 26 to be guided by the associated roller-guiding cam slot 14e in the zooming range thereof from the wide-angle extremity position W2 to the telephoto extremity position T2, thus causing the cam ring 11 to also move forward and rearward in the optical axis direction while rotating.

In the lens barrel retracting operation of the zoom lens 5, the cam ring 11 operates in the reverse manner to the above described advancing operation. Upon each guide roller 26 being guided by the associated roller-guiding cam slot 14e therein to a position at the vicinity of the retraction position R2, each guide roller 26 reaches the rear end of the rotational transfer groove portion 18/1 of the associated roller-engaging groove 18f (see FIG. 25). Thereupon, each guide roller 26 enters the circumferential groove portion 18/2 of the associated roller-engaging groove 18f in accordance with a further rotation of the helicoid ring 18 in the lens barrel retracting direction (see FIG. 24). Thereafter, the cam ring 11 moves rearward with the helicoid ring 18 without rotating while being subjected to optical-axis-direction position control exercised by the circumferential groove portions 18/2 of the set of three roller-engaging grooves 18f (see FIG. 23). The third lens group frame 16 starts rotating from the on-axis position toward the off-axis displaced position by the position-control cam bar 21a at a timing (see FIG. 20) immediately before the cam ring 11 stops rotating, but does not yet reach the off-axis displaced position at the moment the cam ring 11 stops rotating (see FIG. 21). The installation angle of the cam ring 11 is set so that the circumferential positions of the accommodation space 11h of the cam ring 11 and the accommodation space 15h of the third lens group moving ring 15 coincide with each other when the cam ring 11 reaches the rotation stop state (position shown in FIG. 21). Therefore, when the cylindrical lens holder 16b enters the accommodation space 11h as shown in FIG. 22, the state where the accommodation space 11h of the cam ring 11 and the accommodation space 15h of the third lens group moving ring 15 are communicatively connected to each other is maintained, so that there is no possibility of the cylindrical lens holder 16b and the cam ring 11 interfering with each other.

On the condition that rotation of the cam ring 11 has stopped at least when the cylindrical lens holder 16b enters the accommodation space 11h, the timing of stopping rotation of the cam ring 11 in the retracting operation of the zoom lens 5 and the timing of commencement of the retracting (displacing) operation of the third lens group frame 16 to the off-axis displaced position can be freely determined.

In this manner, the zoom lens 5 is equipped with the idle mechanism for preventing the cam ring 11 from rotating for a predetermined period of time at the final phase of the lens barrel retracting operation, in which the cylindrical lens holder 16b rotates from the on-axis position to the off-axis displaced position, regardless of the rotation of the helicoid ring 18. Accordingly, when the third lens group frame 16 in the retracting (displacing) operation partly enters the accommodation space 11h of the cam ring 11, no interference occurs between the third lens group frame 16 and the cam ring 11 to thereby prevent a breakdown in the zoom lens 5. Specifically, in the present embodiment of the zoom lens, the timing and the position at which the cam ring 11 comes into a rotation stop state are not easily misaligned (i.e., a discrepancy does not easily occur), which achieves a high-precision operation of the zoom lens 5.

Figure 35:
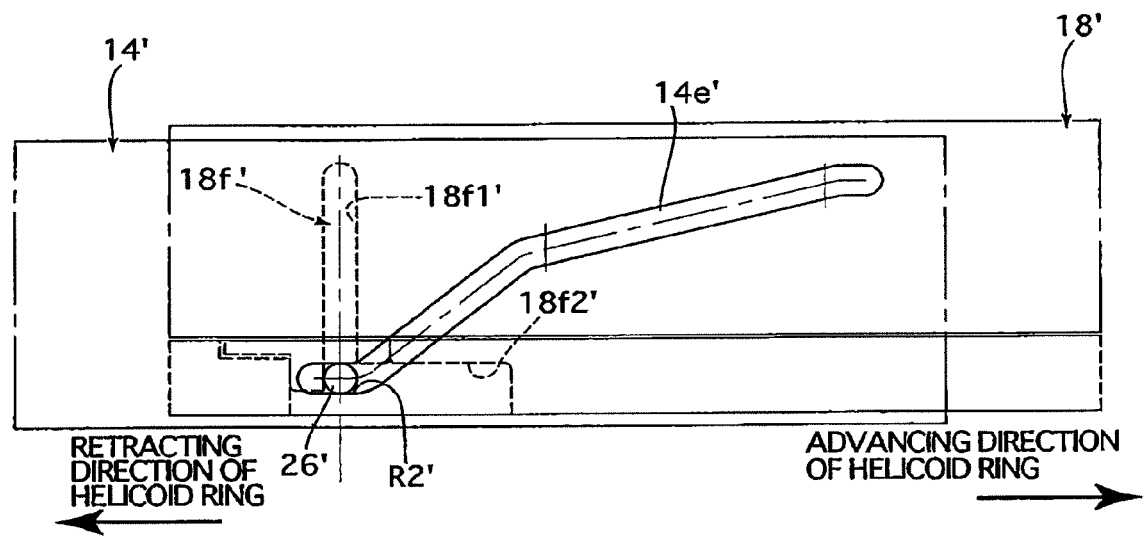
FIG. 35 is a developed plan view of a portion of a helicoid ring, a portion of a linear guide ring and a guide roller of a cam ring in a comparative example of an idle mechanism for the cam ring.
Figure 36:
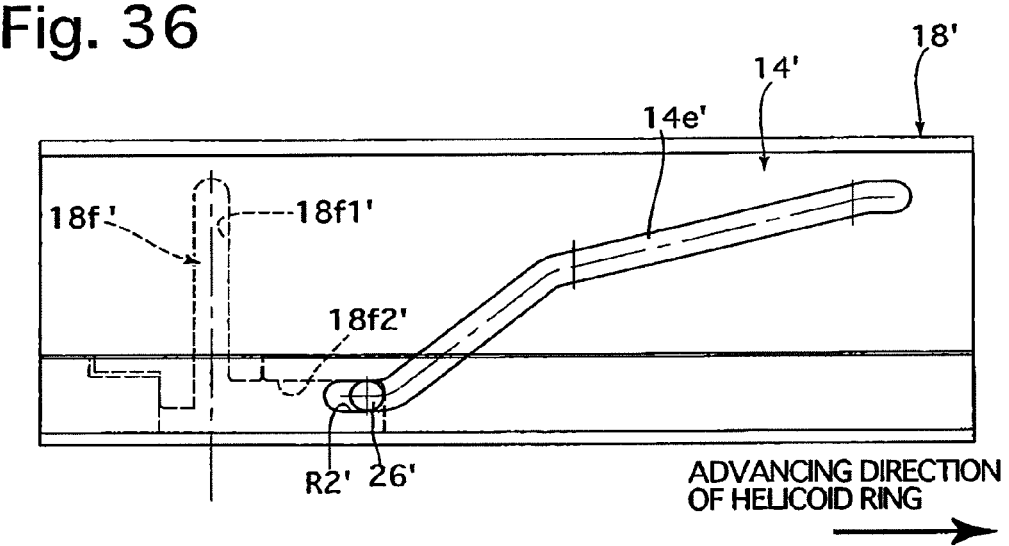
FIG. 36 is a view similar to that of FIG. 35, illustrating a state where the idle mechanism for the cam ring reaches a state corresponding to the retracted state of the zoom lens barrel.

As a comparison with the present embodiment of the idle mechanism for the cam ring 11 that is incorporated in the zoom lens 5, the outline of a known idle mechanism for a cam ring which is adopted in United States Patent Application Publication No. 2006/0034604 A1 (Japanese Unexamined Patent Publication No. 2006-53444) will be hereinafter discussed with reference to FIGS. 35 and 36. This comparative example of the idle mechanism is different from the idle mechanism of the zoom lens 5 in that a portion of each roller-guiding cam groove 14e' formed on a linear guide ring 14' in the vicinity of the retraction position thereof is formed as a circumferential groove portion R2' which is elongated in a direction orthogonal to the axis of the linear guide ring 14', and that the rear end of a circumferential groove portion 18/2' (which is continuous with a rotational transfer groove portion 18/1') of each roller-engaging groove 18f' formed on a helicoid ring 18' is open at the rear end of the helicoid ring 18'. Upon a lens barrel retracting operation being performed from a ready-to-photograph state, each guide roller 26' is moved rearward in the rotational transfer groove portion 18/1' of the associated roller-engaging groove 18f' in accordance with rotation of the helicoid ring 18' while being guided by the associated roller-guiding cam groove 14e'. Upon each guide roller 26' exiting from the rear end of the rotational transfer groove portion 18/1' of the associated roller-engaging groove 18f' as shown in FIG. 35, rotation of the helicoid ring 18' in the lens barrel retracting direction stops being transferred to each guide roller 26', so that the cam ring (not shown) having each guide roller 26' stops rotating. Furthermore, as the helicoid ring 18' rotates in the lens barrel retracting direction, the position of each guide roller 26' in the circumferential groove portion 18/2' of the associated roller-engaging groove 18f' varies relative to this circumferential groove portion 18/2' so that each guide roller 26' abuts against a circumferential end (the right end with respect to FIG. 36) of the circumferential groove portion 18/2' of the associated roller-engaging groove 18f' as shown in FIG. 36. Upon completion of the lens barrel retracting operation, this circumferential end of the circumferential groove portion 18/2' presses the associated guide roller 26' slightly leftward with respect to FIG. 36, which determines the final angular position of each guide roller 26', i.e., the final angular position of the cam ring (not shown) for retraction thereof.

In the structure of this comparative example, during the time from the state shown in FIG. 35, in which the transmission of rotational force in the lens barrel retracting direction from the helicoid ring 18' to each guide roller 26' is canceled, to the state shown in FIG. 36, in which the lens barrel retracting direction is completed, the position of the cam ring having each guide roller 26' in the rotating direction is not positively controlled by either the helicoid ring 18' (the circumferential groove portion 18/2' of the roller-engaging groove 18f') or the linear guide ring 14' (the circumferential groove portion R2' of the roller-guiding cam groove 14e'). Since the transmission of rotational force by the helicoid ring 18' has been canceled, the cam ring is not rotated; however, there is still room for variation in position of the cam ring in the rotating direction thereof, and the precise positioning of the cam ring in the rotating direction thereof is not performed until the circumferential end (the right end with respect to FIG. 36) of the circumferential groove portion 18/2' comes into abutment against the associated guide roller 26'. Therefore, if it is attempted to provide the cam ring with an accommodation space similar to the accommodation space 11h of the cam ring 11, this accommodation space needs to be relatively large taking into account of a possible discrepancy in the stop position of the cam ring. To miniaturize the lens barrel, it is desirable that this kind of accommodation space be made as small as possible. In addition, if it is attempted to control the opening/shutting operation of the lens barrier mechanism by rotation of the cam ring in a similar manner to the above described embodiment, the lens barrel needs to be structured to have a certain amount of margin so that no error in operation of the lens barrier is caused by any discrepancy in the stop position of the cam ring. In the case of pursuing miniaturization, operation accuracy and response of the lens barrel, it is desirable that this sort of safety margin be as small as possible. Namely, in an idle mechanism which allows no rotation to be transferred to a cam ring in the vicinity of the lens barrel retracting position thereof, it is desirable that the idle mechanism be structured not only to simply cancel the transmission of rotational force to the cam ring in a similar manner to the above described comparative example but also to precisely determine the position of the cam ring in the rotating direction thereof at the time the transmission of rotational force to the cam ring is cancelled.

As described above, in the present embodiment of the zoom lens 5, each guide roller 26 is engaged with the associated roller-guiding cam groove 14e at the retraction position R2 during the time the transmission of rotational force from the helicoid ring 18 to the cam ring 11 is canceled with the set of three guide rollers 26 being engaged in the circumferential groove portions 18f2 of the set of three roller-engaging grooves 18f, respectively (see FIGS. 23 and 24). Unlike the circumferential groove portion R2' of each roller-guiding cam groove 14e', the retraction position R2 of each roller-guiding cam groove 14e is formed as an inclined groove portion which is inclined with respect to both the axial direction and the circumferential direction of the first linear guide ring 14, so that the position of each guide roller 26 in the rotating direction thereof can be precisely determined by side surfaces (opposed surfaces) of each roller-guiding cam groove 14e. In addition, the position of each guide roller 26 in the associated roller-guiding cam groove 14e also does not vary since the set of three guide rollers 26 are prevented from moving in the optical axis direction by engagement with the circumferential groove portions 18f2 of the set of three roller-engaging grooves 18f, respectively. Accordingly, upon the transmission of rotational force from the rotational transfer groove portions 18f1 of the set of three roller-engaging grooves 18f to the set of three guide rollers 26 being canceled, the position of the cam ring 11 in the rotating direction thereof and the position of the cam ring 11 in the optical axis direction are securely precisely controlled, so that the cam ring 11 does not come into an unstable state in the vicinity of the retraction position thereof. Consequently, the size of the accommodation space 11h can be reduced to a minimum; moreover, a safety margin secured between the cam ring 11 and the lens barrier mechanism can be minimized, which makes it possible to achieve further miniaturization of the zoom lens 5 and an improvement in operation accuracy of the zoom lens 5.

Figure 32:
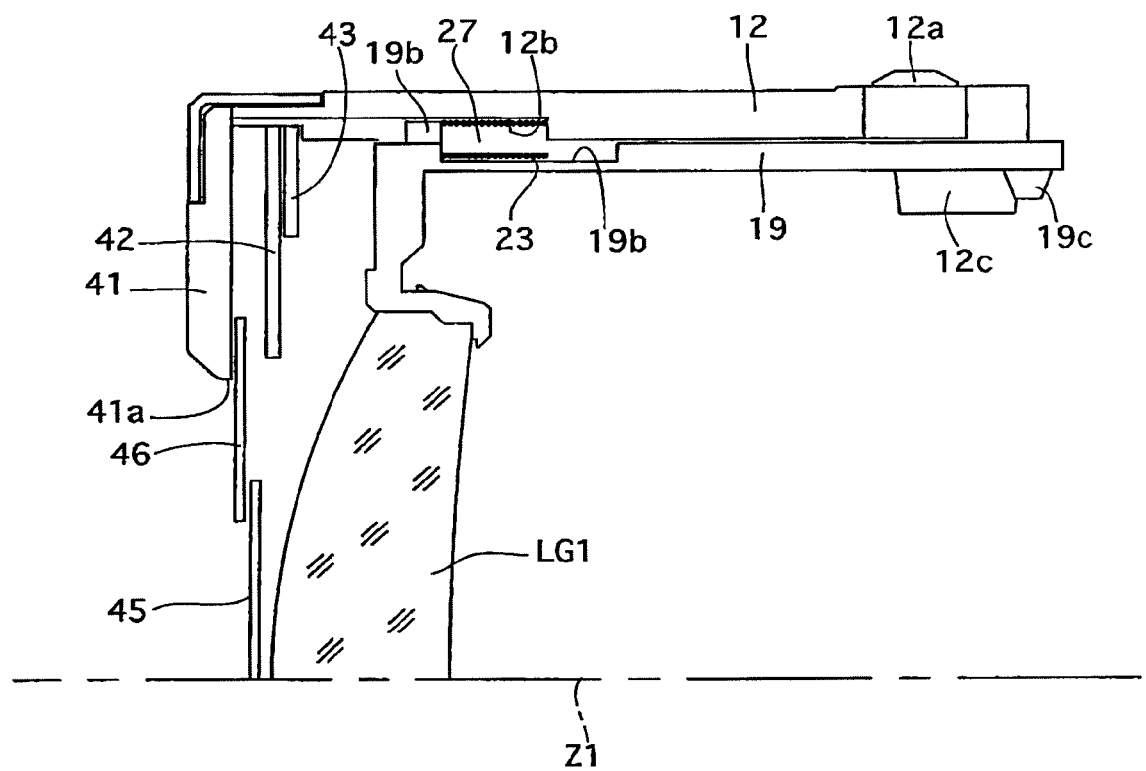
FIG. 32 is a longitudinal cross sectional view of a portion of the zoom lens barrel and shows the relative position between the first lens group and the lens barrier mechanism when the zoom lens barrel is in the retracted state, showing only an upper half of the zoom lens barrel from the imaging optical axis.
Figure 33:
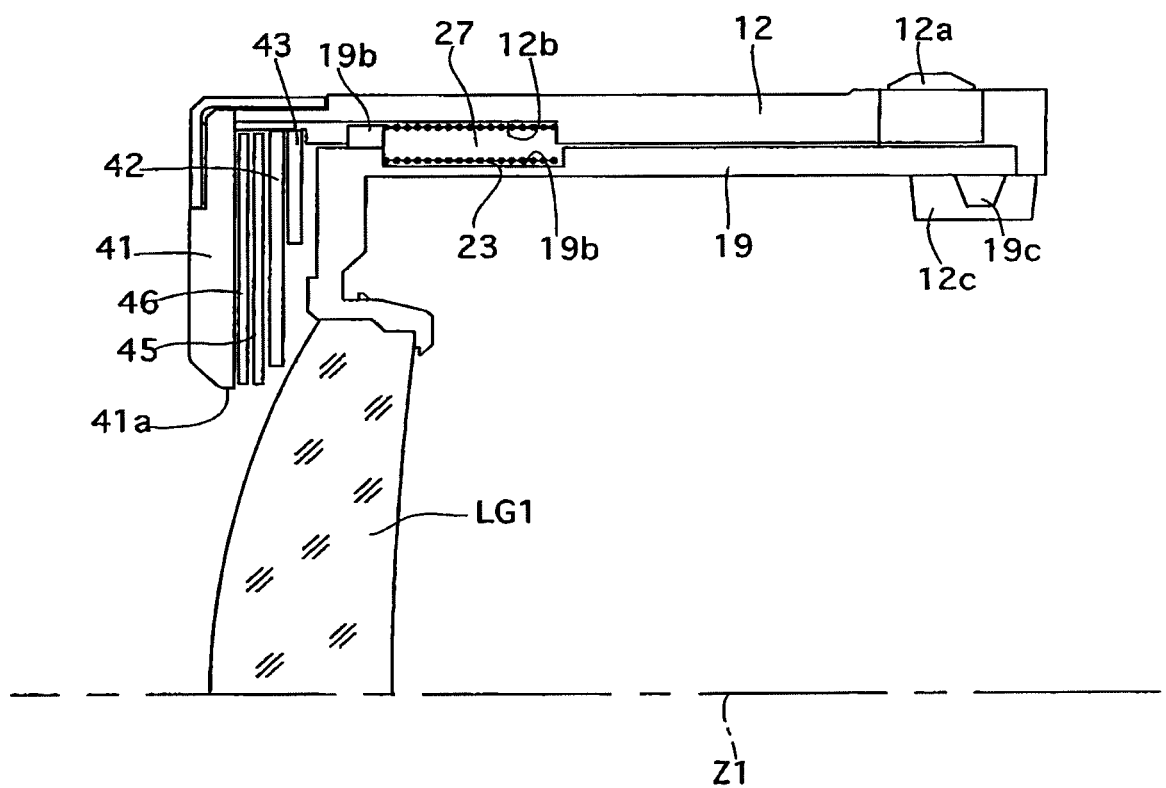
FIG. 33 is a view similar to that of FIG. 32 and shows the relative position between the first lens group and the lens barrier mechanism when the zoom lens barrel is in the ready-to-photograph state, showing only an upper half of the zoom lens barrel from the imaging optical axis.

Another feature of the zoom lens 5 on the association between the first lens group LG1 and the lens barrier mechanism will be discussed hereinafter. As a precondition for this type of lens barrier mechanism, the barrier blades of the lens barrier mechanism must be located at a position in the optical axis direction where the barrier blades do not interfere with the frontmost lens group (the first lens group LG1 in the present embodiment of the zoom lens) when the barrier blades are shut. In actuality, in the present embodiment of the zoom lens 5, both the pair of inner barrier blades 45 and the pair of outer barrier blades 46 are moved into the space in front of the first lens group LG1 and do not interfere with the first lens group LG1 in the retracted state of the zoom lens 5 as shown in FIGS. 1 and 32. On the other hand, wide-angle zoom lenses (zoom lenses with a wide-angle focal length range) are known in the art which are configured so that the frontmost lens group is advanced beyond a plane in which the barrier blades of a lens barrier mechanism lie in the ready-to-photograph state to prevent rays of light incident on the frontmost lens group from being intercepted by the inner edge of a photographing aperture of the lens barrier mechanism when the zoom lens is in the ready-to-photograph state. The present embodiment of the zoom lens 5 is such a type of zoom lens. As shown in FIGS. 2, 3 and 33, the first lens group LG1 is advanced relative to the lens barrier mechanism so that the front part of the first lens group LG1 is positioned in front of a plane in which the photographing aperture 41a of the barrier mount frame 41 lies, i.e., in which the pair of inner barrier blades 45 and the pair of outer barrier blades 46 lie. Such movement of the first lens group LG1 relative to the lens barrier mechanism is carried out by controlling the positions of the frontmost external barrel 12, which holds the lens barrier mechanism, and the first lens group holding frame 19, which holds the first lens group LG1.

Figure 31:
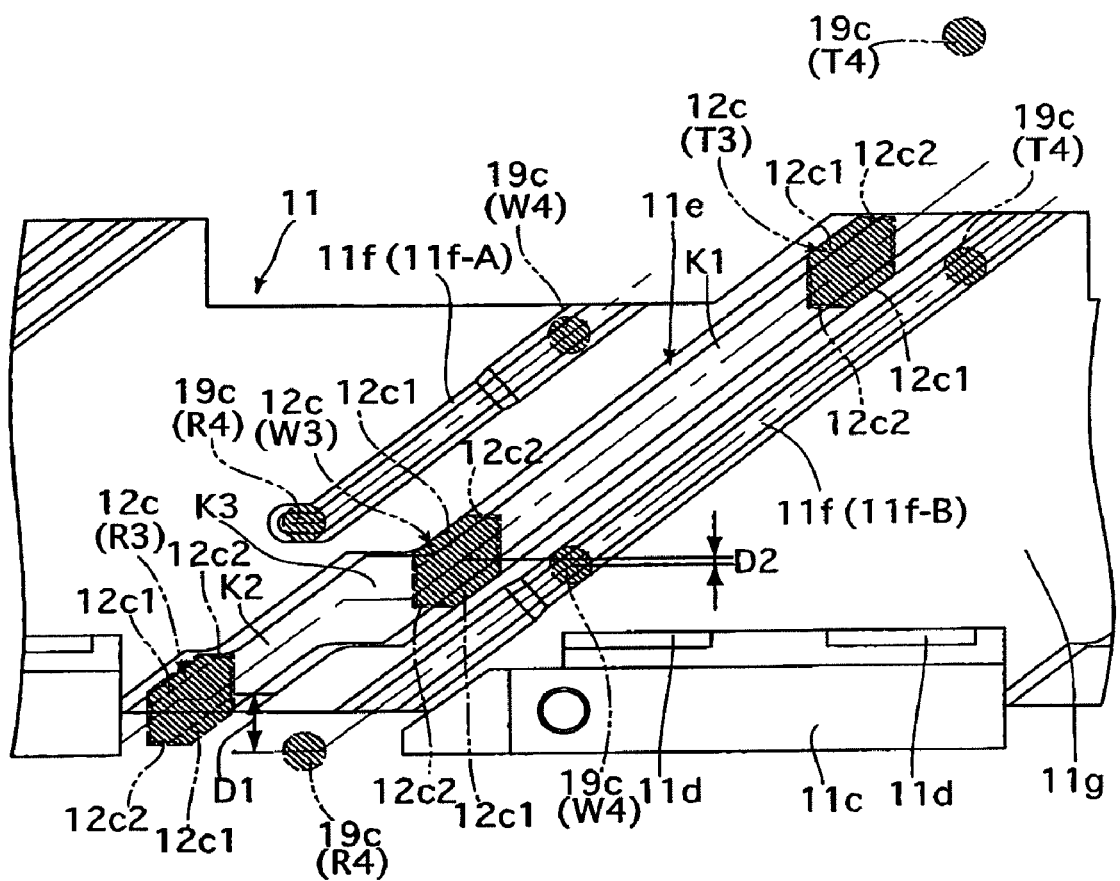
FIG. 31 is a developed plan view of the cam ring, the frontmost external barrel and the first lens group holding ring, and illustrates a manner of guiding lead projections of the frontmost external barrel and first-lens-group-control cam followers of the first lens group holding ring by first and second lead cam grooves formed on the cam ring.

FIG. 31 shows an enlarged view of a portion of the outer peripheral surface of the cam ring 11 to illustrate the set of three first lead cam grooves 11e and the three pairs of second lead cam grooves 11f, which are formed on the outer peripheral surface of the cam ring 11 and used to control the relative position between the frontmost external barrel 12 and the first lens group holding ring 19. In FIG. 31, "R3" designates the position (retraction position) of each lead projection 12c in the associated lead cam groove 11e in the retracted state of the zoom lens 5, and "R4" designates the position (retraction position) of each first-lens-group-control cam follower 19c in the associated second lead cam groove 11f in the retracted state of the zoom lens 5. Similarly, in FIG. 31, "W3" designates the position of each lead projection 12c in the associated lead cam groove 11e when the zoom lens 5 is set at the wide-angle extremity, "W4" designates the position of each first-lens-group-control cam follower 19c in the associated second lead cam groove 11f when the zoom lens 5 is set at the wide-angle extremity, "T3" designates the position of each lead projection 12c in the associated lead cam groove 11e when the zoom lens 5 is set at the telephoto extremity, and "T4" designates the position of each first-lens-group-control cam follower 19c in the associated second lead cam groove 11f when the zoom lens 5 is set at the telephoto extremity.

As can be understood from FIG. 31, each pair of second lead cam grooves 11f consists of a front lead cam groove 11f-A and a rear cam groove 11f-B which are formed at different positions in the optical axis direction. The rear lead cam groove 11f-B does not have a rear end portion thereof at the retraction position R4 of the associated first-lens-group-control cam follower 19c, whereas the front lead cam groove 11f-A has a rear end portion thereof which includes the retraction position R4. In contrast, the front lead cam groove 11f-A does not have a front end portion thereof at the retraction position T4 of the associated first-lens-group-control cam follower 19c, whereas the rear lead cam groove 11f-B has a front end portion thereof which includes the retraction position T4. However, the groove-missing portion of one second lead cam groove 11f of each pair of second lead cam grooves 11f (11f-A and 11f-B) is complemented (compensated) by the other second lead cam grooves 11f so that each pair of first-lens-group-control cam followers 19c is engaged with at least one of the associated pair of second lead cam grooves 1 if at all times. Accordingly, the position control performed by the three pairs of second lead cam grooves 11f is maintained in either engaged state. In addition, although each pair of first-lens-group-control cam followers 19c (front and rear first-lens-group-control cam followers 19c) are engaged in the front lead cam groove 11f-A and the rear lead cam groove 11f-B in the vicinity of the wide-angle extremity position W4, respectively, the front lead cam groove 11f-A is wider in groove width than the rear lead cam groove 11f-B in this range of engagement, and the position control for each pair of first-lens-group-control cam followers 19c is accurately performed by the rear lead cam groove 11f-B of the associated pair of second lead cam grooves 11f. Namely, in the zooming range from the wide-angle extremity to the telephoto extremity, the rear lead cam groove 11f-B of each pair of second lead cam grooves 11f is precisely engaged with the rear first-lens-group-control cam follower 19c of the associated pair of first-lens-group-control cam followers 19c to control the position thereof. Conversely, in the retraction position, the front lead cam groove 11f-A of each pair of second lead cam grooves 11f is engaged with the front first-lens-group-control cam follower 19c of the associated pair of first-lens-group-control cam followers 19c to control the position of each pair of first-lens-group-control cam followers 19c. In other words, the rear lead cam grooves 11f-B of the three pairs of second lead cam grooves 11f serve as lead cam grooves used for the zooming range, while the front lead cam grooves 11f-A of the three pairs of second lead cam grooves 11f serve as lead cam grooves used for the retraction position.

As described above, the three pairs of second lead cam grooves 11f, each pair of which includes the front lead cam groove 11f-A and the rear lead cam groove 11f-B, are formed as lead grooves shaped into straight cam grooves in developed plan view as shown in FIGS. 10 and 31. Each of the three first lead cam grooves 11e, which is located at a position between the front lead cam groove 11f-A and the rear lead cam groove 11f-B of the associated pair of second lead cam grooves 11f in the optical axis direction, has a crank-shaped cam track, including a front lead groove portion K1, a rear lead groove portion K2 and a differential groove portion K3 via which the front lead groove portion K1 and the rear lead groove portion K2 are connected. The differential groove portion K3 extends in the rotating direction of the cam ring 11 (circumferential direction orthogonal to the axis of the cam ring 11), thus including no axial-direction component in the axial direction of the cam ring 11.

Each of the three lead projections 12c, which are respectively engaged in the set of three first lead cam grooves 11e, is shaped into a polygonal prism which is provided with a pair of lead surfaces 12c1 and a pair of orthogonal surfaces 12c2. The pair of lead surfaces 12c1 are parallel to the direction of formation of the front lead groove portion K1 and the rear lead groove portion K2, and the pair of orthogonal surfaces 12c2 are parallel to the differential groove portion K3 (i.e., extend in a direction orthogonal to the axial direction of the frontmost external barrel 12). The groove width of the front lead groove portion K1 is a normal groove width which corresponds to the distance between the pair of lead surfaces 12c1 of the associated lead projection 12c, and the groove width of the rear lead groove portion K2 is greater than this distance between the pair of lead surfaces 12c1. The rear end of the rear lead groove portion K2 is open on a rear end surface of the cam ring 11, and this rear end opening is greater in groove width than the remaining part of the rear lead groove portion K2. Although the details will be discussed later, the front lead groove portion K1 is precisely engaged with the associated lead projection 12c and serves as a zooming-range groove portion for precisely controlling the position of the associated lead projection 12c in the zooming range from the wide-angle extremity to the telephoto extremity, and the rear lead groove portion K2 serves as a retraction lead groove portion for controlling the retraction position of the associated lead projection 12c.

In the retracted state of the zoom lens 5, each of the three lead projections 12c is positioned in the vicinity of the rear end opening of the rear lead groove portion K2 of the associated first lead cam groove 11e. In FIG. 31, "D1" represents the distance in the optical axis direction between the lead projection 12c positioned at the retraction position R3 and the rear first-lens-group-control cam follower 19c positioned at the retraction position R4 and disengaged from the rear lead cam groove 11f-B. In this state, the first lens group LG1, which is held by the first lens group holding ring 19, and the pair of inner barrier blades 45 and the pair of outer barrier blades 46, which are held by the frontmost external barrel 12, are positioned so as not to overlap each other in the optical axis direction as shown in FIG. 32, i.e., so as not to interfere with each other.

Upon the cam ring 11 moving from the above described irrotational state (idle state) to the interconnected rotational state, in which the cam ring 11 rotates with the helicoid ring 18, by an advancing operation of the zoom lens 5, each lead projection 12c and each first-lens-group-control cam follower 19c move forward in the associated first lead cam groove 11e and the associated second lead cam groove 11f, respectively. A movement of each lead projection 12c in the associated first lead cam groove 11e for a predetermined amount with the pair of lead surfaces 12c1 of the lead projection 12c being guided by the rear lead groove portion K2 of the associated first lead cam groove 11e causes the lead projection 12c to enter the differential groove portion K3 of the associated first lead cam groove 11e, so that the pair of orthogonal surfaces 12c2 of the lead projection 12c come in contact with axially-opposed wall surfaces of the differential groove portion K3 of the associated first lead cam groove 11e, respectively. Thereupon, in accordance with the rotation of the cam ring 11 in the lens barrel advancing direction, the lead projection 12c is moved in the circumferential direction in the differential groove portion K3, so that the frontmost external barrel 12 comes into a state where the frontmost external barrel 12 does not move in the optical axis direction relative to the cam ring 11. On the other hand, since each first-lens-group-control cam followers 19c continues to be moved linearly along the linear cam track of the associated second lead cam groove 11f, the first lens group holding ring 19 is advanced in the optical axis direction relative to the frontmost external barrel 12, namely, a difference in movement in the optical axis direction occurs between the first lens group holding ring 19 and the frontmost external barrel 12. A further rotation of the cam ring 11 in the lens barrel advancing direction causes each lead projection 12c to move from the differential groove portion K3 of the associated first lead cam groove 11e into the front lead groove portion K1 of the same first lead cam groove 11e that is positioned in front of the differential groove portion K3, so that each lead projection 12c comes into a state where it is guided with the pair of lead surfaces 12c1 thereof being guided by the rear lead groove portion K2 of the associated first lead cam groove 11e. The front lead groove portion K1 is narrower in groove width than the rear lead groove portion K2 so as to be capable of guiding the associated lead projection 12c more precisely than that in the retracted state. Thereafter, upon each lead projection 12c and each first-lens-group-control cam follower 19c reaching the wide-angle extremity position W3 and the wide-angle extremity position W4, respectively, the distance between the lead projection 12c and the rear first-lens-group-control cam follower 19c in the optical axis direction has changed from the distance D2 to the distance D1. Namely, the first lens group holding ring 19 has been moved forward relative to the frontmost external barrel 12 by an amount of movement corresponding to the difference between D1 and D2. Consequently, as shown in FIG. 33, the first lens group LG1 advances to a position where the first lens group LG1 overlaps the barrier blades 45 and 46 which are opened and the barrier mount frame 41 in the optical axis direction, to thereby prevent rays of light (object light) incident on the first lens group LG1 from being intercepted by the lens barrier mechanism. At the stage at which the frontmost external barrel 12 and the first lens group holding ring 19 move relative to each other by the differential groove portions K3 of the set of three first lead cam grooves 11e, the opening operations of the pair of inner barrier blades 45 and the pair of outer barrier blades 46 of the lens barrier mechanism have been already completed, so that the first lens group LG1 does not interfere with any of the barrier blades 45 and 46 even if the first lens group LG1 is advanced to the position shown in FIG. 33. In the zooming range from the wide-angle extremity positions W3 and W4 to the telephoto extremity positions T3 and T4, the frontmost external barrel 12 and the first lens group holding ring 19 are moved linearly in accordance with rotation of the cam ring 11, and the relative position between the first lens group LG1 and the lens barrier mechanism does not change. In this zooming range, backlash between each lead projection 12c and the associated first lead cam groove 11e (the front lead groove portion K1 thereof) and backlash between each first-lens-group-control cam follower 19c and the associated second lead cam groove 11f are eliminated by the biasing force of the three first lens group biasing springs 23.

When the zoom lens 5 performs the lens barrel retracting operation, a relative movement between the frontmost external barrel 12 and the first lens group holding ring 19 in a direction to retract (move rearward) the first lens group LG1 in the optical axis direction relative to the lens barrier mechanism occurs while each lead projection 12c moves in the differential groove portion K3 of the associated first lead cam groove 11e. Accordingly, as shown in FIG. 32, in the retracted state of the zoom lens 5, the front of the first lens group LG1 is shut (closed) by the pair of inner barrier blades 45 and the pair of outer barrier blades 46 so that the first lens group LG1 and barrier blades 45 and 46 do not interfere with each other, and hence, the first lens group LG1 is protected by the barrier blades 45 and 46.

Figure 34:
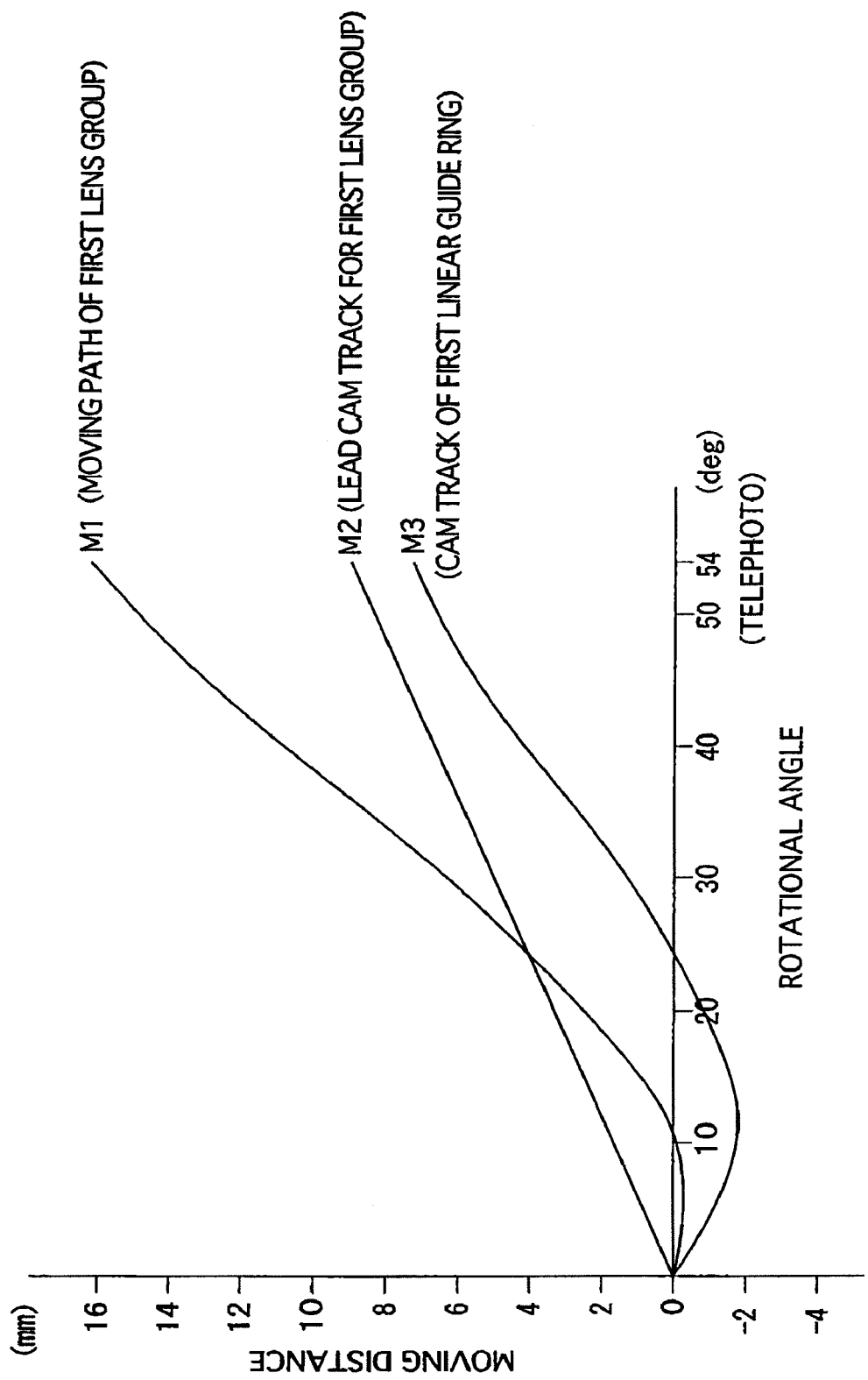
FIG. 34 is a graph showing the moving path of the first lens group in the zooming range of the zoom lens barrel, and further showing the cam track of each second lead cam groove and the cam track of each roller-guiding cam slot, which achieves this moving path of the first lens group.

As described above, by providing each first lead cam groove 11e and each second lead cam groove 11f, which are formed on the outer peripheral surface of the cam ring 11, with different cam tracks from each other makes relative movement between the lens barrier mechanism and the first lens group LG1 possible. However, in optical design, the moving path of the first lens group LG1 is a nonlinear moving path M1 (see FIG. 34), unlike the linear cam track of each second lead cam groove 11f. It should be noted in FIG. 34 that the horizontal axis represents the angle of rotation of the cam ring 11 in the zooming range, and that the vertical axis represents the moving distance of the first lens group LG1 in the optical axis direction with the position of the first lens group LG1 at the wide-angle extremity being taken as a reference position. A cam track M2 of each second lead cam groove 11f is a linear cam track by which the amount of movement of the associated first-lens-group-control cam follower 19c per unit of rotation of the cam ring 11 is constant. Additionally, the movement of the cam ring 11 itself is controlled so that the cam ring 11 moves in a nonlinear moving manner in the optical axis direction so as to provide the nonlinear moving path M1 to the first lens group LG1 while using the three pairs of second lead cam grooves 11f that are linear in shape. Specifically, the zoom lens 5 is constructed to achieve the nonlinear moving path M1 of the first lens group LG1 by combining a cam track M3 of each roller-guiding cam slot 14e of the first linear guide ring 14, which is engaged with the associated guide roller 26 of the cam ring 11, with the linear cam track M2 of each second lead cam groove 11f. As shown in FIG. 9, although each roller-guiding cam slot 14e of the first linear guide ring 14 includes a linear lead shape in the range from the retraction position R2 to the wide-angle extremity position W2, the zooming range from the wide-angle extremity position W2 to the telephoto extremity T2 is non-linear corresponding to the cam track M3 shown in FIG. 34.

In this manner, when the movement of the first linear guide ring LG1 is controlled by the nonlinear moving path M1, excellent space utilization efficiency and operation accuracy can be achieved by forming the three pairs of second lead cam grooves 11f that are linear in shape on the cam ring 11 and also by making the set of three roller-guiding cam slots 14e of the first linear guide ring 14 contribute to (compensate for) the nonlinear component of the moving path M1. For instance, supposing that each cam groove formed on the outer peripheral surface of the cam ring 11 is shaped so as to simply trace the actual nonlinear moving path M1, unlike each second lead cam groove 11f. This imaginary cam groove (M1) would be in the shape of a letter J which firstly extends rearward a little in the optical axis direction from the wide-angle extremity position and subsequently turns back to extend forward in the optical axis direction, and is required to solely give the first lens group LG1 the amount of movement thereof for the entire zooming range, which increases the space in the optical axis direction which is required for the formation of such an imaginary cam groove, thus increasing the length of the cam ring in the optical axis direction. Furthermore, because this imaginary cam groove (M1) has a large inclination angle relative to the rotation direction of the cam ring, the rotational resistance of the cam ring when the cam ring guides cam followers is great. Additionally, in the case of attempting to form a plurality of cam grooves (11e and 11f) having different capabilities on a single peripheral surface of the cam ring like the cam ring 11 of the present embodiment of the zoom lens 5, one cam groove would tend to interfere with another on the same peripheral surface of the cam ring if the plurality of cam grooves are nonlinear cam grooves such as the imaginary cam grooves (M1), so that it would be difficult to arrange different types of cam grooves efficiently while achieving miniaturization of the cam ring.

In contrast, according to the cam mechanism in the present embodiment of the zoom lens 5, the above described problems can be overcome. Specifically, the amount of movement that each of the cam ring 11 and the first linear guide ring 14 undertakes can be reduced because the cam grooves which give a predetermined amount of movement to the first lens group LG1 are divided and arranged separately on the cam ring 11 and the first linear guide ring 14 as the second lead cam grooves 11f and the roller-guiding cam slots 14e. As for the cam ring 11, the cam ring 11 can be made smaller in size in the optical axis direction than the case of forming the imaginary cam grooves (M1) that singly achieves a necessary moving path for the first lens group LG1. In addition, since the three pairs of second lead cam grooves 11f, which are formed on the cam ring 11 as cam grooves for controlling the position of the first lens group LG1, and the set of three roller-guiding cam slots 14e, which are formed on the first linear guide ring 14, are smaller in inclination with respect to the rotation direction of the cam ring than the imaginary cam grooves (M1) that singly achieve a necessary moving path for the first lens group LG1, each second lead cam groove 11f and each roller-guiding cam slot 14e make it possible to reduce frictional resistance and also make high-precision position control possible when each second lead cam groove 11f and each roller-guiding cam slot 14e guide the lead projections 12c and the guide rollers 26, respectively. Additionally, since two types of cam grooves formed on the outer peripheral surface of the cam ring 11 are formed as the set of three first lead cam grooves 11e and the three pairs of second lead cam grooves 11f, respectively, both of which are linear in basic groove shape, each first lead cam groove 11e and the associated pair of second lead cam grooves 11f can be brought extremely close to each other. Moreover, an improvement in efficiency of space utilization on the cam ring 11 (a reduction of the area occupied by cam grooves on the cam ring) is also achieved. More specifically, in the set of three first lead cam grooves 11e and the three pairs of second lead cam grooves 11f, the front lead groove portion K1 of each first lead cam groove 11e constitutes a zooming-range lead groove for precisely controlling the position of the associated lead projection 12c in the zooming range from the wide-angle extremity to the telephoto extremity, while the rear lead cam groove 11f-B of each pair of second lead cam grooves 11f constitutes a zooming-range lead groove for precisely controlling the position of the associated pair of first-lens-group-control cam followers 19c in the zooming range from the wide-angle extremity to the telephoto extremity. Additionally, in each of the three first lead cam grooves 11e, the front lead groove portion K1 that serves as a zooming-range lead groove is longer than the rear lead groove portion K2 that serves as a retraction lead groove. Similarly, in each pair of second lead cam grooves 11f, the rear lead cam groove 11f-B that serves as a zooming-range lead groove is longer than the front lead cam groove 11f-A that serves as a retraction lead groove. On the outer peripheral surface of the cam ring 11, these relatively long groove portions, namely, the front lead groove portion K1 of each first lead cam groove 11e and the rear lead cam groove 11f-B of the associated pair of second lead cam grooves 11f are positioned closely to each other. In other words, the front lead groove portion K1 of each first lead cam groove 11e is positioned closer to the rear lead cam groove 11f-B of the associated pair of second lead cam grooves 11f than the front lead cam groove 11f-A of the associated pair of second lead cam grooves 11f. With this arrangement, each first lead cam groove 11e and each pair of second lead cam grooves 11f are arranged efficiently, without interfering with one another, in a limited peripheral space on the cam ring 11.

In addition, in the set of three lead projections 12c, since the pair of lead surfaces 12c1 and the pair of orthogonal surfaces 12c2 of each lead projection 12c, each pair of which are parallel plane surfaces, are formed as contact surfaces against the opposed side walls of the associated first lead cam groove 11e, the contact area of each lead projection 12c which is in slide contact with the opposed side walls of the first lead cam groove 11e is large, which makes it possible to increase the strength against external force. It is desirable that the frontmost external barrel 12 that has the set of three lead projections 12c, in particular, be superior in strength in this manner because the frontmost external barrel 12 serves as one of the elements of the zoom lens 5 which form the outward appearance of the zoom lens 5.

The specific structure of the above described embodiment of the zoom lens 5 is a merely example which embodies the present invention, so that the spirit and scope of the present invention are not limited by the above described embodiment. For instance, although the moving manner of the third lens group LG3 (displaceable from the imaging optical axis Z1) in the optical axis direction is controlled by the plurality of third-lens-group guide cam grooves 18e of the helicoid ring 18 that operates to transfer rotation to the cam ring 11 in the above illustrated embodiment of the zoom lens, it is possible to provide the cam ring 11, to which rotation is transferred from the helicoid ring 18, with similar cam grooves for controlling movement of a retractable optical element which corresponds to the third lens group LG3.

In addition, in the above illustrated embodiment of the zoom lens, the rotational transfer groove portions 18/1 of the set of three roller-engaging grooves 18f, that are used to transfer a rotational force from the helicoid ring 18 to the set of three guide rollers (followers) 26 of the cam ring 11, are formed as axial grooves which are parallel to the imaging optical axis Z1. However, a rotational force can be transferred from the helicoid ring 18 to the set of three guide rollers (followers) 26 not only via axial grooves such as the rotational transfer groove portions 18/1 but also via lead grooves inclined with respect to the axial direction of the helicoid ring 18. In other words, any groove can be adopted as a rotational transfer groove formed on the rotation transfer ring (18) as a substitute for the rotational transfer groove portion 18/1, of the present embodiment, so long as such a groove is shaped to include at least an axial-direction component and is capable of transferring a component force in a rotational direction.

In addition, in the above illustrated embodiment, rotational transmission to the cam ring 11 is canceled in the retracted state of the zoom lens 5, in which each movable ring member of the zoom lens 5 is fully retracted in the optical axis direction. However, the main purpose of limiting rotation of the cam ring 11 is to prevent the cam ring 11 from interfering with the retracting operation of the third lens group frame 16 to the off-axis displaced position or the advancing operation of the third lens group frame 16 to the on-axis position as described above. Therefore, if this sort of retracting operation of the retractable optical element is performed at a forward position (in the optical axis direction) which is (forwardly) away from the rear movement limit of the retractable optical element (which corresponds to the retracted position of the lens barrel), the lens barrel is required to be structured so that rotation of the cam ring 11 is limited at this forward position. Namely, the position where the limitation of rotation of the cam ring 11 is performed is not limited solely to the retracted position (the rear movement limit) of the lens barrel.

In addition, although each roller-guiding cam slot 14e is formed as through-groove and each roller-engaging groove 18f is formed as bottomed-groove in the above illustrated embodiment, a reversed relationship (i.e., in which the relationship between the first linear guide ring 14 and the helicoid ring 18 is reversed) is possible in which each roller-guiding cam slot 14e is formed as a bottomed-groove and each roller-engaging groove 18f is formed as a through-groove (slot).

Obvious changes may be made in the specific embodiment of the present invention described herein, such modifications being within the spirit and scope of the invention claimed. It is indicated that all matter contained herein is illustrative and does not limit the scope of the present invention.

What is claimed is:
1. A lens barrel comprising:
a driven ring which is rotatable about an axis extending in an optical axis direction and movable in said optical axis direction, wherein said axis extending in said optical axis direction defines an axial direction;
a follower which is provided on said driven ring;
a rotational transfer ring which is driven to rotate about said axis, said rotational transfer ring including a circumferential groove having no axial-direction component, and a rotational transfer groove which is communicatively connected with said circumferential groove and includes an axial-direction component, said follower being selectively engaged in said circumferential groove and said rotational transfer groove;

a guide ring which is prevented from rotating about said axis, said guide ring being associated with said rotational transfer ring to allow said rotational transfer ring to rotate about said axis relative to said guide ring and to be prevented from moving in said optical axis direction relative to said rotational transfer ring; and a cam groove formed on said guide ring, in which said follower of said driven ring is engaged, said cam groove guiding said driven ring to move between a non-photographing position and a ready-to-photograph position by a rotation of said driven ring relative to said guide ring, wherein rotation of said driven ring is prevented when said follower is engaged in said circumferential groove so that said driven ring is held at said non-photographing position, wherein, when said follower is engaged in said rotational transfer groove, said driven ring is moved along said cam groove between said non-photographing position and said ready-to-photograph position by a rotation of said rotational transfer ring, wherein said rotational transfer ring includes a pair of opposed wall surfaces in said circumferential groove which extend parallel to each other so as to determine a position of said follower in said optical axis direction when said driven ring moves between said non-photographing position and said ready-to-photograph position, and wherein an entire range, of said cam groove of said guide ring, that is used to move said driven ring between said ready-to-photograph position and said non-photographing position includes an axial-direction component.

2. The lens barrel according to claim 1, further comprising:
a linearly moving ring which is positioned inside said driven ring and is prevented from rotating about said axis, said linearly moving ring being moved between a forward position and a rearward position in said optical axis direction when said driven ring moves between said ready-to-photograph position and said non-photographing position, respectively;

a retractable optical element supported by said linearly moving ring therein to be movable between an on-axis position, at which a center of said retractable optical element is coincident with said optical axis, and an off-axis displaced position, at which the center of said retractable optical element is eccentrically positioned with respect to said optical axis;

a retracting device which moves said retractable optical element from said on-axis position to said off-axis displaced position by a relative moving force in said optical axis direction between said retracting device and said linearly moving ring when said linearly moving ring moves from said forward position to said rearward position; and an accommodation portion formed on an inner periphery of said driven ring to allow at least part of said retractable optical element to enter said accommodation portion when said driven ring is in said non-photographing position.

3. The lens barrel according to claim 2, wherein said rotational transfer ring comprises a second cam groove, said second cam groove including a circumferential groove portion having no axial-direction component, wherein said linearly moving ring comprises a second follower which is engaged in said second cam groove, wherein a position of said linearly moving ring in said optical axis direction is controlled via said second cam groove and said second follower, and wherein, when said follower of said driven ring is in said circumferential groove of said rotational transfer ring, said second follower is engaged in said circumferential groove portion of said second cam groove.

4. The lens barrel according to claim 2, wherein said driven ring comprises a cam groove provided on a periphery thereof, and wherein a rotation of said driven ring causes a position of an optical element of said lens barrel that is different from said retractable optical element to vary in said optical axis direction.

5. The lens barrel according to claim 1, wherein said rotational transfer groove of said rotational transfer ring comprises an axial groove extending in said optical axis direction.

6. The lens barrel according to claim 1, further comprising a lens barrier mechanism which is positioned away from said driven ring in said optical axis direction when said driven ring is in said ready-to-photograph position, and is positioned in a close vicinity of said driven ring in said optical axis direction when said driven ring is in said non-photographing position, wherein said lens barrier mechanism includes at least one barrier blade which is biased in an opening direction when said lens barrier mechanism is positioned away from said driven ring, and wherein a rotation of said driven ring when said driven ring moves from said ready-to-photograph position to said non-photographing position causes said barrier blade to shut.

7. The lens barrel according to claim 1, wherein said cam groove comprises a through-groove.

8. The lens barrel according to claim 1, wherein said cam groove comprises a bottomed-groove.

9. The lens barrel according to claim 1, wherein said lens barrel comprises a retractable lens barrel incorporated in a camera.

10. The lens barrel according to claim 2, wherein said retractable optical element is supported by said linearly moving ring therein to be swingable between said on-axis position and said off-axis displaced position about a pivot parallel to said optical axis.

11. A lens barrel comprising:
a driven ring including a follower on a periphery thereof;
a rotational transfer ring driven to rotate about an axis extending an optical axis direction;
a circumferential groove which is formed on said rotational transfer ring and includes no axial-direction component, in which said follower is engaged, wherein said circumferential groove allows said follower to be disengaged from said circumferential groove when said rotational transfer ring is positioned at a specific rotational position; and a guide ring which is prevented from rotating about said axis, said guide ring being associated with said rotational transfer ring to allow said rotational transfer ring to rotate about said axis relative to said guide ring and to be prevented from moving in said optical axis direction relative to said rotational transfer ring, wherein said driven ring is not rotated when said follower is in said circumferential groove, wherein said driven ring is rotated by a rotation of said rotational transfer ring when said follower is disengaged from said circumferential groove, wherein said rotational transfer ring includes a pair of opposed wall surfaces in said circumferential groove which extend parallel to each other so as to determine a position of said follower in said optical axis direction when said follower is engaged in said circumferential groove, and wherein said guide ring includes a rotation-direction-position limit cam groove in which said follower is engaged, said rotation-direction-position limit cam groove including an axial-direction component and determining a position of said follower in a rotational direction thereof when said follower is engaged in said circumferential groove.

12. The lens barrel according to claim 11, wherein said rotation-direction-position limit cam groove comprises a through-groove.

13. The lens barrel according to claim 11, wherein said rotation-direction-position limit cam groove comprises a bottomed-groove.

* * * * *